United States Patent [19]

Akao et al.

[11] Patent Number: 5,827,584

[45] Date of Patent: *Oct. 27, 1998

[54] INJECTION MOLDED ARTICLE FOR PHOTOGRAPHIC PHOTOSENSITIVE MATERIAL, MOLDING METHOD THEREOF AND PACKAGE USING THE SAME

[75] Inventors: Mutsuo Akao; Osamu Suzuki, both of Kanagawa, Japan

[73] Assignee: Fuji Photo Film Co., Ltd., Kanagawa, Japan

[ * ] Notice: The term of this patent shall not extend beyond the expiration date of Pat. No. 5,543,270.

[21] Appl. No.: 549,235

[22] Filed: Oct. 27, 1995

[30] Foreign Application Priority Data

Oct. 27, 1994 [JP] Japan .................................... 6-264222

[51] Int. Cl.⁶ ...................................................... C08L 53/00
[52] U.S. Cl. .................... 428/35.7; 428/36.8; 428/36.92; 428/339; 430/347; 430/496; 430/501; 206/578; 206/316.1; 206/316.2; 206/389; 206/455; 206/416
[58] Field of Search ................................ 428/36.8, 36.92, 428/35.7, 339; 430/347, 496, 501; 206/578, 316.1, 316.2, 389, 455, 416

[56] References Cited

U.S. PATENT DOCUMENTS 5,543,270  8/1996  Akao ........................................ 430/432

*Primary Examiner*—Charles Nold
*Attorney, Agent, or Firm*—Sughrue, Mion, Zinn, Macpeak & Seas, PLLC

[57] ABSTRACT

An injection molded article for photographic photosensitive materials is disclosed, which is formed of a noncrystalline resin composition containing 50 wt % or more of a noncrystalline resin having a melt flow rate of from 1 to 60 g/10 min, a flexural modulus of elasticity of 20,000 kg/cm² or more and a thermal deformation temperature of 70° C. or higher, from 0.1 to 45 wt % of one or more of a rubbery material, a thermoplastic elastomer and an ethylene copolymer resin, from 0.01 to 49.9 wt % of one or more of a light-shielding material and a fibrous filler and from 0.001 to 20 wt % of one or more of an antioxidant, an age resistor, an ultraviolet absorbent, a fatty acid metal salt, a radical scavenger, a hydrate double salt compound and an oxidation inhibitory synergistic effect-providing agent. Also disclosed are a method for forming the injection molded article for photographic photosensitive materials and a package using the injection molded article for photographic photosensitive materials.

15 Claims, 6 Drawing Sheets

INJECTION MOLDED ARTICLE FOR PHOTOGRAPHIC PHOTOSENSITIVE MATERIAL, MOLDING METHOD THEREOF AND PACKAGE USING THE SAME

FIELD OF THE INVENTION

The present invention relates to an injection molded article for photographic photosensitive materials for use in a photographic spool or a film unit with a lens having excellent dimensional accuracy and physical strength, a molding method thereof and a package using the same.

BACKGROUND OF THE INVENTION

Conventionally, an injection molded article for photographic photosensitive materials such as a 35-mm photographic film spool in a patrone, a cinematic film core, a photographic film unit with a lens and a resin-made photographic film patrone has been formed of various resin compositions and, for example, a 35-mm photographic film spool is formed of a polystyrene resin or an impact resistant polystyrene resin (see, JP-A-U-61-36995 (the term "JP-A-U" as used herein means an "unexamined published Japanese utility model application")), a cinematic film core is formed of a polypropylene resin, a polystyrene resin or an ABS resin (see, JP-A-U-2-37799), a film unit with a lens is formed of a resin composition obtained by adding carbon black to an impact resistant polystyrene resin having a low melt flow rate (see, JP-A-63-226643 (the term "JP-A" as used herein means an "unexamined published Japanese patent application")), and a resin-made photographic film patrone is formed of a resin composition obtained by adding carbon black to an impact resistant polystyrene resin (see, JP-A-1-312538).

Other than the polystyrene resin, the resin composition for the injection molded article for photographic photosensitive materials includes a polyolefin resin composition comprising as a main component a polyolefin resin obtained by blending from 50 to 90 wt % of a polypropylene resin as a crystalline resin having a high mold shrinkage percentage with from 9 to 48.5 wt % of a linear low-density polyethylene resin as a crystalline resin having a low mold shrinkage percentage but low in the rigidity and hardness to reduce the mold shrinkage percentage and be assured of rigidity or hardness, and containing a light-shielding material and a lubricant, which can also be used in a light-shielding case for photographic roll film or in a molded article required to have dimensional accuracy, rigidity or hardness such as a photographic photosensitive material belt product core, a photographic film magazine, a photographic film spool or a resin-made photographic film patrone (see, JP-A-63-215748).

However, the resin composition used in the above-described injection molded articles for photographic photosensitive materials is bound to various problems.

More specifically, the resin composition used in a photographic film spool is insufficient in the moldability, heat durability, dimensional accuracy and abrasion resistance and in some cases, causes a trouble that it adversely affects photographic properties of a photographic film. The resin used in a cinematic film core cannot use an additive capable of giving lubricity to the core surface such as a lubricant or a surface active agent because if the additive is used, in the case of a long roll film, the long roll film is disadvantageously wound up like a bamboo shoot, and accordingly, the roll film is designed not to slip by adding a synthetic rubber or the like. As a result, the injection moldability and the abrasion resistance are insufficient. The resin composition used in the photographic film unit with a lens causes in some cases a bad effect on photographic properties, undergoes frequent occurrence of weld lines to deteriorate the appearance and has low physical strength. The resin composition used in a resin-made photographic film patrone is in need of improvement in photographic properties, heat durability, appearance or physical strength and also involved in high occurrence of weld lines.

The polyolefin resin composition obtained by blending a polypropylene resin as a crystalline resin with a linear low-density polyethylene resin is insufficient in uniform dispersibility of the light-shielding material, injection moldability and dimensional accuracy as compared with the polystyrene resin and also in need of improvement in photographic properties. This polyolefin resin composition uses a crystalline resin and therefore, the melting thereof requires about two times the quantity of heat for the polystyrene-based resin which is a noncrystalline resin. Further, since two kinds of resins, a propylene resin and a linear low-density polyethylene resin, are required, in order to reduce the mold shrinkage percentage, costly equipments are needed such as a container for transportation, a silo or a mixing machine and a large space for these equipments are also necessary, thus this resin composition is bound to problems from an economical aspect including the standing charge as well as in view of operationability.

Recently, it has been found that a large number of substances out of various additives, impurities in additives, catalyst residues of thermal decomposition or polymerization of the resin and residual monomers adversely affect photographic properties of a photographic photosensitive material which is a super-precision commercial products. Examples of the photographic property-evilly affectional substance which adversely affects photographic properties of the photographic photosensitive material of the present invention include a heavy metal ion, a reducing agent (e.g., various antioxidants, sulfite ions), a cyan compound, an amine compound, a labile (ready to be liberated) sulfur-containing compound (e.g., crosslinking agent), a halogen compound, a mercaptan, an ammonia compound, a hydrogen sulfide, a polyalkylene oxide, an aldehyde, a ketone, a hydroxyaldehyde, a dialdehyde, an unsaturated aldehyde, an aldehyde halide, a cyclohexadiene, various diketone, an α-ketoaldehyde, a ketone halide, a hydroxy ketone, a reaction product of formalin with amine (e.g., halomethylenehexamine), a carboxylic acid (e.g., ethylenediaminetetraacetic acid), a phenol, an aliphatic amine, a radioactive dust, a fluorescent substance, mercury, a mercury compound (this compound readily generates mercury vapor with a reducing agent; fog greatly generates with a several ppm of mercury vapor and this is a problem), a silicone synthesized from methyldichlorosilane (those having a silicone hydride high in the reducing property) and iron powder. These substances provide bad effects on photographic properties of a photographic photosensitive material, particularly on qualities, such as sensitization change action, spot generation and fog increasing action.

SUMMARY OF THE INVENTION

An object of the present is to provide, by solving the above-described problems, an injection molded article for photographic photosensitive materials improved in photographic properties, injection moldability, dimension accuracy, abrasion resistance and heat durability.

Another object of the present invention is to provide a method for producing an injection molded article for photographic photosensitive materials capable of good production of the above-described injection molded article for photographic photosensitive materials.

Still another object of the present invention is to provide a package for photographic photosensitive materials capable of maintaining good photographic properties for a long period of time using the above-described injection molded article for photographic photosensitive materials.

The above-described objects have been achieved by:

an injection molded article for photographic photosensitive materials according to the first embodiment of the present invention, which is formed of a noncrystalline resin composition containing 50 wt % or more of a noncrystalline resin having a melt flow rate of from 1 to 60 g/10 min, a flexural modulus of elasticity of 20,000 kg/cm$^2$ or more (measured according to ASTM D790) and a thermal deformation temperature of 70° C. or higher (measured according to ASTM D648 at a load of 18.6 kg/cm$^2$), from 0.1 to 45 wt % of one or more of a rubbery material, a thermoplastic elastomer and an ethylene copolymer resin, from 0.01 to 49.9 wt % of one or more of a light-shielding material and a fibrous filler and from 0.001 to 20 wt % of one or more of an antioxidant, an age resistor, an ultraviolet absorbent, a fatty acid metal salt, a radical scavenger, a hydrate double salt compound and an oxidation inhibitory synergistic effect-providing agent;

an injection molded article for photographic photosensitive materials according to the second embodiment of the present invention, which is formed of a noncrystalline resin composition containing 50 wt % or more of a rubber-containing aromatic monovinyl resin which is a noncrystalline resin having a rubbery material content of from 0.1 to 20 wt %, from 0.01 to 20 wt % of a lubricant and from 0.01 to 49.9 wt % of a light-shielding material surface-covered with a surface-covering material, with the total content of the above-described materials being 70 wt % or more, and having a melt flow rate of from 2 to 50 g/10 min., a flexural modulus of elasticity of 15,000 kg/cm$^2$ or more and an Izod impact strength of 2.5 kg·cm/cm$^2$ or more;

an injection molded article for photographic photosensitive materials according to the third embodiment of the present invention, which is formed of a noncrystalline resin composition containing 50 wt % of a rubber-modified polystyrene resin which is a noncrystalline resin modified with from 0.1 to 20 wt % of one or more rubbery material of a diene-based rubber and a polyolefin-based rubber, and from 0.001 to 20 wt % of one or more of a fatty acid metal salt and a hydrate double salt compound, and having a melt flow rate of from 2 to 50 g/10 min., a flexural modulus of elasticity of 15,000 kg/cm$^2$ or more and an Izod impact strength of 2.5 kg·cm/cm$^2$ or more;

an injection molded article for photographic photosensitive materials according to the fourth embodiment of the present invention, which is formed of a noncrystalline resin composition containing 50 wt % or more of a rubber-containing polystyrene resin which is a noncrystalline resin having a rubbery material content of from 0.1 to 20 wt %, from 0.005 to 10 wt % of a silicone-based lubricant, from 0.005 to 20 wt % of one or more of an antistatic agent, a fatty acid amide-based lubricant, a hydrocarbon-based lubricant, a fatty acid-based lubricant, a fatty acid metal salt-based lubricant and an alcohol-based lubricant and from 0.01 to 49.9 wt % of a light-shielding material, with the total content of the above-described materials being 70 wt % or more;

an injection molded article for photographic photosensitive materials according to the fifth embodiment of the present invention, which is formed of a noncrystalline resin composition containing 50 wt % or more of a styrene-based resin which is a noncrystalline resin having a synthetic rubber content of from 0.1 to 20 wt %, from 0.005 to 10 wt % of a silicone-based lubricant comprising one or more of a dimethylpolysiloxane and a dimethylpolysiloxane-modified product, from 0.005 to 20 wt % of one or more of a higher fatty acid-based lubricant, a higher fatty acid metal salt-based lubricant, a higher fatty acid amide-based lubricant, a hydrocarbon-based lubricant and an alcohol-based lubricant, from 0.01 to 49.9 wt % of one or more of a metal powder, a metal paste, carbon black graphite and an inorganic pigment having a refractive index of 1.50 or more and from 0.001 to 20 wt % of one or more of an antioxidant, an age resistor, an ultraviolet absorbent, a radical scavenger, an oxidation inhibitory synergistic effect-providing agent and a hydrate double salt compound, with the total content of the above-described materials being 80 wt % or more;

an injection molded article for photographic photosensitive materials according to the sixth embodiment of the present invention, which is formed of a noncrystalline resin composition containing 50 wt % or more of a noncrystalline resin, from 0.1 to 45 wt % of one or more of an olefin-based elastomer, an ethylene copolymer resin, an acid-modified polyolefin resin and a low molecular polyolefin resin, from 0.01 to 20 wt % of a lubricant, from 0.01 to 49.9 wt % of one or more of a white pigment and a black pigment and from 0.001 to 20 wt % of one or more of an antioxidant, an age resistor, an ultraviolet absorbent, a radical scavenger, an oxidation inhibitory synergistic effect-providing agent and a hydrate double salt compound, with the total content of the above-described materials being 80 wt % or more;

an injection molded article for photographic photosensitive materials according to the seventh embodiment of the present invention, which is formed of a noncrystalline resin composition containing 50 wt % or more of a noncrystalline resin, from 0.001 to 3 wt % of a phenolic antioxidant, from 0.001 to 3 wt % of a phosphoric antioxidant and from 0.001 to 5 wt % of one or more of a hydrate double salt compound and a fatty acid metal salt, with the total content of the above-described phenolic antioxidant, phosphoric antioxidant, hydrate double salt compound and fatty acid metal salt being from 0.003 to 7 wt %; and an injection molded article for photographic photosensitive materials according to the eighth embodiment, which is formed of a noncrystalline resin composition containing a noncrystalline resin, one or more of an antioxidant and a hydrotalcite compound, a fatty acid metal salt, one or more of an ethylene copolymer resin and a thermoplastic elastomer, and carbon black.

DETAILED DESCRIPTION OF THE PRESENT INVENTION

Figure 1:
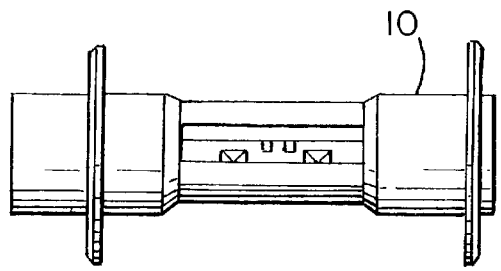
FIG. 1 is a front view of a spool for photographic film as an example of an injection molded article for photographic photosensitive materials of the present invention.

The noncrystalline resin for use in the injection molded article for photographic photosensitive materials of the present invention is excellent in dimensional accuracy and suitable for a molded article for photographic photosensitive materials required to have dimensional accuracy (e.g., resin-made patrone for photographic film, spool for photographic film, magazine for bright-room loading, core for photographic film, cartridge for photographic film, pack for sheet photographic film, camera body, spool for camera, hermetically sealed light-shielding container, holder for sheet photographic film). The noncrystalline resin does not have any bad effects on photographic properties (namely, quality as a photographic photosensitive material is guaranteed including storage time) and is high in heat durability, abrasion resistance and rigidity.

Examples of the noncrystalline resin include various polystyrene-based resins, an ABS resin, a polyvinyl chloride resin, an acrylic resin, an acrylonitrile-styrene resin, a polycarbonate resin, a polyphenylene oxide-modified resin, a polysulfone resin, a polyether sulfone resin and a polyarylate resin. In addition to the above-described thermoplastic resins, the noncrystalline resin of the present invention includes thermoplastic resins having a crystallinity obtained by an X-ray diffraction method of 30% or less.

In the injection molded article for photographic photosensitive materials of the present invention, the above-described noncrystalline resins may be used individually or in combination of two or more thereof and also may be blended with different one or more thermoplastic resins. In view of dimensional accuracy, heat durability, abrasion resistance and rigidity, the noncrystalline resin accounts for preferably 50 wt %, more preferably 60 wt %, most preferably 70 wt % of the noncrystalline resin composition constituting the molded article. With the noncrystalline resin content of 50 wt % or more, photographic properties, injection moldability, dimensional accuracy (this is most important characteristics for the injection molded article using a camera or having a photographing function as an essential factor as in the case of a film unit with lens) and dispersibility of the light-shielding material (light-shielding ability) can be improved.

Among the above-described noncrystalline resins, preferred in view of cost are various styrene-based resins, an ABS resin, an acrylic resin, an acrylonitrile-styrene resin, a polycarbonate resin and a polyether sulfone resin, more preferred is a rubber-containing polystyrene resin (including a rubber-modified polystyrene resin). When the noncrystalline resin is selected according to the quality required and, if desired, modified with other resins or modified by blending it with other resins or mixing it with additives such as various fillers or silicones before use, a molded article for photographic photosensitive materials provided can be cheaper than and superior in quality to metals. In particular, a so-called engineering resin such as polycarbonate resin, polyphenylene oxide-modified resin, polysulfone resin and polyether sulfone resin can provide an injection molded article excellent in abrasion resistance, rigidity and heat durability, though they are expensive.

In view of cost, photographic properties, injection moldability, dimensional accuracy, heat deterioration and coloring property, the styrene-based resin is preferred and the styrene-based resin is suitable for molded articles for photographic photosensitive materials produced by mass production (e.g., resin-made patrone for photographic film, spool for photographic film, spool for camera, core for photographic film, holder for sheet photographic film, pack for sheet photographic film, cartridge for photographic film).

A rubber-modified polystyrene resin, a polycarbonate resin, an ABS resin, a blend resin of a homopolystyrene resin with a rubber-modified polystyrene resin (impact-resistant polystyrene resin), a blend resin of a polycarbonate resin with an ABS resin and a blend resin of an ABS resin with an ethylenic copolymer resin or a thermoplastic elastomer are preferred as the noncrystalline resin for use in the injection molded article for photographic photosensitive materials which is repeatedly used for several years, required to have abrasion resistance, flame retardancy, heat durability (on use at a temperature of usually 35° C. or higher and when left under the sunlight for a long period of time, of 80° C. or higher), cold resistance (on use at a temperature of 0° C. or lower), physical strength, dimensional accuracy and rigidity, and must maintain the quality such that the photographic photosensitive material is not adversely affected, such as a camera body, a development processor for photographic photosensitive materials and a holder for sheet photographic film (of which representative examples are disclosed in U.S. Pat. Nos. 4,725,865 and 4,821,055, JP-A-5-341378, JP-A-5-341379, JP-A-5-341380, JP-A-5-341381, JP-A-6-75291, JP-A-6-75292 and JP-A-6-75293).

The above-described styrene-based resin is described below.

(1) Molecular Structure and Characteristic Feature

The styrene resin includes a transparent general purpose polystyrene (GPPS) resin which is a homopolystyrene resin obtained by polymerizing only styrene monomers, a high-impact polystyrene (HIPS) resin which is a rubber-containing polystyrene resin obtained by reinforcing the GPPS resin by a rubbery material, and a copolymer resin of styrene and other copolymerizable monomer (e.g., methacrylic ester, acrylic ester, acrylonitrile, meleic anhydride, etc.) or other thermoplastic resin (e.g., ABS resins, AS resins, methyl methacrylate-styrene resin, ASA resins, AES resins, AAS resins, etc.), of which styrene moiety is linear and amorphous. By using a Natta-type catalyst, an isotactic polystyrene resin can be obtained, which is opaque and has a heat deformation temperature of about 200° C.

According to JIS K6870-1987, the styrene resin is roughly classified into two groups, one is a homopolymer of styrene (called as general-use polystyrene; referred to as "GP") and another is a styrene polymer modified by a synthetic rubber to have improved impact resistance (called as high-impact polystyrene; referred to as "HI"). Explanatory FIGS. 1 and 2 each shows that even if the Vicat softening points are the same, the GP polystyrene is larger in tensile strength than the HI polystyrene by 30% or more and also in bending strength by 20% or more. Accordingly, it is effective to use the GP polystyrene and the HI polystyrene by varying the mixing ratio according to the use purpose.

The characteristic features of the styrene resin are that (1) it has a small specific gravity, (2) it has no taste, no odor and no toxicity, (3) it is low in hygroscopicity, (3) is excellent in electrical insulating property and high-frequency insulating property, (5) it has good coloring property and paintability, (6) it is extremely excellent in moldability, (7) it provides good dimensional stability to the molded article, (8) it is a relatively cheap material and (9) it gives almost no bad effect on a photographic photosensitive material. On the other hand, depending on the use, it is deficient in that (1) it is insufficient in impact resistance, (2) it is corroded by some oils and organic solvents, (3) it is insufficient in heat durability, (4) it is flammable, (5) it is unsatisfactory in weatherability and (6) it is readily charged.

(2) Production Process

The styrene resins are mostly produced by continuous block polymerization and partly by suspension batch polymerization. Either one is typical radical polymerization. The continuous block polymerization comprises a continuous combination of polymerization step, degassing monomer recovery step and granulating step.

(3) Japanese Manufacturer and Trade Name of Styrene Resin

| Manufacturer | Trade Name |
| --- | --- |
| Asahi Kasei Kogyo Kabushiki Kaisha | Styron |
| Idemitsu Petrochemical Co., Ltd. | Idemitsu Styron |
| Nippon Steel Chemical Co., Ltd. | Estyrene |
| Dai-nippon Ink & Chemicals, Inc. | Dic Styrene |
| Electro Chemical Industry Co., Ltd. | Denka Styrol |
| Nippon Polystyrene K.K. | Esbright |
| Mitsui Toatsu Chemical Inc. | Topo Rex |
| Mitsubishi Monsanto Chemical Co., Ltd. | Daia Rex |

The rubber-containing polystyrene resin (rubber-containing aromatic monovinyl resin) is described below in detail.

The rubber-containing aromatic monovinyl resin of the present invention may be in the following three forms: namely, a graft polymer of a rubbery material with aromatic monovinyl; a mixture of a rubbery material and an aromatic monovinyl resin being in a merely kneaded state; and a mixture of a graft polymer of a rubbery material with aromatic monovinyl, and an aromatic monovinyl resin.

The rubbery material content in the rubber-containing aromatic monovinyl resin is from 0.1 to 20 wt %, preferably from 1 to 12 wt %, more preferably from 1.5 to 10 wt %, most preferably from 2 to 8 wt %. If the content is less than 0.1 wt %, the abrasion resistance is poor and the physical strength is weak and in particular, in the case of a spool for photographic film, a resin-made patrone for photographic film, an instant camera unit, a camera body, a cartridge for photographic film, a magazine for photographic film or a photographic film with a lens having many chances for use at a temperature of 0° C. or lower, it can be hardly put into practical use due to insufficient shatter strength and unsatisfactory abrasion resistance. On the other hand, if the content exceeds 20 wt %, after aging in a sealed state for three or more months, the photographic photosensitive material undergoes increase in fog by 0.03 or more or partial increase in sensitivity by 20% or more, resulting in uneven image quality in density or coloring of the photographic print, thus the practical use is impossible. Further, the flexural modulus of elasticity is reduced and deformation is readily caused to lose the camera aptitude or bring about light-shielding incapability.

Examples of the rubbery material include an ethylene-propylene-based copolymer, an ethylene-propylene-nonconjugated diene ternary copolymer, an isoprene copolymer, polyiso-butylene, a styrene-isoprene copolymer, polybutadiene and a styrene-butadiene copolymer. The polybutadiene includes a high cis-polybutadiene having a high cis 1,4-bond content (preferably containing 70 mol % or more, preferably 90 mol % or more) and a low cis-polybutadiene having a low cis 1,4-bond content.

The rubbery material has an average particle size of from 0.1 to 10 μm, preferably from 0.2 to 7 μm, more preferably from 0.5 to 5 μm and most preferably from 0.7 to 3.5 μm. If the average particle size is less than 0.1 μm, the substance becomes expensive, the impact strength decreases, score marks are frequently generated and thus the practical use is impossible, whereas if the average particle size exceeds 10 μm, the surface suffers from large unevenness and the tensile strength is lowered to render the practical use difficult.

In general, if the average particle size is small, a highly glossy molded article having a smooth surface can be obtained but it is readily marred and the polymerization cost increases. On the other hand, if the average particle size is large, the reflection diminishes and the glossiness is lowered. Accordingly, in the case when a highly glossy molded article is intended, a resin of a rubbery material having an average particle size of from 0.1 to 1.5 μm, preferably from 0.2 to 1.0 μm is used and in the case when a low-glossy molded article matted for inhibiting reflection is intended, a resin of a rubber substance having an average particle size of from 1.5 to 10 μm, preferably from 1.7 to 7 μm, more preferably from 2.0 to 5 μm is used. By employing such a resin, light fogging due to light reflection can be prevented even without embossing the surface. However, if embossing is applied, light fogging due to light reflection can be advantageously prevented more perfectly and therefore, embossing is preferably applied in case of a photographic film spool or a resin-made photographic film patrone.

The average particle size of the rubbery material is calculated by the following equation from sizes measured on 600 particles of the rubbery material on a photograph of an ultrathin piece cut out by a microtome, taken by a transmission type electron microscope:

Average Particle Size=$\Sigma nD^2/\Sigma nD$
wherein n is a particle size and D is the particle number of the rubbery material.

The average particle size of the rubbery material can be controlled by the agitation condition in polymerization or the viscosity of a solution of the rubbery material.

Examples of the aromatic monovinyl include styrene, a nucleus alkyl-substituted styrene such as o-methylstyrene, p-methylstyrene, m-methylstyrene, o-ethyl styrene, p-ethylstyrene, m-ethylstyrene, 2,4-dimethylstyrene and p-tert-butylstyrene, nucleus halogenated styrene such as 2,4,6-tribromostyrene and 2,4,6-trichlorostyrene, and α-alkyl-substituted styrene such as α-methylstyrene, α-methyl-p-methylstyrene.

In the case when the rubber-containing aromatic monovinyl resin is a polymer of a rubbery material with aromatic monovinyl, the polymerization may be conducted by the following polymerization methods.

[Radical Polymerization]

1) Batch Block Polymerization

| Advantage | Production is simple. |
|---|---|
| Defect | Dispersion of heat is difficult in the case of a large scale production. The molecular weight distribution is wide and the moldability is excellent. |

2) Continuous Block Polymerization

| Advantage | The quality of products is uniform. The production cost is low. |
|---|---|
| Defect | A reaction solution having a high viscosity is transferred. Channeling is generated in the reaction tower. |

3) Continuous Solution Polymerization

| Advantage | The polymerization heat can be easily controlled. |
|---|---|
| Defect | The solvent must be removed. The agitation is difficult. |

4) Suspension Polymerization

| Advantage | The polymerization heat can be released. A granular polymer can be obtained. The residual monomer is reduced. |
|---|---|
| Defect | Stains due to water or a stabilizer are generated. The volatile component must be removed. Drying and pelletizing are required. |

5) Emulsion Polymerization

| Advantage | The reaction speed is high. The polymerization heat can be released. The continuous polymerization can also be conducted. A latex polymer can be obtained. |
|---|---|
| Defect | Stains due to water or an emulsifier are generated. Drying and pelletizing are required. |

[Ion Polymerization]

1) Ion Polymerization

| Advantage | The reaction speed is high. The polymerization heat can be controlled. |
|---|---|
| Defect | The solvent and catalyst powder must be removed. Freezing is required. |

Among these polymerization methods, preferred in view of economical point are block polymerization and block-suspension two-stage polymerization, where styrene monomers are polymerized through radical reaction in the presence of a rubbery polymer and particularly preferred is continuous block polymerization because the cost is low and substances which adversely effect a photographic photosensitive material are scarcely mingled. From the standpoint that the residual monomer is reduced, heat durability is excellent and prompt actions can be taken, suspension polymerization (batch system) is preferred.

The rubber-containing aromatic monovinyl resin has a melt flow rate (hereinafter referred to as "MFR"; values obtained according to standard conditions for respective resins, for example, in case of a polystyrene resin, an ABS resin and an AS resin, according to ASTM D 1238-88, Condition G, specifically at a test temperature of 200° C. and under a test load of 5.00 kg, while in case of an acrylic resin, according to ASTM D 1238-88, Condition H, namely at a test temperature of 230° C. and under a test lead of 1.2 kg) of from 1.0 to 60 g/10 min, preferably from 2.0 to 50 g/10 min, more preferably from 3.0 to 40 g/10 min and most preferably from 5.0 to 30 g/10 min. If the MFR is less than 1.0 g/10 min, the flowability of the resin is poor to frequently generate short shots or weld lines and the molding cycle is prolonged, thus, the resin can hardly be put into practical use. On the other hand, if the MFR exceeds 60 g/10 min, the physical strength is low, burrs are frequently generated and the resin is readily deteriorated due to heat and difficult to be put into practical use. The number average molecular weight is, on considering a balance of maintenance of physical strength, polymerization cost and injection moldability, from 10,000 to 1,000,000, preferably from 20,000 to 800,000, more preferably from 50,000 to 600,000. The molecular weight distribution obtained as (weight average molecular weight/number average molecular weight) measured by GPC is from 1.5 to 10, preferably from 1.8 to 8, more preferably from 2 to 6. If the molecular weight distribution is less than 1.5, injection moldability becomes bad, whereas if the molecular weight distribution exceeds 10, dimensional accuracy or physical strength is worsened and the practical use becomes difficult.

The rubber-containing aromatic monovinyl resin has a flexural modulus of elasticity (measured according to ASTM D790) of 20,000 kg/cm$^2$ or more, preferably 22,000 kg/cm$^2$ or more, more preferably 23,000 kg/cm$^2$ or more and most preferably 25,000 kg/cm$^2$ or more. If the flexural modulus of elasticity is less than 20,000 kg/cm$^2$, the resin is easily deformed on the application of external force to fail in maintaining dimensional accuracy or perfect light-shielding ability. In particular, if a spool for photographic film, a resin-made patrone for photographic film or a cartridge for photographic film (K16 film, K35 film), each loaded in a camera on use, is deformed, its loading into a camera becomes difficult and photographing cannot be conducted.

The aromatic monovinyl resin has a heat deformation temperature (measured according to ASTM D-648, load: 18.6 kg/cm$^2$) of 70° C. or higher, preferably 75° C. or higher, more preferably 80° C. or higher and most preferably 85° C. or higher. If the heat deformation temperature is less than 70° C., for example, a molded article colored black is softened and deformed when left under sunlight for one or more hours and as a result, perfect light-shielding ability cannot be maintained. A spool for photographic film is also deformed to fail in freely rotating in a camera.

The rubber-containing aromatic monovinyl resin has a Rockwell hardness (determined according to JIS K-7202 or ASTM D-785, M scale) of preferably M40 or more, more preferably M45 or more, still more preferably M50 or more and most preferably M55 or more. If the Rockwell hardness is less than M40, flaws are formed resulting from abrasion against a metal or photographic film, the dimensional accuracy cannot be maintained or abrasion debris attach to the photographic photosensitive material to cause spot faults.

The rubber-containing aromatic monovinyl resin has an Izod impact strength (measured according to JIS K-7110) of preferably 2.0 kg·cm/cm$^2$ or more, more preferably 2.5 kg·cm/cm$^2$ or more, still more preferably 3.0 kg·cm/cm$^2$ or more and most preferably 3.5 kg·cm/cm$^2$ or more. If the Izod impact strength is less than 2.0 kg·cm/cm$^2$, the physical strength is poor and in particular, in the case of a spool for photographic film, a resin-made patrone for photographic film, an instant film unit, a camera body, a photographic film unit with a lens, a holder for sheet photographic film or a cartridge for photographic film having many chances for use at a temperature of 0° C. or lower, it can be hardly put into practical use due to insufficient strength.

The above-described ABS (acrylonitrile-butadiene-styrene) resin is described below.

(1) Molecular Structure and Characteristic Feature

The ABS resin is a thermoplastic resin mainly comprising acrylonitrile (A), butadiene (B) and styrene (S). Since an AS copolymer is grafted to dispersed polybutadiene particles, the polybutadiene particle has good compatibility with the AS continuous phase in the periphery thereof and coagulation of butadiene grains with each other is not generated.

The ABS resin belongs to grafted rubber particle dispersion system same as the high impact polystyrene (HIPS), and exhibits two distinct viscoelastic temperature characteristics; namely one in the vicinity of −80° C. due to the polybutadiene rubber and the other in the vicinity of +120° C. due to the AS copolymer.

The impact strength as the most characteristic feature of the ABS resin is considered to result from absorption of impact energy due to deformation of the polybutadiene particle and also absorption of impact energy due to formation of crazes generated on the polybutadiene particle interface and recently, this theory of craze seems to be supported. There is another report that, in addition to generation of crazes, a mechanism for inhibiting propagation of crazes and breakage of crazes is also important to further enhance the impact strength.

The ABS resin has good moldability such as injection, extrusion or vacuum molding and also the resin is superior in rigidity and chemical resistance. Further, the resin can be freely colored by the light-shielding material and has good secondary processability such as painting, printing, hot stamping, vacuum evaporation or plating. A blend system of the ABS resin with other resins such as a polycarbonate resin or a polyvinyl chloride resin provides a group of products characteristic as an ABS alloy. The resin has a sole defect that the photographic properties are worsened and the weatherability is inferior, but this defect has been overcome as a result of investigations on addition of modifiers such as carbon black, fatty acid metal salt, an age resistor, an ultraviolet absorbent and an antioxidant and on the resin composition and the resin can be used in practice as an injection molded article for photographic photosensitive materials.

(2) Production Process

1) Graft Blending

A polybutadiene latex is reacted with acrylonitrile and styrene (AN/ST monomers) to produce an ABS resin having a high rubber content and thereto an AS copolymer resin which is separately prepared is blended to obtain a desired ABS resin. Recently, this graft blending method is employed in many cases.

2) Block·Suspension Polymerization

An uncrosslinked rubber is dissolved in an ST monomer to conduct preparatory block polymerization in the state of a rubber matrix and at the time when phase transition to the rubber dispersion state starts, graft reaction is effected in the suspension system to obtain an ABS resin. According to this method, it is difficult to produce an ABS resin having a high rubber content and therefore, a desired ABS resin may be produced by blending an ABS resin and an AS copolymer resin prepared by different methods.

3) Emulsification·Continuous Block Polymerization

To an ABS latex having a high rubber content produced by emulsification polymerization, AN/ST monomers and an electrolyte are added to mix therewith and a water content separated is removed to provide an ABS cram. To this ABS cram, AN/ST monomers are added to provide an ABS dope and then subjected to continuous block polymerization to obtain an ABS resin.

According to this method, the cost can be largely reduced because coagulation, water washing and drying of the ABS resin powder are not necessary.

3) Japanese Manufacturer and Trade Name at ABS Resin

| Manufacturer | Trade Name |
| --- | --- |
| Asahi Kasei Kogyo Kabushiki Kaisha | Stylac |
| Ube Saikon Co., Ltd. | Saikolac |
| Toray Co., Ltd. | Toyolac |
| Mitsubishi Rayon Co., Ltd. | Taflax |
| Nippon Synthetic Rubber Co., Ltd. | JSR ABS |
| Kyodo Polymer Co., Ltd. | Cevian |
| Mitsubishi Monsanto Co., Ltd. | Tablax |
| Sumitomo Norgatac Co., Ltd. | Kurarastec |
| Electro Chemical Industry Co., Ltd. | Denca |

The above-described acrylonitrile-styrene resin is described below.

(1) Molecular Structure and Characteristic Feature

The styrene is a representative vinyl monomer and therefore, has been investigated from the old on the copolymerizability with various monomers. On the other hand, among copolymer resins of the styrene with other comonomers, the transparent and highly rigid (without rubber enforcement) resin produced in an industrial scale is an acrylonitrile-styrene resin (AS resin).

The AS resin is usually produced by radical polymerization and has a molecular structure of typical radical copolymer resins different from that of a so-called rubber graft-modified copolymer resin such as high impact polystyrene resin belonging to a rubber-containing polystyrene resin. In case of AS resin, only with several % changes in its composition, the transparency is abruptly decreased and therefore, it is a point in production techniques how to keep the composition constant. For example, the AS resin exhibits an azeotropic composition at the styrene/acrylonitril molar ratio of 75/25, and AS resins in an industrial production mostly have an AN content of from 25 to 35% and a composition distribution of about ±1%.

A polar group or a bulky side chain is introduced by copolymerization to prevent internal rotation of the molecular chain and due to this effect, the acrylonitrile-styrene resin commonly exhibits excellent characteristics with respect to mechanical properties, heat durability and chemical resistance as compared with general-purpose homopolystyrene resins.

(2) Production Process

In the production of the above-described resin, in view of quality restriction and economical advantage, two processes, namely, block polymerization and suspension polymerization are industrially used.

Generally speaking, the block polymerization process is deficient in that the cost of equipment is high but due to no mixing of impurities, it is superior with respect to the quality stability and also deemed to have economical priority because of capability of continuous processing.

(3) Japanese Manufacturer and Trade Name of Acrylonitrile-Styrene Resin

TABLE 1

| Manufacturer | Trade Name |
| --- | --- |
| Asahi Kasei | Stylac-AS |
| Sun Polymer*[1] | Lytac-A |
| Mitsubishi Monsanto | Sunlex |
| Nova Polymer*[2] | Cevian-N |
| Shin Nippon Steel Chemical | Estylene-AS |
| Electro Chemical | Dencar-AS |
| Toray*[3] | Toyolac-FRTP |
| Nippon Synthetic Rubber | JSR-AS (up to September, 1985) |

*[1]Sold by Mitsui Toatsu Chemicals Inc.
*[2]Sold by Daicel Chemical Co.
*[3]Glass fiber-reinforced grade only is commercially available.

The above-described polystyrene-based resins also include AAS (ASA) resin and AES resin as explained below.
(1) Molecular Structure and Characteristic Feature
 1) Main Structure of AAS (ASA) Resin
 An acrylic rubber:

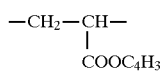

is partially graft copolymerized by an AS copolymer:

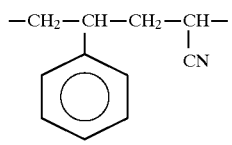

The acrylic rubber may have an acrylic ester such as ethyl acrylate as a monomer unit in addition to n-butyl acrylate. The ratio of styrene to acrylonitrile in the AS copolymer varies depending upon the desired grade in rigidity and impact strength.

2) Main Structure of AES Resin
 An EPDM rubber:

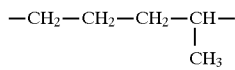

is partially graft copolymerized by an AS copolymer:

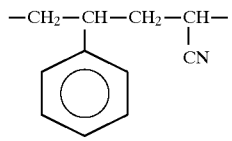

The ratio of styrene to acrylonitrile in the AS copolymer varies depending upon the desired grade.

The characteristic features are such that the weatherability and impact resistance are excellent and appearance of a molded article produced and moldability are good. The excellent impact resistance is ascribable to the fact that particles of acrylic rubber or EPDM rubber are dispersed in the resin and absorb impact energy. Also, the excellent weatherability is ascribable to the fact that these rubbers are outstandingly stable against deterioration due to ultraviolet light as compared with the butadiene rubber in an ABS resin.

(2) Production Process
 A general synthetic method is described below.
 1) AAS (ASA) Resin
 An n-butyl acrylate is emulsion polymerized by adding thereto several % of a crosslinking agent or grafting agent. The resulting rubber latex is graft copolymerized by adding thereto styrene and acrylonitrile. After the polymerization, the copolymer is salted out to obtain resin powder.
 2) AES Resin
 An EPDM rubber is dissolved in styrene, acrylonitrile and an organic solvent and graft copolymerized. After the polymerization, the solvent is removed to obtain resin powder.

(3) Japanese Manufacturer and Trade Name of AAS (ASA) Resin and AES Resin

TABLE 2

| Resin | Trade Name | Manufacturer |
| --- | --- | --- |
| AAS Resin | Pitacs | Hitachi Chemical |
|  | Dialac A | Mitsubishi Rayon |
|  | Wetherfil | Ube Saicon |
| AES Resin | JSRAES | Nippon Synthetic Rubber |
|  | Unibrite | Sumitomo Chemical-Sumitomo Norgatac |

The above-described polycarbonate resin is described below.

The polycarbonate resin is a generic term for polyesters formed by condensation of a divalent hydroxy compound and a carbonic acid and has various molecular structures. Accordingly, very many kinds of polycarbonate resins are present and on considering the photographic properties, injection moldability and physical strength, almost all of polycarbonate resins on the market at present can be used. The particularly preferred polycarbonate resin is a polycarbonate resin having a polycarbonate structure prepared from bisphenol A (4,4'-dihydroxydiphenyl-2,2-propane) by a solvent process (phosgene method) or a melting process (ester exchange).

The production process of the bisphenol A-type polycarbonate resin preferred in the present invention includes the following methods.

a. Melting process (ester exchange) using ester exchange reaction of a diester of carbonic acid obtained from a monofunctional aromatic or aliphatic hydroxyl compound with a dihydroxy compound
 b. Solvent process (phosgene method) using reaction of a dihydroxy compound with phosgene in the presence of an acid binder. The production process according to this solvent process is roughly classified into the following three methods.
  1) Method where phosgene is blown into a pyridine solution having dissolved therein bisphenol A.
  2) Method where benzene, toluene, chlorobenzene, dioxane, methylene chloride or trichloroethylene is used as a solvent and the pyridine used in method 1) above is used only as an acid binder and a catalyst because the pyridine is very expensive.
  3) Method where the pyridine as a hydrochloric acid binder in method 2) above is replaced by an aqueous alkali solution.

Representative manufacturers and trade names of the polycarbonate resin produced by the above-described methods are sets forth below.

TABLE 3

| Country | Manufacturer | Trade Name |
|---|---|---|
| Japan | Mitsubishi Gas Chemical | Yupilon |
|  | Teijin | Panlite |
|  | Mitsubishi Chemical (EPL) | Lepanox |
|  |  | Lexan |
|  | (Idemitsu Petrochemical) | Idemitsu Polycarbonate |
| U.S.A. | GE | Lexan |
|  | MOBAY | Maron |
| W. Germany | BAYER | Macrolon |
| Netherlands | GE.Netherlands | Lexan |
| Italy | ANIC | Sinpet |

Since the polycarbonate resin comprises ester bonds in its main chain, when the resin temperature is elevated or the resin has a high water content, it undergoes hydrolysis together with the water upon heating to cause reduction in the molecular weight or generation of silver streaks or bubbles. Accordingly, the polycarbonate resin is preparatorily dried so as to reduce the water content in the polycarbonate resin pellet to 0.07% or less, preferably 0.06% or less, more preferably 0.05% or less and most preferably 0.04% or less. The temperature at injection molding of the polycarbonate resin is set to 340° C. or lower, preferably 330° C. or lower, more preferably 320° C. or lower and most preferably from 270° to 310° C.

In order to provide good flowability in a mold to the polycarbonate resin composition to reduce generation of weld lines and to improve the physical strength, the molten resin is preferably injection charged by setting the wall face temperature of the core-cavity part to from 70° to 200° C., preferably from 80° to 180° C., more preferably from 90° to 160° C. and when the wall face temperature of the core-cavity part becomes lower than the glass transition temperature of the polycarbonate resin, the injection molded article is taken out.

In order to avoid deterioration in injection moldability while keeping abrasion resistance, the polycarbonate resin preferably has a molecular weight of from 15,000 to 50,000, more preferably from 18,000 to 40,000, most preferably from 20,000 to 30,000. With respect to the physical properties of the polycarbonate resin, the melt flow rate is measured according to ASTM D 1238-88, Condition O (test temperature: 300° C., test load: 1.2 kg), the flexural modulus of elasticity is according to JIS K 7203, the heat deformation temperature is according to ASTM D 648 (load: 18.6 kg/cm$^2$), the Izod impact strength is according to JIS K 7110 and the Rockwell hardness is according to ASTM D 786 (M scale).

The noncrystalline resin composition constituting the injection molded article for photographic photosensitive materials of the present invention may contain, in addition to the noncrystalline resin, one or more of an ethylene copolymer resin, a thermoplastic elastomer (a kind of a rubbery material and included in the rubbery material of the present invention), a compatibilizer and an acid-modified polyolefin resin, as a modifier resin. By containing these substances, dispersibility of the light-shielding material, injection moldability, photographic properties and impact resistance strength can be improved. In particular, since the ABS resin is inferior in dispersibility of the light-shielding material and injection moldability, it is preferred in case of the ABS resin to add one selected from the above-described modifier resins.

The noncrystalline resin composition contains one or more of an ethylene copolymer resin, a thermoplastic elastomer (a kind of a rubbery material), a compatibilizer and an acid-modified polyolefin resin, as a modifier resin, in an amount of from 0.1 to 45 wt %, preferably from 1 to 40 wt %, more preferably from 5 to 35 wt %, most preferably from 7 to 30 wt %. If the content thereof is less than 0.1 wt %, almost no effect is provided on the improvement in dispersibility of the light-shielding material, injection moldability and impact resistance strength but only the cost for kneading is increased, whereas if it exceeds 45 wt %, deterioration in properties of the noncrystalline resin is caused such as reduction in rigidity or worsening of kneading operability.

Representative examples of the ethylene copolymer resin which is cheap and high in the modification effect among the above-described modifier resins are described below.
(1) Ethylene-vinyl acetate copolymer resin (hereinafter referred to a "EVA resin")
(2) Ethylene-propylene copolymer resin
(3) Ethylene-1-butene copolymer resin
(4) Ethylene-butadiene copolymer resin
(5) Ethylene-vinyl chloride copolymer resin
(6) Ethylene-methyl methacrylate copolymer resin (hereinafter referred to as an "EMM resin")
(7) Ethylene-methyl acrylate copolymer resin (hereinafter referred to as an "EMA resin")
(8) Ethylene-ethyl acrylate copolymer resin (hereinafter referred to as an "EEA resin")
(9) Ethylene-acrylonitrile copolymer resin
(10) Ethylene-acrylic acid copolymer resin (hereinafter referred to as an "EAA resin")
(11) Ionomer resin (a resin obtained by crosslinking a copolymer of ethylene with an unsaturated acid by a metal such as zinc)
(12) Ethylene-α-olefin copolymer resin (hereinafter referred to as an "L-LDPE resin")
(13) Ethylene-propylene-butene-1 ternary copolymer resin
(14) Ethylene-propylene elastomer The above-described L-LDPE (Linear Low Density Poly-ethylene) resin is called a third polyethylene resin and the resin is favored with advantages of a middle-low density polyethylene resin and also of high density polyethylene resin, capable of meeting requirements at the current times such as energy saving and resource saving, produced at a low cost and high in strength. This resin is a copolymer obtained by copolymerizing ethylene with α-olefin having from 3 to 13 carbon atoms, preferably from 4 to 10 carbon atoms by a low pressure process or a high pressure modified process and it is a polyethylene resin having such a structure that the linear straight chain has short branches. Preferred α-olefins from the standpoint of physical strength and cost are butene-1, octene-1, hexene-1, 4-methylpentene-1, heptene-1 and decene-1. The density (according to ASTM D-1505) thereof is generally close to that of the low/middle density polyethylene resin but in the present invention, it is preferably from 0.87 to 0.98 g/cm$^3$, more preferably from 0.88 to 0.96 g/cm$^3$. The melt flow rate (according to ASTM D-1238, E Condition) is preferably from 0.1 to 80 g/10 min, more preferably from 0.3 to 60 g/10 min. The polymerization process of the L-LDPE resin may be a gas phase process, solution process or liquid phase slurry process using a middle-low pressure apparatus or an ion polymerization using an apparatus for the high pressure modified process.

Specific examples of commercially available L-LDPE resins are described below:

| Ethylene.butene-1 Copolymer Resin | |
|---|---|
| G Resin and NUC-FLX | (UCC) |
| Dowlex | (Dow Chemical) |
| Sqlare | (Du Pont Canada) |
| Marlex | (Phillips) |
| Stamilex | (DSM) |
| Excellen VL | (Sumitomo Chemical) |
| Neozex | (Mitsui Petrochemical) |
| Mitsubishi Polyeth-LL | (Mitsubishi Oil) |
| Nisseki Linilex | (Nippon Oil) |
| NUC Polyethylene-LL | (Nippon Unicar) |
| Idemitsu Polyethylene L | (Idemitsu Petrochemical) |
| Ethylene.hexene-1 Copolymer Resin | |
| TUFLIN | (UCC) |
| TUFTHENE | (Nippon Unicar) |
| Ethylene.4-methylpentene-1 Copolymer Resin | |
| Ultzex | (Mitsui Petrochemical) |
| Ethylene.octene-1 Copolymer Resin | |
| Stamilex | (DSM) |
| Dowlex | (Dow Chemical) |
| Squlare | (Du Pont Canada) |
| MORETEC | (Idemitsu Petrochemical) |

Among these L-LDPE resins, preferred in view of physical strength, heat seal strength and film forming property are those having a MFR (measured according to ASTM D-1238 Condition E or JIS K-7210 Condition 4 at a test temperature of 190° C. and under a test load of 2.16 kgf) of from 0.1 to 10 g/10 min, preferably from 0.2 to 7 g/10 min, more preferably from 0.3 to 5 g/10 min, and a density (determined according to JIS K-6760 or ASTM D-1505) of from 0.870 to 0.950 g/cm$^3$, preferably from 0.880 to 0.940 g/cm$^3$, more preferably from 0.890 to 0.930 g/cm$^3$, with an α-olefin having from 3 to 12 carbon atoms, preferably from 4 to 10 carbon atoms, more preferably from 6 to 8 carbon atoms and preferably obtained by a liquid phase slurry process or a gas phase process. In the case of injection molding, particularly preferred in view of balance between the improvement in physical strength and the injection moldability are those having an MFR (measured according to ASTM D-1238 Condition E or JIS K-7210 Condition 4 at a test temperature of 190° C. and under a test load of 2.16 kgf) of from 2 to 80 g/10 min, preferably from 5 to 70 g/10 min, more preferably from 7 to 60 g/10 min, and a density (measured according to JIS K-6760 or ASTM D-1505) of from 0.890 to 0.980 g/cm$^3$, preferably from 0.900 to 0.970 g/cm$^3$, more preferably from 0.915 to 0.965 g/cm$^3$, with an α-olefin having from 3 to 8 carbon atoms and obtained by a liquid phase slurry process or a gas phase process.

In the polymerization of the above-described ethylene·α-olefin copolymer resin, various catalysts are used and the catalyst contained in the ethylene·α-olefin copolymer resin as a residue acts harmfully in various manner such that it adversely affects photographic properties of a photographic photosensitive material, it corrodes the molding machine or it corrodes the aluminum powder (inclusive of aluminum paste), therefore, in order to prevent such harmful actions, one or more of various fatty acid metal salts described below are added in an amount of from 0.005 to 10.0 wt %, preferably from 0.01 to 5.0 wt %, more preferably from 0.02 to 3.0 wt %, most preferably from 0.03 to 1.0 wt %. When one or more of various fatty acid metal salts are used in combination with one more of hydrotalcite compounds, the above-described prevention effect can be exerted synergistically.

An ultralow density linear low-density polyethylene resin having a density of less than 0.910 g/cm$^3$, which has been sold recently, is a thermoplastic resin having excellent moldability, which is a copolymer resin of ethylene and α-olefin. The resin has an α-olefin content of 5 mol % or more which is larger than that of the L-LDPE resin and thereby the density is rendered low. In order to ensure the physical strength and moldability, the MFR (measured according to ASTM D-1238 Condition E) is from 8.1 to 30 g/10 min, preferably from 0.2 to 20 g/10 min, the density (measured according to ASTM D-1505) is from 0.850 to 0.909 g/cm$^3$, preferably from 0.870 to 0.905 g/cm$^3$, and the molecular weight distribution (measured by GPC) is from 1.1 to 10, preferably from 1.5 to 7. Representative examples of commercially available products include NUC-FLX produced by UCC Co., Ltd. and Excellen VL produced by Sumitomo Chemical Co., Ltd. The ultralow density linear low-density polyethylene resin is preferred because it improves dispersibility of the light-shielding material such as carbon black or aluminum powder and increases physical strength of the injection molded article for photographic photosensitive materials without causing any bad effect on photographic properties of a photographic photosensitive material (the above-described products of two companies each uses butene-1 as α-olefin).

A thermoplastic elastomer as one of the above-described rubbery materials of the present invention will be described below.

The thermoplastic elastomer (hereinafter referred to as TPE) has various chemical structures roughly classified into a styrene series (hereinafter referred as SBC), an ester series (hereinafter referred to as TPEE), an olefin series (hereinafter referred to as TPO), a vinyl chloride series (hereinafter referred to as TPVC), an amide series (hereinafter referred to TPAE), a crystalline 1,2-polybutadiene series (hereinafter referred to as RB), an ionomer series, a fluorine series (hereinafter referred to as F-TPE), a urethane series (hereinafter referred to as TPU) and an isoprene series. Representative TPEs on the market are shown below.

TABLE 4

Class and Manufacturer of Principal TPEs

| Class | Hard Phase | Soft Phase | Manufacturer | Trade Name |
|---|---|---|---|---|
| Styrene-based TPE (SBC) | PS | BR or IR | Shell Chemical | Kraton, Cariflex TR |
| | | | Phillips Petroleum | Solprene |
| | | | ANIC | Europrene SOLT |
| | | | Asahi Kasei | Toughprene |
| | | | Nippon Elastomer | Sorprene-T |
| | | | Japan Synthetic Rubber | JsR TR |
| | | | Electric Chemical | Denka STR |
| | | | Nippon Zeon | |
| | | Hydrogenated BR | Shell Chemical | Kraton G |

TABLE 4-continued

Class and Manufacturer of Principal TPEs

| Class | Hard Phase | Soft Phase | Manufacturer | Trade Name |
|---|---|---|---|---|
| Polyolefin-based TPE (TPO) *1 | PE or PP | 11R or EPDM | Sumitomo Chemical<br>Mitsui Petrochemical<br>Japan Synthetic Rubber,<br>Mitsubishi Petrochemical<br>Monsanto (Mitsubishi Monsanto)<br>Nippon Petrochemical | Sumitomo TPE<br>Milastomer<br>JSR-Thermolan,<br>Yuka-Thermolan<br>Santoprene<br><br>Softlex |
| PVC-based TPE (TPVC) | Crystalline PVC, etc. | Noncrystalline PVC | Sumitomo Berklite<br>Mitubishi Chemical Vinyl<br>Electric Chemical<br>Shin-Etsu Polymer<br>Chisso<br>Toagosei<br>E. I. Du Pont de Nemours | Sumiflex<br>Sanprene<br>Vinicon R<br>EZ-800<br>Elaslit<br>Allonelast<br>Alerya |
| Urethane-based TPE (TPU) *1 | urethane structure | polyester or polyether | M. D. Chemical<br>Nippon Elastran<br>Nippon Polyurethane<br>Dai-Nippon Ink<br>Takeda Pharmaceutical<br>Nippon Oil Seal<br>Dai'niehi Seika<br>Mitsui-Nitto Urethane | Pelecene<br>Elastran<br>Paraprene<br>Bandex<br>Takelac<br>Ironrubber<br>Lesamine<br>Hyprene |
| Ester-based TPE (TEEE) | polyester | polyether | E. I. Du Pont de Nemours (*)<br>Akzo Chemie (Dai-Nippon Ink)<br>Toyobo<br>General Electric (EPL) | Hytrel *Toray-Du Pont<br>Arnitel<br>Perpurene<br>Lomod |
| Amide-based TPE (TPAE) | polyamide | polyether or polyester | Hüls (Dicel Hüls)<br><br>ATOCHEM (Toray)<br>Ems (Dai-Nippon Ink) | Vestamid (Diamid-PAE)<br>PEBAX<br>Glylax A |
| Other TPEs | syndiotactic 1.2 BR | noncrystalline BR | Japan Synthetic Rubber | JSR RB |
| | trans-1,4-IR | noncrystalline IR | Polysar<br>Kraray Isoprene Chemical | TRANS-PIP<br>Trans-Polyisoprene |
| | metal carboxylate ion craster | noncrystalline PE | E. I. DuPont de Nemours<br>Mitsui-DuPont Polychemical | Surlyn A<br>Himilan |
| | crystalline polyethylene | EVA or EEA | Toso, Mitsui-Du Pont Polychemical, Nippon Unicar, Asahi Chemical, Sumitomo Chemical, Mitsubishi Petrochemical | *2 |
| | crystalline polyethylene | chlorinated polyethylene | Showa Petrochemical<br>Osaka Soda<br>Dow Chemical | Elaslene<br>Disolac<br>Dow-CPF |
| | fluororesin | fluororubber | Daikin | Dielthermoplastic |

*1 Foreign manufacturers are not described for olefin-based and urethane-based TPEs.
*2 The companies in parenthesis are importing and selling companies.

The compatibilizer is described below.

The compatibilizer commonly means a material of compatibilizing a plurality of resins when a new property or ability that the sole thermoplastic resin does not have is intended to achieve. Examples of the paired resins include thermoplastic resins of the same kind but different in properties; two or more thermoplastic resins; a recycled thermoplastic resin and a virgin thermoplastic resin (a resin experienced no use in a molded article, in other words, a resin used as a molded article for the first time); a masterbatch thermoplastic resin having compounded therein a light-shielding material at a high concentration and a thermoplastic resin for dilution (a resin lower in the concentration of light-shielding material than the other resin to be blended with or containing no light-shielding material, hereinafter the same); and a combination of these pairs.

The compatibilizing agent includes a non-reactive compatibilizing agent and a reactive compatibilizing agent. Specific examples of representative compatibilizing agents include the following:

Representative Examples of Non-Reactive Compatibilizing Agent

Styrene-ethylene-butadiene block copolymer resin
Polyethylene-polystyrene graft copolymer resin
Polyethylene-polymethyl methacrylate graft copolymer resin
Polyethylene-polymethyl methacrylate block copolymer resin
Ethylene-propylene-diene copolymer resin
Ethylene-propylene copolymer resin
Polystyrene-low-density homopolyethylene graft copolymer resin
Polystyrene-high-density homopolyethylene graft copolymer resin
Hydrogenated styrene-butadiene copolymer resin
Styrene-ethylene, butadiene-styrene copolymer resin
Styrene-butadiene-styrene copolymer resin
Chlorinated polyethylene resin
Polypropylene-polyamide graft copolymer resin
Polypropylene-ethylene-propylene-diene copolymer resin Polystyrene-polyethyl acrylate graft copolymer resin
Polystyrene-polybutadiene graft copolymer resin
Polystyrene-polymethyl methacrylate block copolymer resin Representative Examples of Reactive Compatibilizing Agent Maleic anhydride modified ethylene-propylene copolymer resin
Maleic anhydride modified styrene graft copolymer resin
Maleic anhydride modified styrene-butadiene-styrene copolymer resin
Maleic anhydride modified styrene-ethylene-butadiene-styrene copolymer resin
Ethylene-glycidyl methacrylate copolymer resin
Ethylene-glycidyl methacrylate-styrene graft copolymer resin
Ethylene-glycidyl methacrylate-methyl methacrylate graft copolymer resin
Maleic anhydride graft polypropylene copolymer resin Representative examples of compatibilizing agents commercially available at home and abroad are shown in Table 5 below.

TABLE 5

| Manufacturer | Trade Name | Composition |
| --- | --- | --- |
| Shell | Kroton G | hydrogenated SBS, hydrogenated SEBS and maleate |
| Uniroyal | Royaltuf | EPDM.styrene graft copolymer resin, maleic EPDM, EPDM.acrylonitrile copolymer resin |
| Nippon Oils & Fats | Modiper | block or graft copolymer of two kinds of resins |
| Rhom and Haas | paraloid | maleic EPDM, core.shell type block copolymer resin |
| Toagosei | Reseda | styrene.methyl methacrylate graft copolymer resin |
| Sumitomo Chemical | Bondfast | ethylene.glycidyl methacrylate copolymer resin |
| EXXon Chem | EXXelor | maleic EPDM |
| Asahi Chemical | Toughtec | SBS, SEBS and maleate thereof |
| High Tech Plastics | Bennet | EVA.EPDM.polyolefin graft copolymer resin |
| ARCO | Dylark | styrene.maleic anhydride copolymer resin |
| Nippon Petrochemicals | Lexpearl | ethylene.glycidyl methacrylate copolymer resin |
| Mitsubishi Petrochemical | VMX | impregnation polymer of 50 parts of EVA with 50 parts of styrene |

SBS: styrene-butadiene-styrene copolymer resin SEBS: styrene-ethylene-butadiene-styrene copolymer resin
EPDM: ethylene-propylene-diene copolymer resin
EVA: ethylene-vinyl acetate copolymer resin The above-described acid-modified polyolefin resin is described below.

The acid-modified polyolefin resin is a modified polyolefin resin obtained by graft-modifying a polyolefin resin and an unsaturated carboxylic acid, and examples thereof include a graft-modified polyethylene resin, a graft-modified polypropylene resin and a graft-modified ethylenic copolymer resin (e.g., EVA resin, EEA resin, L-LDPE resin, EMA resin).

The unsaturated carboxylic acid subjected to graft modification with a polyolefin resin includes its derivatives, and representative examples thereof include an acrylic acid, a methacrylic acid, a maleic acid, a fumaric acid, an itaconic acid, a tetrahydrophthalic acid, a mesaconic acid, an angelic acid, a citraconic acid, a chrotonic acid, an isochrotonic acid, a nagic acid, (endo-cis-bicyclo[2,2,1]hepto-5-ene-2,3-dicarboxylic acid), maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, diethyl itaconate, acrylic amide, methacrylic amide, maleic monoamide, maleic diamide, maleic-N-monoethylamide, maleic-N,N-diethylamide, maleic-N-monobutylamide, maleic-N,N-dibutylamide, fumaric monoamide, fumaric diamide, fumaric-N-monoethylamide, fumaric-N,N-diethylamide, fumaric-N-monobutylamide, fumaric-N,N-diethylamide, fumaric-N-monobutylamide, fumaric-N,N-dibutylamide, maleimide, monomethyl maleate, dimethyl maleate, potassium methacrylate, sodium acrylate, zinc acrylate, magnesium acrylate, calcium acrylate, sodium methacrylate, potassium acrylate, potassium methacrylate, N-butylmaleimide, N-phenylmaleimide, malenyl chloride, glycidyl maleate, dipropyl maleate, aconitic anhydride and sorbic acid. These may be use in combination with each other.

Among these, preferred are acrylic acid, maleic acid, maleic anhydride and nagic acid, more preferred is maleic anhydride.

The method for graft-modifying the unsaturated carboxylic acid for the modified polyolefin resin is not particularly restricted. Examples of the method include reaction in a fusion state described in JP-B-43-27421 (the term "JP-B" as used herein means an "examined Japanese patent publication"), reaction in a solution state described in JP-B-44-15422, reaction in a slurry state described in JP-B-43-18144 and reaction in a gas phase state described in JP-B-50-77493.

Among these methods, a melt-kneading method using an extruding machine is preferred because the operation is simple and the cost is low.

The unsaturated carboxylic acid is used in an amount of from 0.01 to 20 parts by weight, preferably from 0.2 to 5 parts by weight per 100 parts by weight of the polyolef in resin base polymer (e.g., various polyethylene resins, various polypropylene resins, various polyolef in copolymer resins, polybutene-1 resins, α-olef in copolymer resins such as poly-4-methylpentene-1 or its copolymer resin) so as to ensure the adhesive strength.

In order to accelerate the reaction between a polyolefin resin and an unsaturated carboxylic acid, an organic peroxide is used.

Examples of the organic peroxide include an organic peroxide such as benzoyl peroxide, lauroyl peroxide, azobisisobutylonitrile, dicumyl peroxide, α,α'-bis(t-butylperoxydipropyl)benzene, 2,5-dimethyl-2,5-di(t-butyl-peroxy)hexane, 2,5-dimethyl-2,5-di(t-butylperoxy)hexine, di-t-butyl peroxide, cumene hydroperoxide, t-butyl-hydroperoxide, dicumyl peroxide, t-butylperoxy laurate, t-butylperoxy benzoate, 1,3-bis(t-butyl-peroxyisopropyl)benzene, cumene hydroperoxide, di-t-butyl-diperoxy phthalate, t-butylperoxy maleate and isopropyl percarbonate, an azo compound such as azobisisobutyronitrile and an inorganic peroxide such as ammonium persulfate.

These may be used individually or in combination of two or more thereof. More preferred are di-t-butyl peroxide, dicumyl peroxide, 2,5-dimethyl-2,5-di-(t-butylperoxy)hexane, 2,5-dimethyl-2,5-di-(t-butylperoxy)hexine and 1,3-bis(t-butyl-peroxyisopropyl)benzene, each having a decomposition temperature between 170° C. and 200° C.

The addition amount of the peroxide is not particularly limited but it is usually from 0.005 to 5 parts by weight, preferably from 0.01 to 1 part by weight per 100 parts by weight of the polyolefin resin.

Representative examples of commercially available acid-modified polyolefin resins are described below:

| (1) | Nippon Petrochemical Co., Ltd. | "N Polymer" |
|---|---|---|
| (2) | Mitsui Petrochemical Industries, Ltd. | "ADMER" |
| (3) | Showa Denko KK | "ER RESIN" |
| (4) | Mitsubishi Chemical Industries, Ltd. | "NOVATEC-AP" |
| (5) | Mitsubishi Petrochemical Co., Ltd. | "MODIC" |
| (6) | Nippon Unicar KK | "NUC-ACE" |
| (7) | Ube Industries, Ltd. | "UBE BOND" |
| (8) | TOSO Corporation | "RUCENE M" |
| (9) | Sumitomo Chemical Co., Ltd. | "BONDAIN" |
| (10) | Mitsui.Du Pont Chemical KK | "CMPS", etc. |
| (11) | Exxon Co., Ltd. | "DEXON" |
| (12) | Toa Nenryo Kogyo KK | "HA"series |
| (13) | Mitsui Toatsu Chemicals Inc. | "MITSUI LONPLY", etc. |

The acid-modified polyolefin resin can uniformly disperse a light-shielding material such as carbon black or aluminum powder or a fibrous filler contained in the injection molded article for photographic photosensitive materials, can reduce the occurrence of microgrids and can improve the physical strength of the injection molded article.

The above-described low molecular polyolefin resin is a linear or branched low molecular polyethylene or polypropylene resin having a weight average molecular weight of approximately from 1,000 to 20,000 and when it is used in combination with a metal salt of a higher fatty acid such as calcium stearate, magnesium stearate, zinc stearate, sodium stearate, calcium palmitate or magnesium palmitate, dispersibility of the light-shielding material, flowability of the resin composition and mold releasability are improved and also lubricity is elevated.

In particular, a low molecular polyethylene resin less branched and having a density of from 0.92 to 0.97 g/cm$^3$ and a weight average molecular weight of from 3,000 to 10,000 and a low molecular polypropylene resin having a density of from 0.89 to 0.92 g/cm$^3$ and a weight average molecular weight of from 3,000 to 10,000 are preferred.

If the weight average molecular weight is less than 1,000, the heat durability lowers and the bleeding-out readily occurs, whereas if the weight average molecular weight exceeds 20,000, the physical strength lowers.

Further, in view of reclamation treatment as wastes, degradable plastics may be used as a noncrystalline resin or a crystalline resin, which are now under investigations and partly introduced into the market. For example, "BIOPOL" produced by U.S. ICI or "Polycaprolactone" produced by U.S. UCC may be used as a polymer having biodegradability or polymers capable of indirect collapse by compounding thereto a natural or synthetic polymer susceptible to biogradation as an additive or starch-compounded polyethylene resins may also be used.

In particular, "Bionol" (a special polyester-based resin chemically synthesized from dicarboxylic acid or the like) produced by Showa Polymer K.K. and sold as a chemically synthesized biodegradable plastic which is cheap and decomposes into carbon dioxide and water due to the action of microorganisms or "Matabie" (a polymer alloy comprising maize starch and a modified polyvinyl alcohol having biodegradability) produced by Novamont, Italy, is preferably incorporated into the resin composition for a molded article of the present invention in an amount of 10 wt % or more in view of improvement in industrial waste treatment.

In case of the multi-layered molded article, the layer free of direct contact with the photographic photosensitive material does not adversely affect photographic properties and therefore, it is particularly preferred to incorporate the above-described biodegradable plastic thereinto in an amount of 50 wt % or more in view of improvement in industrial waste treatment.

A photolytic polymer may also be used. For example, at polymerization of the polyethylene resin, an ECO copolymer resulting from copolymerization of ethylene having incorporated in the main chain thereof a carbonyl group as a photosensitizing group with carbon monoxide may be used or a polymer imparted with photolytic property by adding additives such as a transition metal salt, an oxidation accelerator or a photosensitizing material to the base polymer may be used.

Furthermore, one or more degradable polymers such as a polymer having biogradability, a photolytic polymer or a water-soluble polymer may be used in combination (see, JP-A-3-129341).

In view of recycling, the injection molded article for photographic photosensitive materials is constituted by the same or analogous resin compositions. For example, the patrone body, spool and label with prints constituting a resin-made patrone for photographic film all are preferably made of a styrene based resin or the spool, upper and lower cases of a film unit with a lens all are preferably made of a styrene-based resin having perfect light-shielding ability because of capability of recycling.

Further, in view of reclamation treatment as wastes, degradable plastics may be used which are now under investigations and partly introduced into the market. For example, "BIOPOL" produced by U.S. ICI or "Polycaprolactone" produced by U.S. UCC may be used as a polymer having biodegradability or polymers capable of indirect collapse by compounding thereto a natural or synthetic polymer susceptible to biogradation as an additive or starch-compounded polyethylene resins may also be used.

In particular, "Bionol" (a special polyester-based resin chemically synthesized from dicarboxylic acid or the like) produced by Showa Polymer K.K. and sold as a chemically synthesized biodegradable plastic which is cheap and decomposes into carbon dioxide and water due to the action of microorganisms or "Matabie" (a polymer alloy comprising maize starch and a modified polyvinyl alcohol having biodegradability) produced by Novamont, Italy, is preferably incorporated into the resin composition for a molded article of the present invention in an amount of 10 wt % or more in view of improvement in industrial waste treatment.

In case of the multi-layered molded article, the layer free of direct contact with the photographic photosensitive material preferably contains the above-described biodegradable plastic in an amount of 50 wt % or more in view of improvement in industrial waste treatment without causing no adverse effect on photographic properties of a photographic photosensitive material.

A photolytic polymer may also be used. For example, at polymerization of polyethylene, an ECO copolymer resulting from copolymerization of ethylene having incorporated in the main chain thereof a carbonyl group as a photosensitizing group with carbon monoxide may be used or a polymer imparted with photolytic property by adding additives such as a transition metal salt, an oxidation accelerator or a photosensitizing material to the base polymer may be used.

Furthermore, one or more degradable polymers such as a polymer having biogradability, a photolytic polymer or a water-soluble polymer may be used in combination (see, JP-A-3-129341).

The injection molded article for photographic photosensitive materials of the present invention may contain one or more of a light-shielding material and a fibrous or nonfibrous filler. By incorporating one or more of a light-shielding material and a fibrous or non-fibrous filler, dimensional accuracy, rigidity, abrasion resistance, heat durability, cold resistance, impact resistance and flaw resistance can be ensured even for a camera body or a sheet photographic film photographing holder which is repeatedly used for several years in severe conditions such as a low temperature environment lower than the freezing point or a high temperature environment such as under sunlight in midsummer or in the tropical zone.

The noncrystalline resin composition contains one or more of a light-shielding material and a fibrous or non-fibrous filler in an amount of from 0.01 to 49.9 wt %, preferably from 0.05 to 30 wt %, more preferably from 0.1 to 20 wt %. If the content is less than 0.01 wt %, the light-shielding property cannot be achieved but only the cost for kneading is increased. If the content exceeds 49.9 wt %, dispersibility is worsened and generation of microgrids (coagulated impurities) increases to cause a large number of silver streaks or to reduce the physical strength to an extreme extent and as a result, the practical use of the article becomes difficult.

The injection molded article for photographic photosensitive materials of the present invention preferably contains a light-shielding material so as to ensure the light-shielding property, to improve the printing aptitude, to cut off X ray, to shut off heat, to adsorb a gas which harmfully acts on photographic properties of a photographic photo-sensitive material to eliminate the harm, to prevent electric charge or to improve physical strength.

Representative examples of the light-shielding material are shown below.

(1) Inorganic Compound

A. Oxide:

silica, diatomaceous earth, alumina, titanium oxide, iron oxide, zinc oxide, magnesium oxide, antimony oxide, barium ferrite, strontium ferrite, beryllium oxide, pumice, pumice balloon, alumina fiber, etc.

B. Hydroxide:

aluminum hydroxide, magnesium hydroxide, basic magnesium carbonate, etc.

C. Carbonate:

calcium carbonate, magnesium carbonate, dolomite, dawsonite, etc.

D. Sulfate, sulfite:

calcium sulfate, barium sulfate, ammonium sulfate, calcium sulfite, etc.

E. Silicate:

talc, clay, mica, asbestos, glass fiber, glass baloon, brass bead, calcium silicate, montomorillonite, bentonite, etc.

F. Carbon:

carbon black, graphite, carbon fiber, carbon hollow bead, etc.

G. Others:

iron powder, copper powder, lead powder, tin powder, stainless steel powder, pearl pigment, aluminum powder, molybdenum sulfide, zeolite, poron fiber, silicon carbide fiber, brass fiber, potassium titanate, lead titanate zirconate, zinc borate, barium metaborate, calcium borate, sodium borate, aluminum paste, etc.

An injection molded article for photographic photosensitive materials containing one or more light-shielding materials selected from the above-described inorganic compounds is preferred because heat durability and light-shielding ability favored with good photographic properties are ensured. In this point of view, among the above-described inorganic compounds, preferred are inorganic compound-based light-shielding materials having a specific gravity of from 1.5 to 8.0, a hardness (Mohs' hardness) of from 1.0 to 9.5, a pH of from 4.5 to 9.5, a heat durability of 100° C. or higher, an average particle size of 10 μm or less, a refractive index of 1.50 or more and a DBP absorption number of 10 ml/100 g or more, more preferred are inorganic compound-based light-shielding materials having a specific gravity of from 1.7 to 6.0, a hardness of from 1.2 to 7.0, a pH of from 5.5 to 8.5, a heat durability of 110° C. or higher, an average particle size of 8 μm or less, a refractive index of 1.55 or more and a DBP absorption number of 15 ml/100 g or more.

(2) Organic Compound

Wood flour (pine, oak, sawdust), husk fiber (almond, peanut, chaff), various colored fibers such as cotton, jute, paper strip and cellophane strip, nylon fiber, polypropylene fiber, starch (inclusive of modified starch, surface-treated starch), aromatic polyamide fiber.

Among these light-shielding materials, various carbon blacks are preferred because they adsorb gas having a harmful action on photographic properties of a photographic photosensitive material to eliminate the harm, prevent oxidation or adsorb a lubricant or a surface active agent onto the surface thereof to reduce the bleeding-out amount.

Representative examples of preferred carbon blacks on the market include Carbon Black #20(B), #30(B), #33(B), #40(B), #41(B), #44(B), #45(B), #50, #55, #100, #600, #950, #1000, #2200(B), #2400(B), MA8, MA11 and MA100, all produced by Mitsubishi Chemical Co., Ltd. Examples of overseas products include Black Pearls 2, 46, 70, 71, 74, 80, 81 and 607, Regal 300, 330, 400, 660, 991 and SRF-S, Vulcan 3 and 6, Sterling 10, SO, V, S, FT-FF and MT-FF, all produced by Cabot Co., and United R, BB, 15, 102, 3001, 3004, 3006, 3007, 3008, 3009, 3011, 3012, XC-3016, XC-3017 and 3020, all produced by Ashland Chemical Co. However, the carbon black is by no means limited to these examples.

By incorporating carbon black, the antistatic property, the blocking preventive property and the light-shielding property can be achieved without scarcely causing reduction in the physical strength, generation of lumps or adverse effect on photographic properties of a photographic photosensitive material and good quality can be ensured.

The content of carbon black is preferably from 0.01 to 49.9 wt %, more preferably from 0.05 to 30 wt %, most preferably from 0.1 to 20 wt %. If the content is less than 0.01 wt %, the antistatic property, the blocking preventive property and the light-shielding property cannot be achieved but only the cost for kneading increases. If the content exceeds 49.9 wt %, the moisture absorption amount increases not only to cause bubbling at the molding or readily generate pinholes or silver streaks but also to remarkably reduce the physical property and as a result, the practical use becomes difficult.

The carbon black is classified in terms of its raw material into gas black, furnace black, channel black, anthracene black, acetylene black, ketchen carbon black, thermal black, lamp black, soot, pine black, animal black and vegetable black. In the present invention, for the purpose of ensuring the light-shielding property, reducing the cost, improving the physical strength and being freed of adverse effects on photographic properties, furnace carbon black is preferred, and although expensive, as the light-shielding material having an antistatic effect, acetylene carbon black, electroconductive carbon black, graphite and ketchen carbon black as a modification by-product carbon black are preferred. If desired, the former and the latter are preferably mixed according to the property required.

On use in the injection molded article for photographic photosensitive materials of the present invention, preferred among carbon blacks are those having a pH (measured according to JIS K 6221) of from 6.0 to 9.0, preferably from 6.5 to 8.5, and an average particle size (measured through an electron microscope) of from 10 to 120 m$\mu$, preferably from 12 to 70 m$\mu$, and further preferred among these is furnace carbon black having a volatile component (measured according to JIS K 6221) of 3.5% or less, most preferably 1.5% or less and a DBP absorption number (measured by Oil Absorption A Method of JIS K 6221) of 50 ml/100 g or more, most preferably 70 ml/100 g or more, because the photographic photosensitive material is not fogged, the photosensitivity is increased or reduced to a small degree, the light-shielding ability is large, lumps (grains) of carbon black or fisheyes are not generated even when the carbon black is added to a polyolefin resin injection molded article, a polystyrene resin injection molded article or an L-LDPE resin film, or pinholes are hardly generated in the injection molded article or light-shielding film.

The channel carbon black is not preferred because it is expensive, acidic as having a pH of around 3, mostly has a volatile component exceeding 5.0% and causes in many cases fogging or abnormal photosensitivity of the photographic photosensitive material. Also, the lamp black mostly has a pH of 5.0 or less and adversely affects photographic properties, accordingly, if the use thereof is anyhow required, the effects on photographic properties must be examined through the reaction with a substance having bad effects on photographic properties or the use in combination with a substance able to adsorb and only those determined usable should be selected so as to avoid bad effects on photographic properties. The sulfur component determined according to ASTM D 1619-60 is 0.9% or less, preferably 0.7% or less, and if it goes outside this range, the photographic properties may be adversely affected, such as fogging or abnormal photosensitivity. In particular, the free sulfur component having bad effects on photographic properties of a photographic photosensitive material is preferably 0.1% or less, most preferably 0.05% or less. The furnace carbon black is selected so that the content of the cyan compound (the measuring method will be described later) which deteriorates photographic properties is 20 ppm or less, preferably 10 ppm or less, more preferably 5 ppm or less.

In view of abrasion resistance and reinforcing property, the carbon black preferably has an iodine absorption number (according to JIS K6221) of 20 mg/g or more, preferably 30 mg/g or more, more preferably 35 mg/g or more and a dibutyl phthalate absorption number (according to JIS K6221) of 50 ml/100 g or more, preferably 60 ml/100 g or more, more preferably 70 ml/100 g or more.

In particular, when considered dispersibility to the thermoplastic resin, costs, light-shielding ability, resin deterioration prevention, inhibitory property against reduction in the physical property of resin and stable availability, a furnace carbon black having a pH of from 6.0 to 9.0, an average particle size of from 12 to 70 m$\mu$ and an iodine absorption number and DBP absorption number in the above-described range is most preferred.

Particularly preferred electroconductive carbon black is a furnace carbon black having no bad effect on photographic properties, capable of nearly uniform dispersion in the thermoplastic resin composition having compounded therein an organic compound having a number average molecular weight of less than 10,000 of the present invention, able to have a surface resistivity (a logarithmic mean of surface resistivities measured at 10 points on the sheet surface cut into a size of 12 cm×12 cm by setting the space between two electrodes to 1 cm using a digital multimeter manufactured by Takeda Riken K.K.) of $10^{12}$ $\Omega$ or less and having an average particle diameter of from 12 to 50 m$\mu$, a DBP absorption number of 100 ml/100 g or more and a pH of 7±0.5. Representative example of commercially available products include #3050, #3150, #3250, #3750 and #3950, all produced by Mitsubishi Kasei Corporation.

The light-shielding material preferred next to carbon black is titanium nitride graphite and iron black as a black light-absorptive light-shielding material because they are excellent in light-shielding ability and masking ability. In addition, inorganic pigments having a refractive index measured by the Larsen oil immersion method of 1.50 or more, various metal powders, metal flakes, metal pastes, metal fibers and carbon fiber are included. For the Larsen oil immersion method, reference can be made to "Saishin Ganryo Binran (Handbook of Recent Pigments), edited by Nippon Ganryo Gijutsu Kyokai, pp. 82–83 (1977). Representative examples of is preferred inorganic pigments having a refractive index of 1.50 or more and metal powder are described below, but the present invention is by no means restricted to these. The numerals in parentheses each indicates a refractive index. Examples of the inorganic pigment having a refractive index of 1.50 or more include titanium oxide in rutile type (2.75), silicon carbide (2.67), titanium oxide in anatase type (2.52), zinc oxide (2.37), antimony oxide (2.35), lead white (2.09), zinc white (2.02), lithophone (1.84), zircon (1.80), corundum (1.77), spinel (1.73), apatite (1.64), baryta powder (1.64), barium sulfate (1.64), magnesite (1.62), dolomite (1.59), calcium carbonate (1.58), talc (1.58), calcium sulfate (1.56), silicic anhydride (1.55), silica powder (1.54), magnesium hydroxide (1.54), basic magnesium carbonate (1.52), alumina (1.50) and the like. Among these preferred are those having a refractive index of 1.56 or more, most preferred are those having a refractive index of 1.60 or more.

Calcium silicate (1.46), diatomaceous earth (1.45) and hydrous silicate (1.44) having a refractive index of less than 1.50 are low in light-shielding ability and must be added in a large amount and thus they are not preferred as a light-shielding material. Recently, X-ray checking apparatus is used for baggage inspection at airport. When a high sensitivity photographic film having a sensitivity of ISO photographic speed 400 or more is passed through the X-ray checking apparatus, fogging is liable to occur on the photographic film by X-ray. To use a light-shielding material having a specific gravity of 3.1 or more, preferably 3.4 or more, more preferably 4.0 or more is preferred for preventing this fogging. The light-shielding material having X-ray-shielding ability and having a specific gravity of 3.1 or more, preferably 3.4 or more, more preferably 4.0 or more, may be in any form on use but not restricted to those described below as representative examples, for example, it may be in any of pigment, powder, flake, whisker or fiber. Representative examples of the light-shielding material having a specific gravity of 3.1 or more include silicon carbide, barium sulfate, molybdenum disulfide, lead oxide (lead white), iron oxide, titanium oxide, magnesium oxide, barium titanate, copper powder, iron powder, brass powder, nickel powder, silver powder, lead powder, steel powder, zinc powder, tungsten whisker, silicon nitride whisker, copper whisker, iron whisker, nickel whisker, chrominum whisker, stainless steel powder and whisker, magnesite, apatite, spinel, corundum, zircon, antimony trioxide, barium carbonate, zinc white, chromium oxide, tin powder and a mixture of these.

Preferred light-shielding materials particularly for imparting X-ray shielding ability are zircon, corundum, barium sulfate, barium chloride, barium titanate, lead powder, lead oxide (e.g., iron black), zinc powder, zinc white, tin powder, stainless steel powder, stainless steel whisker, iron oxide, tungsten whisker and nickel whisker. Light-shielding materials preferred for an injection molded article for highly sensitivity photographic photosensitive materials having an ISO photographic speed 400 or more are those having a refractive index of 1.50 or more and a specific gravity of 3.1 or more, and most preferred are those having a refractive index of 1.56 or more and a specific gravity of 3.4 or more.

The refractive index and specific gravity of light-shielding materials are shown in Table 6 below.

TABLE 6

| Light-Shielding Material | Refractive Index (Larsen Oil Immersion | Specific Gravity (ASTM D 153; A method) |
|---|---|---|
| Titanium oxide in rutile type | 2.76 | 4.2 |
| Silicon carbide | 2.67 | 3.17–3.19 |
| Titanium oxide in anatase type | 2.52 | 3.8 |
| Zirconium oxide | 2.40 | 5.5 |
| Antimony oxide | 2.35 | 4.6 |
| Lead white | 2.09 | 6.4–6.9 |
| Zinc white | 2.02 | 4.3 |
| Lithopone | 1.84 | 5.59 |
| Zircon | 1.80 | 3.9–4.1 |
| Corundum | 1.77 | 3.9–4.0 |
| Magnesium oxide | 1.74 | 3.2–3.4 |
| Spinel | 1.73 | 3.5–3.6 |
| Basic zinc carbonate | 1.70 | 3.3 |
| Apatite | 1.64 | 3.1–3.2 |
| Asbestos (Crystotile) | 1.70 | 2.4–2.6 |
| Baryta powder | 1.64 | 4.5 |
| Barium sulfate | 1.64 | 4.3 |
| Magnesite | 1.62 | 3.0–3.1 |
| Carbon black | 1.61 | 1.7–2.1 |
| Anhydrous calcium sulfate | 1.59 | 2.9–3.0 |
| Dolomite | 1.59 | 2.8–2.9 |
| Calcium carbonate | 1.58 | 2.83 |
| Talc | 1.58 | 2.6–2.8 |
| Roseki clay (pyrophyllite) | 1.57 | 2.7–2.9 |
| Silica powder | 1.56 | 2.5–2.6 |
| Alumina | 1.54 | 3.7–3.9 |
| Magnesium hydroxide | 1.54 | 2.4 |
| Basic magnesium carbonate | 1.52 | 2.2–2.3 |
| Bentonite | 1.52 | 2.0–2.6 |

In order not to affect adversely photographic photosensitive materials and not to degrade film moldability, the X-ray-shielding light-shielding material is used preferably in a state that weight loss on drying at 100° C. for 5 hours is preferably 2.0 wt % or less, more preferably 1.0 wt % or less, most preferably 0.5 wt % or less. Such a state can be provided by removing the volatile component of 100° C. or lower or preventing adsorption of water content, using one or more methods of washing, refining, heating removal, vacuum removal and surface treatment.

Representative examples of the oil-absorptive inorganic pigment having a function of adsorbing a lubricant, an antioxidant and an organic nucleating agent, which are liable to bleed out, a deodorant, a fragrance, an oxygen scavenger include zinc white (52), asbestine (50), clay (51), titanium dioxide (56), kaolin (60), talc (60 or more), carbon black (60 or more) and activated carbon. The number in parenthesis indicates an oil absorption (unit: ml/100 g, measured according to JIS K 6221, Oil Absorption A method).

Representative examples of the metal powder (inclusive of metal paste) include aluminum powder, aluminum paste, copper powder, stainless steel powder, iron powder, nickel powder, brass powder, silver powder, tin powder, zinc powder and steel powder.

The aluminum powder as used in the present invention includes aluminum powder and aluminum paste, and preferred are aluminum powder of which surface is coated with a surface-coating material and aluminum paste from which low volatile components are removed and then kneaded with a thermoplastic resin.

The aluminum paste as used herein is produced by letting mineral spirits and a small amount of a higher fatty acid such as stearic acid or oleic acid be present in forming aluminum powder according to a known method such as ball milling, stamp milling or atomizing. The aluminum paste is kneaded together with an aromatic monovinyl resin (e.g., polystyrene resin, rubber-containing polystyrene resin), a polyolefin thermoplastic resin (e.g., various polypropylene resins, various polyethylene resins, acid-modified resin, EVA resin, EEA resin, EAA resin), a low molecular weight polyolef in resin, a paraffin wax, a tackif ier or a dispersant such as metallic soap (fatty acid metal salt) under heating and low volatile materials (mainly mineral spirits and white spirits having strongly offensive odor) are removed by a vacuum pump or by heatng to give a volatile material content of 3% or less, preferably 1% or less, more preferably 0.5% or less. This product is preferably used as aluminum paste compound resin or aluminum paste masterbatch resin.

This is particularly preferably used as an aluminum paste masterbatch resin so as to eliminate adverse effects on photographic properties of a photographic photosensitive material or offensive odors. Even if, for example, the masterbatch having an aluminum paste content of 40 wt % has a mineral spirit content of 1.0 wt %, when the aluminum paste concentration in the injection molded article for photographic photosensitive materials is intended to be 2 wt %, the natural resin for dilution must be kneaded in an amount of 19 parts by weight per 1 part by weight of the aluminum paste masterbatch and on considering that the injection molded article includes the content of the mineral spirit to be removed as a gas on heating during molding, the mineral spirit content is to 0.05 wt % or less. As a result, no bad effect on photographic properties of a photographic photosensitive material is caused and the offensive odor is also diminished. The aluminum powder which can be used includes those obtained by powdering molten aluminum by atomization, granulation, dropping on a rotary disc or evaporation and also those formed into flakes by crushing aluminum foil by ball milling or stamp milling.

The embodiment where a light-shielding material is compounded is roughly classified into the following groups:

1) Uniformly colored pellet those called a color compound and most commonly used 2) Dispersible powder
   those called a dry color in a powder form, which is treated with various surface treating agents and after adding a dispersion aid, crushed into fine particles
3) Paste
   those having dispersed therein a plasticizer and the like
4) Liquid
   those called a liquid color in a liquid state, which is dispersed in a surface active agent and the like
5) Masterbatch pellet
   those obtained by dispersing a light-shielding material in plastics to be colored at a high concentration
6) Wet particle powder
   those obtained by dispersing a light-shielding material in plastics at a high concentration and then processing it into a particle powder form
7) Dry powder
   normal untreated dry powder material In the light-shielding material, it is necessary to suppress the total sulfur amount (according to ASTM D-1619) to 1.0% or less, preferably 0.8% or less, more preferably 0.5% or less, the free sulfur content to 150 ppm or less, preferably 50 ppm or less, more preferably 30 ppm or less, the ash content according to ASTM D-1506 to 0.5% or less, preferably 0.4% or less, more preferably 0.3% or less, and the aldehyde compound content to 0.2% or less, preferably 0.1% or less, more preferably 0.05% or less, and otherwise, the photographic properties are adversely affected.

Also, the cyan compound adversely affects the photographic performance of a photographic photosensitive material and accordingly, for example, a light-shielding material such as carbon black is refluxed in the presence of a sulfuric acid and the hydrogen cyanide generated is trapped by 0.1N sodium hydroxide so that the resulting light-shielding material has a hydrogen cyanide content determined by 4-pyridine carboxylic acid-pyrazolone absorptiometry of 20 ppm or less, preferably 10 ppm or less, more preferably 5 ppm or less, in terms of the ppm unit to the weight of the light-shielding material.

The light-shielding material is compounded into the resin composition according to various embodiments as described above. Representative compounding embodiments and the feature thereof are shown in Table 7.

TABLE 7

| Item | Color Compound | Dry Color | Master-batch (1:20) | Liquid Color | Granular Color |
|---|---|---|---|---|---|
| coloration cost | x | ⊚ | ○ | -○ | ○ |
| cost for transportation, space for stock | x | ○ | ○ | ○ | ○ |
| handleability: splash | ⊚ | x | ⊚ | ⊚ | ● |
| handleability: stain | ⊚ | x | ⊚ | x | ● |
| residence in package container | ⊚ | ▲-○ | ⊚ | x | ○ |
| measurability | ○ | x | ○ | ▲-○ | ● |
| injection molding processability | ○ | ○ | ○ | ▲-○ | ○ |
| ease in color change | ⊚ | ▲ | ⊚ | ● | ● |
| dispersibility: microgrid | ○ | ▲ | ○ | ○ | ○ |
| dispersibility: irregular color | ⊚ | ○ | ● | ▲-○ | ○ |
| mechanical strength | ○ | ○ | ○ | ▲ | ○ |
| storability (change | ⊚ | ○ | ⊚ | x | ○ |

TABLE 7-continued

| Item | Color Compound | Dry Color | Master-batch (1:20) | Liquid Color | Granular Color |
|---|---|---|---|---|---|
| by aging) | | | | | |

In the table above, the symbols each has the following meaning:

⊚: very excellent

○: excellent

●: limit for practical use

▲: having a problem, in need of improvement x: impossible to use in practice

Among these compounding embodiments, a masterbatch method is preferred in view of the cost and pollution prevention at the workshop. JP-B-40-26196 discloses a method where carbon black is dispersed in a solution of polymer dissolved in an organic solvent to produce a polymer-carbon black masterbatch and JP-B-43-10362 discloses a method where carbon black is dispersed in polyethylene to produce a masterbatch.

In mixing a noncrystalline resin and a masterbatch to satisfactorily disperse a light-shielding material in the noncrystalline resin composition of the present invention, it is necessary to take notice of the conditions shown in Table 8.

TABLE 8

| Conditions | Consideration |
|---|---|
| 1 To achieve flow property (flow); difference in flowability between resin and M/B | Flowability equal to or better than that of natural resin. As the multiplying factor of dilution increases, the flow of M/B needs be better. As the melt viscosity of natural resin lowers, the melt viscosity of M/B needs be lower than that of natural resin. No large difference is present between the softening temperature and the outflow temperature. Adjustment of flowability by adding a dispersion aid or a plasticizer |
| 2 To achieve compatibility | Let the polarity be closer (if a foreign resin is mingled, weld becomes large). No color separation is generated. |
| 3 To achieve dispersibility (kneading capability of molding machine) | Viscosity needs be equal or smaller (larger surface area). The multiplying factor of dilution should not be increased excessively. No generation of electric charge Design of screw: 1) Large L/D 2) Structure of a type capable of kneading (dalmage) 3) Increase of convection time Increase of kneading ability 1) Use of [unimelter] or the like (to provide a turbulent area) 2) Dispersion ring (turbulent flow at the nozzle part) 3) Use of static mixer (at the leading end of nozzle) |
| 4 To achieve heat durability (mold processing condition) | Good heat durability No crystal change |

TABLE 8-continued

| Conditions | Consideration |
|---|---|
| 5  To achieve dispersibility | Good dispersibility Improvement of wetting by surface treatment of the light-shielding material |

It is preferred to cover the surface of a light-shielding material (preferably carbon black, aluminum powder, inorganic pigment having a refractive index of 1.50 or more, an inorganic pigment having a specific gravity of 3.4 or more, or an inorganic pigment having an oil absorption number of 50 ml/100 g more) with a surface-covering material so that dispersibility into resin is improved, resin flowability is increased, generation of microgrids as a cause of abrasion fog, press mark or scratches on the photographic photosensitive material is inhibited, generation of volatile substances harmful to photographic properties is prevented, hygroscopicity is decreased or die lip fouling is prevented.

Representative examples of the surface-covering material are described below:

(1) Coupling Agent
  1) Covering with a coupling agent containing an azidosilane (disclosed in JP-A-62-32125)
  2) Covering with a silane-based coupling agent (aminosilane)
  3) Covering with a titanate-based coupling agent
(2) Covering by depositing silica and then alumina
(3) Covering with a higher fatty acid metal salt such as zinc stearate, magnesium stearate or calcium stearate
(4) Covering with a surface active agent such as sodium stearate, potassium stearate or hydroxyethylene dodecylamine
(5) Covering by reacting aqueous barium sulfide solution with aqueous sulfuric acid solution in the presence of an excess amount of barium ions to produce barium sulfate having a mean particle size of from 0.1 to 2.5 μm, adding alkaline silicic acid solution to the water slurry to produce barium silicate on the surface of the barium sulfate, adding a mineral acid to the slurry and decomposing the barium silicate in hydrous silica to deposit it on the surface of the barium sulfate.
(6) Surface covering with a composition consisting only of one or more hydrated metal oxide (e.g., one or more hydrated oxide of titanium, aluminum, cerium, zinc, iron, cobalt and silicon) and/or a metal oxide (e.g., one or more oxide of titanium, aluminum, cerium, zinc, iron, cobalt or silicon)
(7) Surface covering with a polymer having one or more reactive groups selected from the group consisting of aziridine group, oxiazoline group and N-hydroxyalkylamide group within the molecule
(8) Surface covering with a polyoxyalkylene amine compound
(9) Surface covering with cerium cation, selected acid anion and alumina
(10) Surface covering with an alkoxy titanium derivative having α-hydroxycarboxylic acid residue as a substituent
(11) Surface covering with polyetetrafluoroethylene
(12) Surface covering with polydimethylsiloxane or a silicone-modified product
(13) Surface covering with a phosphate compound
(14) Surface covering with a dihydric, trihydric or tetrahydric alcohol
(15) Surface covering with olefin wax, such as polyethylene wax or polypropylene wax
(16) Surface covering with a hydrous aluminum oxide
(17) Sdurface covering with silica or a zinc compound (zinc chloride, zinc hydroxide, zinc oxide, zinc sulfate, zinc nitrate, zinc acetate or zinc citrate individually or in combination of two or more thereof)
(18) Surface covering with polyhydroxy saturated hydrocarbon
(19) Surface covering with aluminum chelating compound Among the above-described surface-covering materials for the light-shielding material, (1), (3), (12), (14), (15), (16) and (19) are particularly preferred because they have little adverse effect on photographic properties of a photographic photosensitive material such as fogging and provide superior effects such as improvement in dispersibility of the light-shielding material, reduction in occurrence of lumps and improvement in flowability of the resin.

It is found that in particular, by adding an ester of an aliphatic monocarboxylic acid having from 20 to 40 carbon atoms and an aliphatic monohydric alcohol having from 20 to 40 carbon atoms in an amount of from 0.001 to 2 wt %, preferably from 0.005 to 1 wt %, more preferably from 0.01 to 0.5 wt %, the above-described problems can be prevented. This surface-covering material of the light-shielding material not only reduces bad effects on photographic properties of a photographic photosensitive material but also lightens the motor load, improves the dispersibility of the light-shielding material and increases the moldability to provide excellent appearance to the molded article.

This ester is an ester of an aliphatic monocarboxylic acid having from 20 to 40 carbon atoms, preferably from 25 to 35 carbon atoms and of an aliphatic monohydric alcohol having from 20 to 40 carbon atoms, preferably from 25 to 35 carbon atoms.

Examples of the above-described monocarboxylic acid include a montanic acid, a melissic acid, a cerotic acid, a burycinic acid and a lacceric acid.

Examples of the monohydric alcohol include montyl alcohol, melissyl alcohol, laccyl alcohol, ceryl alcohol and burycyl alcohol.

Since these can improve the flowability of a resin composition and additionally achieve uniform kneading, they are very superior also as the above-described surface-covering material of the light-shielding material. When they cover the surface as a dispersant of the inorganic and/or organic nucleating agent, various excellent effects can be provided such as prevention of splashing, inhibition of bleeding out, improvement in uniform dispersibility and increase in flowability of resin.

The covering amount of the surface covering substance for the light-shielding material is from 0.001 to 10 wt %, preferably from 0.005 to 5 wt %, more preferably from 0.01 to 3 wt % and most preferably from 0.05 to 1.5 wt % based on the light-shielding material such as carbon black or aluminum powder. If the covering amount is less than 0.001 wt %, almost no covering effect is provided, whereas if the covering amount exceeds 10 wt %, the occurrence of bleeding out increases with the lapse of time and also slipping between the resin and the screw is generated to cause fluctuation in the discharge amount of the resin composition and as a result, scattering in the thickness becomes large, which gives rise to difficulties in practical use.

By coating or bonding a coupling agent to the light-shielding material such as carbon black or aluminum powder, affinity of the light-shielding material such as carbon black or aluminum powder or a fibrous or non-fibrous filler for the noncrystalline resin is improved, good dispersibility of the light-shielding material and good flowability, moisture-proofing property, moldability, physical strength and appearance of the noncrystalline resin composition are achieved, harmful chemical reaction between the light-shielding material such as carbon black or aluminum powder or a fibrous or non-fibrous filler and the noncrystalline resin is inhibited and oxidation and coagulation of the light-shielding material such as carbon black or aluminum powder or a fibrous or non-fibrous filler are effectively prevented.

The coupling agent is described below.

(1) Titanate coupling agent compound

The titanate coupling agent coated or bonded to the surface of a light-shielding material such as carbon black or aluminum powder or to the surface of a fibrous or non-fibrous filler is preferably uniformly coated and/or bonded in an amount of preferably from 0.01 to 5.0 wt %, more preferably from 0.1 to 3 wt % based on the total weight. If the amount is less than 0.01 wt %, the titanate coupling agent compound is difficult to be uniformly coated or bonded and the light-shielding material such as carbon black or aluminum powder or a fibrous or non-fibrous filler for filling in the synthetic resin can hardly have affinity for the synthetic resin or cannot be stable at molding. On the other hand, even if the amount exceeds 5.0 wt %, the effect is not elevated resulting from the increase in amount. Although flowability such as melt flow rate of the mixed material of the light-shielding material such as carbon black or aluminum powder or a fibrous or non-fibrous filler with a noncrystalline resin may be good even if the amount exceeds 5.0 wt %, photographic properties of a photographic photosensitive material are adversely affected and costs for materials increase, thus the practical use is difficult.

The titanate coupling agent compound for use in the present invention is selected one or more from isopropyltriisostearoyl titanate, isopropyltridecylbenzenesulfonyl titanate, isopropyltri(dioctylpyrophosphate) titanate, tetraisopropylbis(dioctylphosphite) titanate, tetra(2,2-diallyloxymethyl-1-butyl)bis(di-tridecyl)phosphate titanate and bis(dioctylpyrophosphate)oxyacetate titanate.

The titanate coupling agent compound is coated or bonded to the light-shielding material such as carbon black or aluminum powder or a fibrous or non-fibrous filler of the present invention by means of a machine in general use for mixing powder or mixing and dispersing powder and liquid and the kind of machine is not restricted. The effect can be sufficiently provided at the processing temperature of room temperature. The processing atmosphere may be an atmospheric air. Since the titanate coupling agent is liquid, it can be independently coated uniformly on the light-shielding material such as carbon black or aluminum powder or a fibrous or non-fibrous filler. However, in the case where the addition amount is very small or the titanate coupling agent compound has a high viscosity, the titanate coupling agent compound may be diluted with liquid having an appropriate compatibility and the light-shielding material such as carbon black or aluminum powder or a fibrous or non-fibrous filler can be processed as a slurry, and for uniformly and surely coating the titanate coupling agent compound on the light-shielding material such as carbon black or aluminum powder or a fibrous or non-fibrous filler, this method is advantageous.

(2) Silane coupling agent compound

A representative silane coupling agent compound for use in the present invention is represented by formula:

$R^1R^2_aSi(OR^3)_3$ wherein a represents 0 or 1, $R^1$ represents an amino group, a mercapto group, a vinyl group, an epoxy group or a methacroxy group and $R^2$ and $R^3$ each represents a saturated hydrocarbon group having from 1 to 8 carbon atoms or an ether group. Specific examples of the silane coupling agent compound include a vinylsilane compound such as vinyltrimethoxysilane, vinyltriethoxysilane and vinyltri(2-methoxyethoxy)silane, an aminosilane compound such as γ-aminopropyltrimethoxysilane, β-(aminoethyl)-γ-aminopropyltrimethoxysilane and an epoxysilane compound such as γ-glycidoxypropyltrimethoxysilane and β-(3,4-epoxycyclohexyl)ethyltrimethoxysilane. Among these, preferred is an aminosilane compound.

The silane coupling agent compound can be coated or bonded to a light-shielding material such as carbon black or aluminum powder or a fibrous or non-fibrous filler in the same manner as the above-described titanate coupling agent compound.

The silane coupling agent compound is coated or bonded to a light-shielding material such as carbon black or aluminum powder or a fibrous or non-fibrous filler in the same amount as that of the above-described titanate coupling agent compound.

The organic phosphoric ester compound of the present invention is adsorbed to the metal surface of an injection molding machine or to the surface of metal powder such as aluminum powder to give surface protection effect for controlling the reaction of the metal surface of an injection molding machine or metal powder such as aluminum powder. Accordingly, the organic phosphoric ester compound is one of preferred surface-covering materials having an oxidation inhibitory effect of the metal surface of an injection molding machine or of metal powder such as aluminum powder. The organic phosphoric acid ester compound is preferably an organic phosphoric ester compound represented by the following formula:

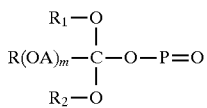

wherein R represents an alkyl group having from 6 to 30 carbon atoms, preferably from 12 to 22 carbon atoms, an alkenyl group having from 6 to 30 carbon atoms, preferably from 12 to 22 carbon atoms or an aryl group containing one or more alkyl substituents having from 6 to 30 carbon atoms, preferably from 12 to 22 carbon atoms or one or more alkenyl substituents having from 6 to 30 carbon atoms, preferably from 12 to 22 carbon atoms, A represents an alkylene group having from 2 to 4 carbon atoms, preferably 2 or 3 carbon atoms, m represents a number of from 0 to 20, preferably from 1 to 15, more preferably from 2 to 10, $R_1$ and $R_2$ may be the same or different and each represents hydrogen, an alkyl group, an alkenyl group, an aryl group or R—(OA)$_m$ (where R, A and m each has the same meaning as above).

Preferred examples of the alkyl or alkenyl group for R, $R_1$ and $R_2$ include octyl, decyl, lauryl, cetyl, stearyl, oleyl, hexadexyl, octadecyl.

Preferred examples of the aryl group for R, $R_1$ and $R_2$ include octylphenyl, nonylphenyl, dodecylphenyl and dinonylphenyl. A is preferably ethylene or propylene.

Specific examples of preferred compounds include an alkyl, alkenyl or aryl ester of the phosphoric acid and an ester of a product resulting from adding ethylene oxide to the alkyl, alkenyl or aryl group. The phosphoric ester may be any of mono-, di- or triester and may be a mixture of these. A mixture of different kinds of phosphoric ester may also be used.

The organic phosphoric ester compound is acidic in an aqueous solution and therefore, it may be neutralized by an inorganic or organic basic material such as ammonium, sodium hydroxide, potassium hydroxide, dibutylamine, triethylamine, monoethanolamine, diethanolamine, triethanol amine or morpholine before use.

The organic phosphoric ester compound is contained in the noncrystalline resin composition of the present invention which comes into contact with the metal surface of an injection molding machine, in an amount of from 0.01 to 10 wt %, preferably from 0.05 to 8 wt %, more preferably from 0.1 to 5 wt %. If the amount of the organic phosphoric ester compound used is less than 0.01 wt %, the metal surface protection effect is scarcely provided, and if it exceeds 10 wt %, no effect is extracted from the increase of amount but only the cost for materials increases. The organic phosphoric ester compound is used for the metal powder such as aluminum powder in an amount of from 0.1 to 30 wt %, preferably from 0.5 to 20 wt %, more preferably from 1 to 10 wt %. If the amount of the organic phosphoric ester compound used is less than 0.1 wt %, the surface protection effect is small, whereas if it exceeds 30 wt %, an aqueous paint having mixed therein the composition is apt to give a coated film reduced in water resistance.

The method for adding the organic phosphoric ester compound to metal powder such as aluminum powder is not particularly restricted. In general, the scaly aluminum powder is produced in such a manner that an aluminum crushed material and a lubricant for increasing grinding efficiency are poured into a crusher such as a ball mill and subjected, for example, to wet grinding in an organic solvent or dry grinding in nitrogen atmosphere. The lubricant used here is commonly an unsaturated fatty acid, an aliphatic amine or a metal salt of fatty acid, which also serves as a surface treating agent to adsorb to the surface of aluminum powder to thereby give a surface protection effect. The organic phosphoric ester compound may be used individually or in combination with the above-described fatty acid or fatty acid derivative.

Also, the organic phosphoric ester compound may be afterward added together with water and a surface active agent for giving water dispersibility, to the metal powder such as aluminum powder which is previously subjected to surface treatment using a fatty acid or fatty acid derivative.

The surface active agent for giving an aqueous property to a paint or an ink used in surface printing or painting of the injection molded article for photographic photosensitive materials of the present invention or in bar-code printing is not particularly restricted but in view of storage stability, a nonionic surface active agent is preferably used. Examples thereof include polyoxyethylene alkyl ether, polyoxyethylene alkylphenol ether and polyethylene glycol fatty acid ester. The surface active agent is added in a mixing step where the powder is converted into paste together with the organic phosphoric ester compound and water as a dispersion medium.

If desired, various additives may be used in combination in the composition of the present invention. When water dispersing metal powder paste comprising metal powder such as aluminum powder and an organic phosphoric ester compound as basic compositions and further containing a nonionic surfactant and water is used as a pigment for aqueous paint, the paste is very satisfactorily dispersed in the paint and even when stored for a long period of time, generation of hydrogen gas or coagulation of the pigment is not caused to reveal it to be chemically stable and almost no change is found in the paint nature. Another preferred organic phosphoric ester is represented by the formula:

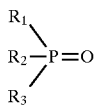

wherein $R_1$, $R_2$ and $R_3$ each represents hydrogen, an alkyl group, an aryl group, a polyoxyethylene ether group or a polyoxyethylene arylether group, provided that $R_1$, $R_2$ and $R_3$ are not hydrogen at the same time.

The organic phosphoric ester compound may be any of monoester, diester or triester and may be used individually or as a mixture of these. Examples of the organic phosphoric ester compound include triester compounds such as organic phosphoric triphenyl compound and organic phosphoric tri(2-ethylhexyl), organic phosphoric diester compounds such organic phosphoric di (2-ethylhexyl), organic dibutyl phosphate, organic dioctyl phosphate, organic monobutyl phosphate and organic monoisodecyl phosphate, and organic phosphoric monoester compounds. Among these, preferred in the present invention are an organic phosphoric diester compound, an organic phosphoric monoester compound and a mixture of these.

When the organic phosphoric ester compound is used in combination with a titanate coupling agent compound or a silane coupling agent compound, the metal powder such as aluminum powder can have excellent oxidation inhibitory property and dispersibility and the aqueous paint or aqueous ink using no organic solvent so as to save resources, cope with photographic properties and dispense with environmental pollution can have a long-term storage stability to thereby prevent the nature of paint or ink from being conspicuously impaired during storage due to reduction in dispersibility of the metal powder such as aluminum powder or generation of a large quantity of gas.

The injection molded article for photographic photosensitive materials of the present invention may contain a plasticizer. By adding a plasticizer, uniform dispersibility of a light-shielding material, a fibrous or non-fibrous filler or a hydrotalcite compound can be improved.

The addition amount of the plasticizer is preferably from 0.01 to 10.0 wt %, more preferably from 0.05 to 7.0 wt %, most preferably from 0.1 to 5.0 wt %. If the addition amount is less than 0.01 wt %, almost no effect is provided on improvement in uniform dispersibility of a light-shielding material, a fibrous or non-fibrous filler or a hydrotalcite compound or on improvement in blocking adhesion but only the cost for kneading is increased. If the addition amount exceeds 10.0 wt %, slipping from the screw of extrusion machine is generated and therefore, the resin cannot be extruded in a stable amount.

Representative examples of the plasticizer are described below.

(1) Phthalic acid plasticizer

Dibutyl phthalate, diheptyl phthalate, dioctyl phthalate, diisodecyl phthalate, butyl lauryl phthalate, ditridecyl phthalate, butyl benzyl phthalate, butyl phthalyl butyl glycolate, etc.

(2) Phosphoric acid plasticizer

Tricresyl phosphate, trioctyl phosphate, etc.

(3) Fatty acid plasticizer

Tri-n-butyl citrate, dioctyl adipate, dioctyl azelate, dioctyl sebacate, methyl acetyl ricinolate, etc.

(4) Epoxy plasticizer

Alkyl epoxy stearate, 4,5-epoxytetrahydrodiisodecyl phthalate, etc.

(5) Other plasticizers

Chlorinated paraffin, polyester, sucrose octaacetate, etc.

The injection molded article for photographic photosensitive materials of the present invention may contain one or more, preferably two or more, more preferably three or more, most preferably four or more of an antioxidant, a fatty acid metal salt, a radical scavenger, an alkaline earth metal salt, a hydrate double salt compound and an oxidation inhibitory synergistic effect-providing agent. By adding these substances, heat deterioration of the resin or additives can be prevented, generation of a decompositional material which adversely affects photographic properties of a photographic photosensitive material is inhibited and occurrence of microgrids or fisheyes is reduced. Also, odor or catalyst residue is scavenged.

The above-described fibrous or non-fibrous filler may have any shape such as a spherical, platy, columnar, fibrous, amorphous or steric form but in view of improvement in the dimensional accuracy and physical strength, a fibrous filler is preferred.

Examples of the fibrous filler include glass fiber (e.g., chopped strand, roving), milled fiber, cut fiber, rock fiber, wallastonite, microfiber, processed mineral fiber, carbon fiber, aromatic polyamide fiber, gypsum fiber, potassium titanate whisker, metal (e.g., soft steel, stainless steel, copper or an alloy thereof, alumina or an alloy thereof) short fiber, silicon carbide fiber, alumina fiber, ceramic fiber, asbestos fiber, aramid fiber and asbestos. Among these fibrous fillers, preferred are glass fiber and potassium titanate whisker because bad effects are not given on the photographic photosensitive material and mass production can be made while achieving uniform quality of products.

In view of dispersiblity, flowability of the resin composition and appearance of the molded article, the above-described fibrous filler is preferably subjected to surface treatment with a surface-covering material described with respect to the light-shielding material, particularly preferably with a silane, chromium or titanium coupling agent. In the case of a fibrous filler, silane coupling agents including an epoxy silane such as γ-bricydoxypropyltrimethoxysilane, a vinyl silane such as vinyltrichlorosilane and an aminosilane such as γ-aminopropyltriethoxysilane are preferred. In particular, it is preferred to treat a glass short fiber having a fiber diameter of from 0.1 to 30 μm, preferably from 0.2 to 25 μm, more preferably from 0.5 to 20 μm and a fiber length of from 0.5 to 30 mm, preferably from 1 to 25 mm, more preferably from 1.5 to 20 mm with various coupling agents.

The compounding amount of the fibrous filler is from 1 to 100 parts by weight, preferably from 2 to 90 parts by weight, more preferably from 3 to 80 parts by weight and most preferably from 5 to 70 parts by weight per 100 parts by weight of the noncrystalline resin. If the compounding amount is less than 1 part by weight, no effect is provided from the addition of the filler but only the cost for kneading is increased, whereas if it exceeds 100 parts by weight, not only appearance of the molded article is deteriorated but also the physical strength is lowered to put the practical use into difficulty.

Representative examples of the reinforced non-fibrous filler capable of improving the dimensional accuracy and physical strength of an injection molded article include a silicate such as wallastonite, celicite, kaolin, mica, clay, bentonite, asbestos, talc and alimina silicate, a metal compound such as alumina, silicon chloride, magnesium oxide, zirconium oxide and titanium oxide, a carbonate such as calcium carbonate, magnesium carbonate and dolomite, a sulfate such as calcium sulfate and barium sulfate, a glass bead, a boron nitride, a silicon carbide and silica, which fillers each may be hollow. These reinforced fillers may be used in combination of two or more and the compounding amount is almost the same as that of the above-described fibrous filler. The non-fibrous filler may be subjected to vinyl monomer graft treatment or surface treatment with various coupling agents such as a silane, chromium or titanium coupling agent described with respect to the fibrous filler, if desired. In particular, when a fibrous filler and a non-fibrous filler is used in combination, the dimensional accuracy and the appearance are further improved.

In addition, the filler is preferably subjected to surface covering treatment with a surface-covering material for the light-shielding material so as to improve appearance and physical strength and to prevent deterioration of photographic properties. The surface covering amount for the fibrous filler or the non-fibrous filler is from 0.001 to 10 wt %, preferably from 0.005 to 5 wt %, more preferably from 0.01 to 3 wt %, most preferably from 0.05 to 1.5 wt %, based on the filler. If the covering amount is less than 0.001 wt %, the covering effect on the filler surface is scarcely provided, whereas if the covering amount exceeds 10 wt %, the bleeding-out is generated frequently by aging to cause slipping between the noncrystalline resin composition and the screw, whereby the discharge amount of noncrystalline resin composition changes to frequently bring about molding failure (e.g., short shot, burr).

In order to provide excellent properties with respect to abrasion resistance, heat durability, cold durability, impact resistance and flaw resistance as well as to achieve high rigidity and good dimensional accuracy even under severe use conditions such as in a low temperature environment or in a high temperature environment, a resin composition obtained by adding one or more of a light-shielding property and a fibrous or non-fibrous filler to a polycarbonate resin is used and the resin composition is injection molded at a resin temperature (cylinder temperature) of from 250° to 340° C., preferably from 270° to 330° C., more preferably from 280° to 320° C., at a mold temperature of from 70° to 200° C., preferably from 80° to 180° C., more preferably from 90° to 160° C. and at an injection pressure of from 600 to 1,800 kg/cm², preferably from 700 to 1,500 kg/cm², more preferably from 750 to 1,300 kg/cm².

When a glass fiber-reinforced light-shielding polycarbonate resin composition obtained by incorporating from 5 to 50 wt % of glass fiber treated with an aminosilane-based coupling agent such as γ-aminoprupyltriethoxysilane and from 0.1 to 10 wt % of carbon black into a polycarbonate resin is used and the resin composition is injection molded at a resin temperature (cylinder temperature) of from 270° to 320° C. and a mold temperature of from 90° to 160° C., the molded article undergoes small generation of weld lines and can have excellent appearance and good physical strength.

The content of one or more of an antioxidant, an age resistor, an ultraviolet absorbent, a fatty acid metal salt, a radical scavenger, a hydrate double salt compound and an oxidation inhibitory synergistic effect-providing agent is from 0.001 to 20 wt %, preferably from 0.005 to 15 wt %, more preferably from 0.01 to 10 wt %.

If the content is less than 0.001 wt %, no effect comes from their addition but only the cost for kneading increases, whereas if the content exceeds 20 wt %, the photographic properties of a photographic photosensitive material may be adversely affected, the physical strength may be lowered or the molding failure may be frequently caused.

The antioxidant and the radical scavenger are described below with respect to their working. Oxidative degradation of the resin tends to occur more frequently in the polyolefin resin having a greater number of CH₃ branches due to a large number of oxygen absorption. Accordingly, oxidative degradation occurs in the order of more: polypropylene resin >homopolyethylene resin>ethylene-α-olefin copolymer resin: less. Various polyethylene resins (inclusive of ethylene-α-olefin copolymer resins) and various polypropylene resins (inclusive of propylene-ethylene random or block copolymer resins) as representative crystalline thermoplastic resins are hydrocarbons, and it is considered that when a radical group is once produced through dehydration of hydrocarbon in the presence of oxygen, autoxidation proceeds in the following formulas as chain reaction:

1) $RH \rightarrow R\cdot$
2) $R\cdot + O_2 \rightarrow ROO\cdot$
3) $ROO\cdot + RH \rightarrow ROOH + R\cdot$
4) $ROOH \rightarrow RO\cdot + \cdot OH$
5) $RO\cdot + RH \rightarrow ROH + R\cdot$
6) $\cdot OH + RH \rightarrow HOR + R\cdot$ Thus, the oxidation of hydrocarbon is accelerated to produce a great quantity of alcohols, aldehydes, acids and the like which adversely affect photographic properties of a photographic photosensitive material, and they react with each other to produce polymer.

In order to prevent oxidation of hydrocarbon, it is necessary to intercept the above chain reaction and an antioxidant or a radical scavenger is used for this purpose. As the antioxidant, there is a radical group chain terminator which reacts with radical groups, mainly $ROO\cdot$, which are chain carriers, to inactivate them, and a peroxide decomposer which decomposes hydroperoxide $ROOH$ which is the main source of radical groups, to stabilize it. The radical group chain terminator includes phenol antioxidant and aromatic amine antioxidant. The peroxide decomposer includes sulfur antioxidant and phosphorus antioxidant. It is preferred to use the radical group chain terminator and the peroxide decomposition antioxidant in combination to prevent generation of yellowing or browning and lumps (black solid as foreign matters) due to heat deterioration of the thermoplastic resin. Since various antioxidants each is a reducing agent which adversely affects photographic photosensitive materials, unless its kind and the compounding amount is carefully examined, degradation in quality of photographic photosensitive materials becomes great and causes a trouble.

Representative examples of the antioxidant for use in the present invention are described below.

(a) Phenol-based antioxidant (t stands for "tert")

Vitamin E (tocopherol), 6-t-butyl-3-methylphenyl derivatives, 2,6-di-t-butyl-p-cresol, 2,6-di-t-butylphenol, 2,6-di-t-butyl-α-dimethylamino-p-cresol, 2,6-di-t-butyl-p-ethylphenol, 2,2'-methylenebis-(4-ethyl-6-t-butylphenol), 4,4'-butyridenebis(6-t-butyl-m-cresol), 4,4'-thiobis(6-t-butyl-m-cresol), 4,4-dihydroxydiphenylcyclohexane, butylated hydroxyanisole, alkylated bisphenol, styrenated phenol, 2,6-dit-butyl-3-methylphenol, 2,6-di-t-butyl-4-ethylphenol, n-octadecyl-3-(3',5'-di-t-butyl-4'-hydroxyphenyl)propionate, 2,2'-methylenebis(4-methyl-6-t-butylphenol), 4,4'-thiobis(3-methyl-6-t-butylphenyl), 4,4'-butylidenebis(3-methyl-6-t-butylphenol), 4,4'-thiobis(3-methyl-6-t-butylphenol), steary-β-(3,5-di-t-butyl-4-hydroxyphenyl)propionate, 1,1,3-tris(2-methyl-4-hydroxy-5-t-butylphenyl)butane, 1,3,5-trimethyl-2,4,6-tris(3,5-di-ti-butyl-4-hydroxybenzyl)benzene and tetrakis[methylene-3-(3,5-di-t-butyl-4-hydroxyphenyl)-propionate]methane.

(b) Ketone amine condensate-based antioxidant

6-Ethoxy-2,2,4-trimethyl-1,2-dihydroquinoline, polymers of 2,2,4-trimethyl-1,2-dihydroquinoline and trimethyldihydroquinoline derivatives.

(c) Allylamine-based antioxidant

Phenyl-α-naphthylamine, N-phenyl-β-naphthylamine, N-phenyl-N'-isopropyl-p-phenylenediamine, N,N'-diphenyl-pphenylenediamine, N,N'-di-β-naphthyl-p-phenylenediamine and N-(3'-hydroxybutylidene)-1-naphthylamine.

(d) Imidazole-based antioxidant

2-Mercaptobenzoimidazole, sulfites of 2-mercaptobenzoimidazole and 2-mercaptomethylbenzoimidazole.

(e) Phosphite-based antioxidant

Alkylated allylphosphite, tris(mono- and/or dinonylphenyl)phosphite, cyclic neopentanetetrailbis (2,6-di-t-butyl-4-methylphenyl)phosphite, diphenylisodecylphosphite, sodium tris (nonylphenyl) phosphite, tris (nonylphenyl)phosphite, 2,2-methylenebis(4, 6-di-t-butylphenyl)octylphosphite, tris(2,4-di-t-butylphenyl)phosphite and triphenyl phosphite.

(f) Thiourea-based antioxidant

Thiourea derivatives and 1,3-bis (dimethylaminopropyl) -2-thiourea.

(g) Other antioxidants useful for air oxidation

Dilauryl thiodipropionate.

Representative examples of most preferred hindered phenol-based antioxidants of the present invention are described below.

1,3,5-Trimethyl-2,4,6-tris(3,5-di-tert-butyl-4-hydroxybenzyl)benzene, tetrakis[methylene-3-(3',5'-di-tert-butyl-4'-hydroxyphenyl)propionate]methane, octadecyl-3,5-di-tert-butyl-4-hydroxy-hydrocinnamate, 2,2',2'-tris[(3,5-di-tert-butyl-4-hydroxyphenyl)propionyloxy]ethylisocyanurate, 1,3,5-tris(4-tert-butyl-3-hydroxy-2,6-dimethylbenzyl]isocyanurate, tetrakis(2,4-di-tert-butylphenyl)-4,4'-biphenylene diphosphite, 4,4'-thiobis(6-tert-butyl-o-cresol), 2,2'-thiobis(6-tert-butyl-4-methylphenol), tris(2-methyl-4-hydroxy-5-tert-butylphenyl)-butane, 2,2'-methylenebis(4-methyl-6-tert-butylphenol), 4,4'-methylenebis(2,6-di-tert-butylphenol), 4,4'-butylidenebis(3-methyl-6-tert-butylphenol), 2,6-di-tert-butyl-4-methylphenol, 4-hydroxymethyl-2,6-di-tert-butylphenol, 2,6-di-tert-4-n-butylphenol, 2,6-bis(2'-hydroxy-3'-tert-butyl-5'-methylbenzyl)-4-methylphenol, 4,4'-methylenebis(6-tert-butyl-o-cresol), 4,4'-butylidene-bis(6-tert-butyl-m-cresol) and 3,9-bis{1,1-dimethyl-2-[β-(3-t-butyl-4-hydroxy-5-methylphenyl)propionyloxy]ethyl}-2,4, 8,10-tetraoxaspiro[5.5]undecane. Among these, preferred are antioxidants having a melting point of 100° C. or higher, preferably 110° C. or higher, more preferably 120° C. or higher and most preferably 130° C. or higher. Also, it is effective to use a phenol-based antioxidant and a phosphorus-based antioxidant in combination.

The above-described vitamin E (tocopherol) is preferred because not only it has an oxidation inhibitory ability but also when used in combination with a light-shielding material such as carbon black, it improves the light-shielding ability as compared with the case where the light-shielding material such as carbon black is solely added and also improves dispersibility, therefore, a molded article having light-shielding ability on the same level can be achieved even if the addition amount of the light-shielding material is reduced by 10% or more and as a result, various effects such as improvement in physical strength, improvement in appearance and reduction in material costs are advantageously provided.

Representative examples of commercially available antioxidants are described below.

(1) Phenol-based antioxidant:

SUMILIZER BHT (Sumitomo Chemical Co., Ltd., hereafter "Sumitomo"), YOSHINOX BHT (Yoshitomi Pharmaceutical Industries Ltd., hereafter "Yoshitomi"), IRGANOX 1076 (Ciba Geigy), MARK AO-50 (Adeca·Argus), SUMILIZER B-76 (Sumitomo), TOMINOX SS (Yoshitomi), IRGANOX 565 (Ciba Geigy), NONOX WSP (ICI), SANTONOX (Monsanto), SUMILIZER WX R (Sumitomo), ANTAGECRYSTAL (Kawaguchi Kagaku K. K., hereafter "Kawaguchi"), IRGANOX 1035 (Ciba Geigy), ANTAGE W-400 (Kawaguchi), IRGANOX 1425 WL (Ciba Geigy), MARK AO-80 (Adeca·Argus), SUMILIZER GA-80 (Sumitomo), TOPANOL CA (ICI), MARK AO-30 (Adeca·Argus), MARK AO-20 (Adeca·Argus), IRGANOX 3114 (Ciba Geigy), MARK AO-330 (Adeca·Argus), IRGANOX 1330 (Ciba Geigy), CYANOX 1790 (ACC), IRGANOX 1010 (Ciba Geigy), MARK AO-60 (Adeca·Argus), SUMILIZER BP-101 (Sumitomo) and TOMINOX TT (Yoshitomi).

(2) Phosphorus-based antioxidant:

IRGAFOS 168 (Ciba Geigy), MARK 2112 (Adeca·Argus), WESTON 618 (Vorg Warner), MARK PEP-8 (Adeca·Argus), ULTRANOX 626 (Vorg·Warner), MARK PEP-24G (Adeca·Argus), and MARK PEP-36 (Adeca·Argus).

(3) Thioether-based antioxidant:

DLTDP "YOSHITOMI" (Yoshitomi), SUMILIZER TPL (Sumitomo), ANTIOX L (NOF Corporation), DMTD "YOSHITOMI" (Yoshitomi), SUMILIZER TPM (Sumitomo), ANTIOX M (NOF Corporation), DSTP "YOSHITOMI" (Yoshitomi), SUMILIZER TPS (Sumitomo), ANTIOX S (NOF Corporation), SEENOX 412S (Sipro), MARK AO-412S (Adeca·Argus), SUMILIZER TP-D (Sumitomo), MARK AO-23 (Adeca·Argus), SANDSTAB P-EPQ (Sand), IRGAFOS P-EPQ FF (Ciba Geigy), IRGANOX 1222 (Ciba Geigy), MARK 329K (Adeca·Argus), WESTON 399 (Vorg-Warner), MARK 260 (Adeca·Argus) and MARK 522A (Adeca·Argus).

(4) Metal Deactivator

NAUGARD XL-1 (Uniroyal), MARK CDA-1 (Adeca·Argus), MARK CDA-6 (Adeca·Argus), LRGANOX MD-1024 (Ciba Geigy) and CUNOX (Mitsui Toatsu).

Phenol-based antioxidants are particularly preferred because they are reluctant to adversely affect photographic properties of a photographic photosensitive material, colored by aging to improve the light-shielding ability and relatively cheap and commercially available phenol-based antioxidants include IRGANOX series products of Ciba Geigy and Sumilizer BHT, Sumilizer BH-76, Sumilizer WX-R and Sumilizer BP-101 of Sumitomo Chemical Co., Ltd. Further, it is effective to use one or more, preferably two or more of 2,6-di-butyl-p-cresol (BHT), a low-volatile and high molecular weight phenol-based antioxidant (e.g., Irganox 1010, Irganox 1076, Topanol CA, Ionox 330, all trade names), dilauryl thiodipropionate, distearylthiopropionate and dialkyl phosphate in combination.

In particular, it is preferred to use at least one of the above-described hindered phenol-based antioxidants having a melting point of 100° C. or higher, preferably 110° C. or higher, more preferably 120° C. or higher and most preferably 130° C. or higher as a representative example of the free radical chain terminator and at least one phosphorus-based antioxidant as a peroxide decomposer because prevention effects on deterioration of resins or additives due to heat can be increased without very worsening photographic properties of a photographic photosensitive material.

A representative formula of the organic cyclic phosphorus compound as one of preferred phosphorus-based antioxidants among antioxidants of the present invention is described below.

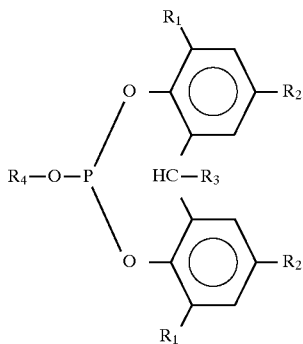

wherein $R_1$ represents a tertiary butyl group or a tertiary amyl group, $R_2$ represents an alkyl group having from 1 to 9 carbon atoms, $R_3$ represents a hydrogen atom or an alkyl group having from 1 to 4 carbon atoms and $R_4$ represents an alkyl group having from 1 to 30 carbon atoms or an aryl group having from 6 to 15 carbon atoms.

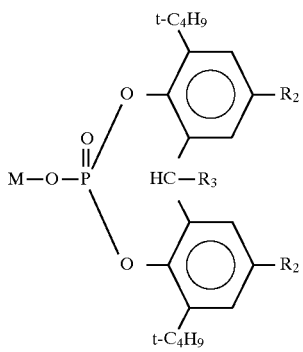

wherein $R_2$ represents an alkyl group having from 1 to 9 carbon atoms, $R_3$ represents a hydrogen atom or an alkyl group having from 1 to 4 carbon atoms and M represents an alkali metal.

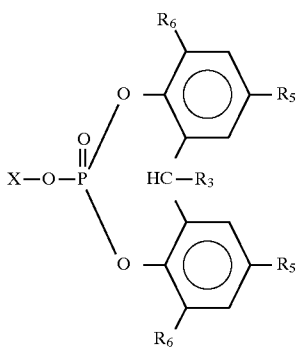

wherein $R_3$ represents a hydrogen atom or an alkyl group having from 1 to 4 carbon atoms, $R_5$ and $R_6$ each represents a hydrogen atom, an alkyl group having from 1 to 12 carbon atoms, a cycloalkyl group, an aryl group or an aralkyl group and X represents —OH or —O$^-$NH$_4^+$.

In addition, various antioxidants disclosed in *Plastic Data Handbook*, published by KK Kogyo Chosa-Kai, pp. 794–799, various antioxidants disclosed in *Plastic Additives*

*Data*, issued by KK Kagaku Kogyo Sha, pp. 327–329 and various antioxidants disclosed in *PLASTICS AGE ENCYCLOPEDIA, ADVANCED VERSION*, issued by KK Plastic Age, pp. 211–212 (1986) may be used by selecting it in view of effects on photographic properties and oxidation prevention effects. In the present invention, it is essential to use these antioxidants individually or in combination of two or more thereof so as not to give bad effects on photographic properties but their addition amount is preferably reduced as much as possible to maintain good photographic properties.

The content of only the antioxidant is preferably from 0.0005 to 5.0 wt %, more preferably from 0.001 to 3.0 wt %, most preferably from 0.002 to 1.0 wt %. If the compounding amount is less than 0.005 wt %, no addition effect but only increase of the cost for kneading results, whereas if the compounding amount exceeds 5.0 wt %, the photographic properties of a photographic photosensitive material using oxidation and reduction reactions may be adversely affected and also the antioxidant may bleed out on the surface of a molded article to worsen the appearance.

The above-described fatty acid metal salt is described below.

By adding a fatty acid metal salt, prevention of an injection molding machine from corrosion, reduction in bleeding out of various additives, prevention of splashing of a light-shielding material or a fibrous filler, improvement in dispersibility of a light-shielding material or a fibrous filler and the like may be intended. The fatty acid metal salt also improves dispersibility of a light-shielding material or a fibrous filler as well as moldability and further neutralizes a catalyst residue or a halide contained in the resin and having bad effect on photographic properties of a photographic photosensitive material to render it harmless to thereby achieve good photographic properties. When the fatty acid metal salt is used in combination with a hydrotalcite compound, corrosion on the injection molding machine can be synergistically prevented and also, if a resin polymerized using a Ziegler Natta catalyst (containing as a main component an alkyl aluminum such as $TiCl_3 \cdot Al(CH_3)_3$) is contained, the fatty acid metal salt scavenges hydrochloric acid and the like generated upon decomposition of the catalyst to give good photographic property.

Examples of the fatty acid metal salt include compounds of a fatty acid having from 6 to 50 carbon atoms, preferably from 10 to 40 carbon atoms, more preferably from 10 to 30 carbon atoms, such as caproic acid, caprylic acid, capric acid, myristic acid, lauric acid, stearic acid, lactic acid, succinic acid, behenic acid, linoleic acid, stearyl lactate, hydroxy stearate, ricinoleic acid, naphthenic acid, oleic acid, montanic acid, erucic acid or palmitic acid, with a metal such as Li, Na, Mg, Ca, Sr, Ba, Zn, Cd, Al, Sn or Pb. The fatty acid metal salt has a melting point of preferably 70° C. or higher, more preferably 90° C. or higher, most preferably 100° C. or higher because the photographic properties of a photographic photosensitive material are not deteriorated and the softening point of the resin is not lowered. Specific examples thereof include calcium stearyl lactate, calcium stearate, magnesium stearate and zinc stearate.

The content of the fatty acid metal salt is from 0.005 to 10.0 wt %, preferably from 0.01 to 5.0 wt %, more preferably from 0.03 to 3.0 wt % and most preferably from 0.05 to 1.5 wt %. If the addition amount is less than 0.01 wt %, the addition effect is scarcely provided but only the cost for kneading increases. On the other hand, if the addition amount exceeds 5.0 wt %, bleeding out or slipping between the noncrystalline resin composition and the screw is caused to fluctuate the discharge amount, as a result, not only molding failures are frequently generated but also uniform kneading cannot be achieved.

The above-described radical scavenger is described below.

Examples of the radial scavenger include 1,1-diphenyl-2-picrylhydrazyl, 1,3,5-triphenylferdazyl, 2,2,6,6-tetramethyl-4-piperidone-1-oxyl, N-(3-N-oxyanilino-1,3-dimethylbutylidene)-aniline oxide, a high valency metal salt such as ferric chloride, diphenylpicrylhydrazine, diphenylpicrylhydrazine, diphenylamine, hydroquinone, t-butylcatechol, dithiobenzoyldisulfide, p,p'-ditolyltrisulfide, a benzoquinone derivative, a nitro compound and a nitroso compound. Among these, preferred is hydroquinone. The above-described radical scavengers may be used individually or several kinds of radical scavengers may be used in combination.

The content of the radical scavenger is preferably from 100 to 10,000 ppm, more preferably from 500 to 5,000 ppm. If the compounding amount is less than 100 ppm, no addition effect is provided but only the cost for kneading is required. On the other hand, if the compounding amount exceeds 10,000 ppm, photographic properties of a photographic photosensitive material are adversely affected or the radical scavenger may bleed out on the surface of a molded article to worsen the appearance.

The above-described hydrate double salt compound is described below.

Representative examples of the hydrate double salt compound which is particularly preferred include a hydrotalcite compound as a double salt represented by the formula:

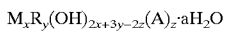

(wherein M represents Mg, Ca or Zn, R represents Al, Cr or Fe, A represents $CO_3$ or $HPO_4$ and x, y, z and a each is a positive number). Specific representative examples thereof include $Mg_6Al_2(OH)_{16}CO_3 \cdot 4H_2O$, $Mg_8Al_2(OH)_{20}CO_3 \cdot 5H_2O$, $Mg_5Al_2(OH)_{14}CO_3 \cdot 4H_2O$, $Mg_{10}Al_2(OH)_{22}(CO_3)_2 \cdot 4H_2O$, $Mg_6Al_2(OH)_{16}HPO_4 \cdot 4H_2O$, $Ca_6Al_2(OH)_{16}CO_3 \cdot 4H_2O$, $Zn_6Al_2(OH)_{16}CO_3 \cdot 4H_2O$, $Zn_6Al_6(OH)_{16}CO_3 \cdot 4H_2O$ and $Mg_{4.5}Al_2(OH)_{13}CO_3 \cdot 3.5H_2O$.

Also included is a hydrotalcite compound represented by the formula:

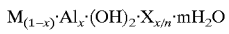

(wherein M represents an alkaline earth metal and Zn, X represents an n-valent anion and x and m each represents a number satisfying the following conditions:

0<x<0.5, and

0≦m≦2), and having a refractive index of from 1.40 to 1.60, preferably from 1.45 to 1.55.

Examples of the n-valent anion represented by X in the above-described formula include anions such as $Cl^-$, $Br^-$, $I^-$, $NO_3^-$, $ClO_4^-$, $SO_4^{2-}$, $CO_3^{2-}$, $SiO_3^{2-}$, $HPO_4^{2-}$, $HBO_3^{2-}$, $PO_4^{3-}$, $Fe(CN)_6^{3-}$, $Fe(CN)_6^{4-}$, $CH_3COC$,

-continued

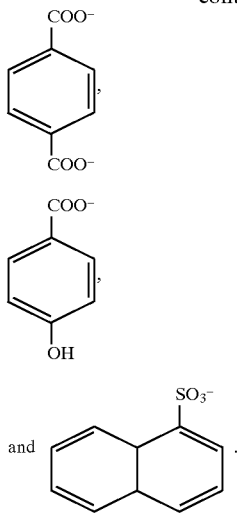

and 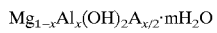

Further included is hydrotalcites comprising magnesium and aluminum and represented by the formula:

$$Mg_{1-x}Al_x(OH)_2A_{x/2}\cdot mH_2O$$

wherein X represents a real number falling in the range of $0<x\leq 0.7$, A represents $CO_3$ and m represents a real number.

Specific preferred examples thereof include the following:

$$Mg_{0.7}Al_{0.3}(OH)_2(CO_3)_{0.15}\cdot 0.54H_2O$$

$$Mg_{0.67}Al_{0.33}(OH)2(CO_3)_{0.165}\cdot 0.5H_2O$$

$$Mg_{0.67}Al_{0.33}(OH)2(CO_3)_{0.165}\cdot 0.2H_2O$$

$$Mg_{0.6}Al_{0.4}(OH)_2(CO_3)_{0.2}\cdot 0.42H_2O$$

$$Mg_{0.75}Al_{0.25}(OH)_2(CO_3)_{0.125}\cdot 0.63H_2O$$

$$Mg_{0.83}Al_{0.17}(OH)_2(CO_3)_{0.085}\cdot 0.4H_2O$$

Also preferred are a burned product of a hydrotalcite compound obtained by burning the above-described hydrotalcite compound to reduce the water content in the crystal structure to from 5 to 35 wt % of the total weight before the processing and a hydrotalcite compound subjected to specific processing such as a perchloric acid ion-type hydrotalcite compound obtained by reacting a perchloric acid with the hydrotalcite compound at a ratio of from 1.5 to 3 mols per mol of the hydrotalcite compound.

These hydrate double salt compounds may be either natural or synthetic. Specific examples of the synthesis method of hydrotalcite compounds include methods disclosed in JP-B-46-2280 and JP-B-50-30039.

In the present invention, the hydrotalcite compound is particularly preferred and can be used without any limit on the crystal structure and crystal particle size.

Examples of the natural hydrotalcite compound include hydrotalcite, stichtite and pyroaurite. These hydrate double salt compounds may be used individually or in combination of two or more thereof. The natural hydrotalcite compound is preferably used in combination with various antioxidants or various fatty acid metal salts which will be described below.

Although not particularly restricted, the above-described hydrotalcite compound as the hydrate double salt which is preferably used in the present invention has an average secondary particle size of 20 μm or less, preferably 10 μm or less, more preferably 5 μm or less and a BET specific surface area of 50 m²/g or less, preferably 40 m²/g or less, more preferably 30 m²/g or less so as to improve moldability and physical properties of the injection molded article.

The content of the hydrate double salt compound is from 0.001 to 5 wt %, preferably from 0.005 to 3.5 wt %, more preferably from 0.01 to 2 wt % and most preferably from 0.05 to 1 wt %. If it is less than 0.001 wt %, anticorrosive effects during production or processing are not provided and the molded article may be colored or the resin may be deteriorated. on the other hand, if it exceeds 5 wt %, bubbles or lumps may be generated in the molded article or the gloss may be lowered to give poor appearance.

The hydrotalcite compound of the present invention is preferably treated with a surface treating agent before use. By applying surface treatment to the hydrotalcite compound, its dispersibility in or affinity for the resin is further improved and thereby processing aptitude and physical properties of the injection molded article are also improved.

Examples of the surface treating agent include various lubricants including metal salts of a higher fatty acid such as sodium laurate, potassium laurate, sodium oleate, potassium oleate, calcium oleate, magnesium stearate, sodium stearate, zinc stearate, potassium stearate, sodium palmitate, potassium palmitate, sodium caprate, potassium caprate, sodium myristate, potassium myristate, sodium linoleate and potassium linoleate; higher fatty acids such as lauric acid, palmitic acid, oleic acid, stearic acid, capric acid, myristic acid and linoleic acid; organic sulfonic acid metal salts such as calcium dodecylbenzenesulfonate and sodium dodecylbenzenesulfonate; coupling agents such as isopropyltriisostearoyl titanate, isopropyltris(dioctylpyrophosphate) titanate, tetraisopropylbis(dioctylphosphite) titanate, vinyltriethoxysilane, γ-methacryloxypropyltrimethoxysilane and γ-glycidoxypropyl-trimethoxysilane; higher fatty acid amides; higher fatty acid esters; silicones; and waxes. In addition, compounds (1) to (19) as representative examples of a surface-covering agent for the light-shielding material may also be used.

The surface treatment with such a surface treating agent may be conducted, for example, by adding an aqueous alkali metal salt solution of a higher fatty acid while stirring to a suspension of hydrotalcite in warm water or by adding dropwise a fusion solution of a higher fatty acid or a dilution solution of a coupling agent while stirring hydrotalcite compound powder in a mixer such as Henschel mixer. The amount of the surface treating agent may be appropriately selected and changed but it is suitably from about 0.01 to 50 wt %, preferably from 0.05 to 35 wt %, more preferably from 0.1 to 20 wt % and most preferably on the order of from 0.5 to 10 wt %, based on the hydrotalcite compound.

Further, in order to more improve dispersion of the hydrotalcite compound, for example, a sorbitan fatty acid ester such as sorbitan monostearate or a glycerol fatty acid ester such as glycerol monostearate may be added to the composition as a dispersant in an amount of from 0.01 to 10 wt %, preferably from 0.05 to 8 wt %, more preferably from 0.08 to 5 wt % and most preferably from 0.1 to 3 wt %. One or more stabilizers selected from the group consisting of a phenol-based antioxidant, a phosphite-based antioxidant and a fatty acid metal salt are particularly preferably used in combination with the hydrate double salt compound, which synergistically improve actions such that processing stability and corrosion prevention effects on the metal surface are improved, coloring of the molded article or deterioration of the resin are prevented, transparency is improved, reduction in physical strength is inhibited and generation of lumps due to burning of the resin is prohibited. In particular, a combination use of the hydrotalcite compound with a fatty acid metal salt is preferred because the above-described effects can be efficiently and synergistically provided.

In this case, in order to avoid adverse effects on the photographic performance of a photographic photosensitive material, (1) a phenol-based antioxidant is added in an amount of from 0.0005 to 5 wt %, preferably from 0.001 to 3 wt %, more preferably from 0.002 to 1 wt %, (2) a phosphorus-based antioxidant is added in an amount of from 0.0005 to 5 wt %, preferably from 0.001 to 3 wt %, more preferably from 0.002 to 1 wt %, and (3) a hydrate double salt compound and/or a fatty acid metal salt (metal soap) is added in an amount of from 0.0005 to 10 wt %, preferably from 0.001 to 5 wt %, more preferably from 0.002 to 3 wt %.

At the same time, the total content of (1), (2) and (3) in the molded article for photographic photosensitive materials is controlled to be from 0.001 to 11 wt %, preferably from 0.002 to 9 wt %, more preferably from 0.003 to 7 wt % and most preferably from 0.05 to 5 wt %. In any case, the addition amount as small as possible for preventing deterioration of the resin is preferred from the standpoint that the photographic performance is not worsened and increase in costs is inhibited.

The above-described oxidation inhibitory synergistic effect-providing agent is described below.

Examples of the oxidation inhibitory synergistic effect-providing agent include phosphoric acid, citric acid, a phosphoric acid compound and a citric acid compound.

The content of the oxidation inhibitory synergistic effect-providing agent is from 0.001 to 2.0 wt %, preferably from 0.005 to 1.5 wt %, more preferably from 0.01 to 1.0 wt %.

An alkaline earth metal salt as described below may also be added in the noncrystalline resin composition.

Representative examples of the alkaline earth metal salt having little bad effect on photographic properties and exhibiting a large inhibitory action against resin deterioration include calcium chloride, potassium chloride, calcium carbonate, barium chloride, barium sulfate, calcium sulfate, magnesium carbonate, magnesium sulfate and barium carbonate.

In particular, because of excellent physical strength, superior photographic properties and prevention capability of corrosion on the injection molding machine, calcium carbonate having a particle size of from 0.01 to 3 μm is preferred and calcium carbonate having a particle size of from 0.02 to 1 μm is most preferred. In order to improve dispersibility into the noncrystalline resin composition and to achieve good photographic properties, the surface of calcium carbonate is preferably covered with one or more of surface-covering materials (1) to (19) described for the light-shielding material (to prevent generation of microgrids or the like).

The content of the alkaline earth metal salt is from 0.1 to 49.9 wt %, preferably from 0.2 to 20 wt %. If the content is less than 0.1 wt %, no effect is provided but only the cost for kneading increases, whereas if it exceeds 49.9 wt %, the dispersibility is worsened to cause frequent generation of microgrids, giving rise to poor appearance. The physical strength is also diminished and the product can hardly be used in practice as an injection molded article for photographic photosensitive materials.

The injection molded article for photographic photosensitive materials of the present invention may contain an ultraviolet absorbent. By adding an ultraviolet absorbent, light deterioration can be prevented.

The addition amount of the ultraviolet absorbent is preferably from 0.001 to 10 wt %, more preferably from 0.005 to 5 wt %, most preferably from 0.1 to 3 wt %. If the addition amount is less than 0.001 wt %, the ultraviolet absorption effect cannot be satisfied, whereas if the addition amount exceeds 10 wt %, bleeding out is caused to adversely affect the photographic photosensitive material.

Examples of the ultraviolet absorbent include the following:

(1) Salicylic acid-based ultraviolet absorbent

Phenylsalicylate p-t-Butylphenylsalicyalte p-Octylphenylsalicylate (2) Benzophenone-based ultraviolet absorbent 2,4-Dihydroxybenzophenone 2-Hydroxy-4-methoxybenzophenone 2-Hydroxy-4-octoxybenzophenone 2-Hydroxy-4-dodecyloxybenzophenone 2,2'-Dihydroxy-4-methoxybenzophenone 2,2'-Dihydroxy-4,4'-dimethoxybenzophenone 2-Hydroxy-4-methoxy-5-sulfobenzophenone (3) Benzotriazole-based ultraviolet absorbent 2-(2'-Hydroxy-5'-methylphenyl)benzotriazole 2-(2'-Hydroxy-5'-t-butylphenyl)benzotriazole 2-(2'-Hydroxy-3',5'-di-t-butylphenyl)benzotriazole 2-(2'-Hydroxy-3'-t-butyl-5'-methylphenyl)-5-chlorobenzotriazole 2-(2'-Hydroxy-3',5'-di-t-butylphenyl)-5-chlorobenzotriazole 2-(2'-Hydroxy-3',5'-di-t-amylphenyl)benzotriazole 2-(2'-Hydroxy-4'-octoxyphenyl)benzotriazole 2-[2'-Hydroxy-3'-(3",4",5",6"-tetrahydrophthalimidomethyl)-5'-methylphenyl]benzotriazole 2,2-Methylene-bis[4-(1,1,3,3-tetramethylbutyl)-6-(2H-benzotriazole-2-il)phenol]]

(4) Cyanoacrylate-based ultraviolet absorbent

2-Ethylhexyl-2-cyano-3,3'-di-phenylacrylate

2-Ethyl-2-cyano-3,3'-diphenylacrylate

The injection molded article for photographic photosensitive materials of the present invention may contain an age resistor. By adding an age resistor, the aging {namely, reduction of capabilities resulting from changes in appearance (change in tone, luster or gloss, generation of cracks), in physical properties (softening, hardening, change in strength, change into fragility, reduction of elongation, change in viscoelasticity) or in chemical properties, due to the environment (heat, sunlight, humidity, ozone, oxygen) where an injection molded article is placed or with the elapse of time} can be prevented.

The addition amount of the age resistor is preferably from 0.001 to 10 wt %, more preferably from 0.05 to 5 wt %, most preferably from 0.1 to 3 wt %. If the addition amount is less than 0.001 wt %, the aging prevention effect cannot be satisfied, whereas if the addition amount exceeds 10 wt %, the bleeding-out amount increases to worsen the appearance or the aging resistor attaches to the photographic photosensitive material to cause development inhibition to result in uneven development.

Examples of the age resistor include a naphthylamine-based age resistor such as phenyl-β-naphthylamine, a diphenylamine-based age resistor such as N,N'-diphenylethylenediamine, a p-phenylenediamine-based age resistor such as N,N'-diphenyl-p-phenylenediamine, a hydroquinone derivative such as 6-ethoxy-2,2,4-trimethyl-1,2-dihydroquinoline, a monophenol-based age resistor such as 2,6-di-tert-butyl-4-methylphenol, a polyphenol-based age resistor such as 2,2'-methylene-bis(4-ethyl-6-t-butylphenol), a thiobisphenol-based age resistor such as 4,4'-thiobis(6-t-butyl-3-methylphenol) and a 2-mercaptobenzimidazole-based age resistor. These age resistors may be used either individually or in combination of two or more and in the latter case, the blending may be made at any proportion according to properties of respective compounds.

The injection molded article for photographic photosensitive materials of the present invention may contain various lubricants according to the use object.

By adding a lubricant, improvements can be achieved in injection moldability, in lubricity, in dispersibility of a light-shielding material, a fibrous or non-fibrous filler or a hydrate double salt compound (of which particularly preferred and representative example is a hydrotalcite compound) and as a result, improvements in photographic properties, in appearance of the injection molded article, in antistatic property and in flowability of the resin composition.

Representative commercially available lubricants and manufacturers thereof are described below.

(1) Fatty Acid Amide-based Lubricant:
Saturated Fatty Acid Amide-based Lubricant
1) Behenic Amide-based Lubricant
Diamid KN (Nippon Kasei), etc.
2) Stearic Amide-based Lubricant
Armide HT (Lion Fat & Oil), Alflow S-10 (Nippon Oils & Fats), Fatty Acid Amide S (Kao Corporation), Diamid 200 (Nippon Kasei), Diamid AP-1 (Nippon Kasei), Amide S·Amide T (Nitto Chemical), Newtron-2 (Nippon Seika), etc.
Hydroxystearic Acid Amide-based Lubricant
1) Palmitic Amide-based Lubricant
Newtron S-18 (Nippon Seika), Amide P (Nitto Chemical), etc.
2) Lauric Amide-based Lubricant
Amide C (Lion·Aczo), Diamid (Nippon Kasei), etc.
Unsaturated Fatty Acid Amide-based Lubricant
1) Erucic Amide-based Lubricant
Alflow P-10 (Nippon Oils & Fats), Newtron-S (Nippon Seika), LUBROL (I.C.I.), Diamid L-200 (Nippon Kasei), etc.
2) Oleic Amide-based Lubricant
Armoslip CP (Lion·Aczo), Newtron (Nippon Seika), Newtron E-18 (Nippon Seika), Amide O (Nitto Chemical), Diamid O-200 and Diamid G-200 (Nippon Kasei), Alflow E-10 (Nippon Oils & Fats), Fatty Acid Amide O (Kao Corporation), etc.
Bis-fatty Acid Amide-based Lubricant
1) Methylenebisbehenic Amide-based Lubricant
Diamid NK Bis (Nippon Kasei), etc.
2) Methylenebisstearic Amide-based Lubricant
Diamid 200 Bis (Nippon Kasei), Armowax (Lion·Aczo), Bisamide (Nitto Chemical), etc.
3) Methylenebisoleic Amide-based Lubricant
Lubron O (Nippon Kasei), etc.
4) Ethylenebisstearic Amide-based Lubricant
Armoslip EBS (Lion·Aczo), etc.
5) Hexamethylenebisstearic Amide-based Lubricant
Amide 65 (Kawaken Fine Chemical), etc.
6) Hexamethylenebisoleic Amide-based Lubricant
Amide 60 (Kawaken Fine Chemical), etc.

(2) Nonionic Surface Active Agent-based Lubricant
Electrostripper TS-2, Electrostripper TS-3 (Kao Corporation), etc.

(3) Hydrocarbon-based Lubricant
Liquid paraffin, natural paraffin, microwax, isoparaffin-based petroleum hydrocarbon synthetic paraffin, polyethylene wax (having a number average molecular weight of 10,000 or less, preferably 8,000 or less, more preferably 6,000 or less), polypropylene wax (having a number average molecular weight of 10,000 or less, preferably 8,000 or less, more preferably 6,000 or less), chlorinated hydrocarbon, fluorocarbon, etc.

(4) Fatty Acid-based Lubricant
Higher fatty acid (preferably having from 12 to 35 carbon atoms, specifically, caproic acid, stearic acid, oleic acid, erucic acid, palmitic acid, etc.), oxy fatty acid, etc.

(5) Ester-based Lubricant
Lower alcohol ester of fatty acid, polyhydric alcohol ester of fatty acid, polyglucose ester of fatty acid, fatty alcohol ester of fatty acid, etc.

(6) Alcohol-based Lubricant
Polyhydric alcohol, polyglycol, polyglycerol, etc.

(7) Fatty Acid Metal Salt-based Lubricant (Metal Soap)
Compounds of a higher fatty acid such as lauric acid, stearic acid, succinic acid, stearyl lactate, lactic acid, phthalic acid, benzoic acid, hydroxystearic acid, ricinoleic acid, naphthenic acid, oleic acid, palmitic acid or erucic acid with a metal such as Li, Na, Mg, Ca, Sr, Ba, Zn, Cd, Al, Sn, Pb or Cd, with magnesium stearate, calcium stearate, sodium stearate, zinc stearate, calcium oleate, zinc oleate and magnesium oleate being preferred.

(8) Montanic Ester Moiety-saponified Product (9) Silicone-based Lubricant
Dimethylpolysiloxane in various grades and modified products thereof (e.g., Shin-Etsu Silicone, Toray Silicone). In particular, various silicone oils are preferred because not only they provide effects such as improvement in resin flowability and improvement in lubricity but also, in the case of use in combination with a light-shielding material, they improve dispersibility of the light-shielding material and muddle the noncrystalline resin to white to increase haze (according to ASTM D-1003) to thereby provide unexpected effects such as improvement in coloring force and light-shielding ability.

The above-described silicone oil has a viscosity at room temperature of from 50 to 100,000 cSt, preferably from 5,000 to 30,000 cSt, most preferably from 8,000 to 25,000 cSt.

Specific examples of silicones and modified silicones include silicone oils containing a modified siloxane bond, such as polymethylphenylsiloxane, olefin-modified silicone, amide-modified silicone, polydimethylsiloxane, amino-modified silicone, carboxyl-modified silicone, α-methylstyrene-modified silicone, polyether-modified silicone modified by polyethylene glycol or polypropylene glycol, olefin/polyether-modified silicone, epoxy-modified silicone, amino-modified silicone and alcohol-modified silicone. Among these silicone oils, preferred particularly when applied to the injection molded article for photographic photosensitive materials are olefin-modified silicone, amide-modified silicone, polydimethyl-siloxane, polyether-modified silicone and olefin/polyether-modified silicone because the adverse effect on photographic properties of a photographic photosensitive material is small and the lubrication effect is great.

The addition of silicone oil provides the following is effects.

(1) only by using the silicone oil in combination with a fibrous filler (loading material), a non-fibrous filler, a light-shielding material or a pigment, it covers the surface of these to improve dispersibility.

(2) Flowability of the resin is improved to lighten the motor load of screws to thereby prevent occurrence of melt fracture.

(3) Even if a fatty acid amide which bleeds out to turn into white powder is not added, sufficient lubricity is ensured.

(4) The friction coefficient of the injection molded article can be reduced even under heating.

(5) In the case of a combination use with a light-shielding material, the noncrystalline resin is muddled to white to increase haze and as a result, coloring force and light-shielding ability are elevated and the light-shielding property can be ensured even if the addition amount of the light-shielding material which lowers physical properties is reduced.

Among the above-described lubricants, for the purpose of improvement in lubricity, various saturated fatty acid amide-based lubricants, various unsaturated fatty acid amide-based lubricants and silicone-based lubricants are preferred and for the purpose of improvement in dispersibility of a light-shielding material, a fibrous or non-fibrous filler or a hydrotalcite compound, improvement in dispersibility of a light-shielding material by the surface covering as described above, impartment of hygroscopicity reduction effects and improvement of flowability of the resin, ester-based lubricants, fatty acid metal salts, alcohol-based lubricants, hydrocarbon-based lubricants and fatty acid-based lubricants are preferred. Among fatty acid metal salts, calcium stearyl lactate, calcium stearate, magnesium stearate and zinc stearate are preferred because they neutralize a halogen compound or a metal compound (including polymerization catalyst) having bad effects on photographic properties of a photographic photosensitive material to render the compound harmless to the photographic properties of a photographic photosensitive material, and in particular, magnesium stearate and zinc stearate are preferred.

The fatty acid metal salt and the chelating agent which will be described later are used to provide an injection molded article for photographic photosensitive materials so that the photographic photosensitive material can maintain good quality for a long period of time and the injection molded article is prepared by the injection molding using a noncrystalline resin composition comprising a homopolystyrene resin by any polymerization method, a rubber-modified polystyrene resin and various rubber-modified aromatic monovinyl resins with the is total amount of these being 5.0 wt %. As a result, although the recycled resin has hitherto not been used in view of photographic property failure and the use has been limited only to an injection molded article for photographic photosensitive materials obtained by the injection molding using specific virgin resins, the styrene-based resin of all molded articles becomes usable in recycling. By this effect, not only industrial wastes can be reduced but also use of cheap resins at the site becomes possible in respective countries over the world directing for production improvement, which gives outstandingly great effects such as reduction in costs, prevention of trade friction and capability of observance of Local Contents Law.

The injection molded article for photographic photosensitive materials of the present invention may contain various antistatic agents according to the use object. By adding an antistatic agent, static trouble, molding failure or bad dispersion of a light-shielding material can be prevented.

The addition amount of the antistatic agent is preferably from 0.005 to 5.0 wt %, more preferably from 0.05 to 3.5 wt %, most preferably from 0.1 to 2.0 wt %. If the addition amount is less than 0.005 wt %, the addition effect is not satisfactory but only the cost for kneading increases, whereas if the addition amount exceeds 5.0 wt %, slipping between the molten resin and the screw of the extruder is readily caused and as a result, the discharge amount of resin fluctuates. Also, blocking or bleeding out becomes easy to occur with the elapse of time after molding.

Representative examples of the antistatic agent are described below.

I. Nonionic (1) Alkylamine derivative:
   T-B103 (Matsumoto Yushi), T-B104 (Matsumoto Yushi)
Alkylamide type
   Polyoxyethylene alkylamine: Armostat 310 (Lion Fat & Oil)
   Tertiary amine (laurylamine): Armostat 400 (Lion Fat & Oil)
   N,N-bis(2-hydroxyethylcocoamine):
   Armostat 410 (Lion Fat & Oil)
   Tertiary amine:
   ANTISTATIC 273C, 273, 273E (Fine Org. Chem.)
   N-hydroxyhexadecyldiethanolamine: Belg. P. 654, 049
   N-hydroxyoctadecyldiethanolamine: National Dist.

(2) Fatty acid amide derivative:
   TB-115 (Matsumoto Yushi), Elegan P100 (NOF Corporation), Erik SM-2 (Yoshimura Yukagaku)
   Hydroxystearic amide
   Oxalic-N,N'-distearylamidebutylester (Hoechst)
   Polyoxyethylenealkylamide (3) Ether type
   Polyoxyethylenealkylether
   RO $(CH_2CH_2O)_n$H
   Polyoxyethylenealkylphenyl ether
   Special nonionic type: Resistat 104, PE100, 116–118 (Dai-ichi Kogyo Seiyaku), Resistat PE132, 139 (Dai-ichi Kogyo Seiyaku), Elegan E115, Chemistat 1005 (NOF Corporation), Erik BM-1 (Yoshimura Yukagaku), Electrostripper TS, TS2, 3, 5, EA, EA2, 3 (Kao Corporation).

(4) Polyhydric alcohol ester type
   Glycerol fatty acid ester: mono-, di- or triglyceride of stearic acid or hydroxystearic acid, Monogly (Nippon Shono), TB-123 (Matsumoto Yushi), Resistat 113 (Dai-ichi Kogyo Seiyaku).
   Sorbitan fatty acid ester
   Special ester: Erik BS-1 (Yoshimura Yukagaku)
   1-Hydroxyethyl-2-dodecylglyoxazoline:
   (British·Cellophane)

II. Anionic (1) Sulfonic acids
   Alkylsulfonate
   $RSO_3Na$
   Alkylbenzenesulfonate
   Alkylsulfate
   $ROSO_3Na$ (2) Phosphoric ester type
  Alkyl phosphate

III. Cationic
(1) Amide type cation:
  Resistat PE300, 401, 402, 406, 411 (Dai-ichi Kogyo Seiyaku)
(2) Quaternary ammonium salt
  Quaternary ammonium chloride
  Quaternary ammonium sulfate
  Quaternary ammonium nitrate
  Catimin CSM-9 (Yoshimura Yukagaku), CATANAC609 (American·Cyanamide), Denon 314C (Marubishi Yuka), Armostat 300 (Lion Fat & Oil), 100 V (ARMOR), Electrostripper ES (Kao Corporation), Chemistat 2009A (NOF Corporation).
  Stearamido propyldimethyl-β-hydroxyethyl ammonium nitrate:
  CATANAC·SN (American·Cyanamide)

IV. Ampho-ionic
(1) Alkylbetaine type:
(2) Imidazoline type:
  Leostat 53, 532 (Lion Fat & Oil), AMS 53 (Lion Fat & Oil), AMS 303, 313 (Lion Fat & Oil).
  Alkylimidazoline type
(3) Metal salt type:
  AMS 576 (Lion Fat & Oil)
  Leostat 826, 923 (Lion Fat & Oil)
(4) Alkyl alanine type:

V. Electroconductive Resin

Polyvinylbenzyl type cation
Polyacrylic acid type cation

VI. Others:

Resistat 204, 205 (Dai-ichi Kogyo Seiyaku), Elegan 2E, 100E (Nippon Oils & Fats), Chemistat 1002, 1003, 2010 (Nippon Oils & Fats), Erik 51 (Yoshimura Yukagaku), ALROMINE RV-100 (Geigy)

Among the above-described antistatic agents, the non-ionic antistatic agent is particularly preferred due to small bad effect on photographic properties and human body and large static mark prevention effect.

Also, in the injection molded article of the present invention comprising a noncrystalline resin composition easy to generate static marks on the photographic photosensitive material by electric charge, it is preferred to use an antistatic agent by selecting the kind and the addition amount thereof so that no adverse effect is given on the photographic photosensitive material, from the antistatic agents described in *Binran, Rubber/Plastic Compounding Chemicals (2nd Revision)*, KK Rubber Digest, pp. 381–388, the antistatic agents described in *Zoho, Taiden Boshi Zai -Kobunshi no Hyomen Kaishitsu-*, Saiwai Shobo, pp. 64–104 and pp. 236–266 (Mar. 25, 1972) and the antistatic agents described in *Bessatsu Kagaku Kogvo, Plastic Tenkazai Data Shu*, Kagaku Kogyo KK, pp. 117–153 (Oct. 1, 1968).

In addition, for the antistatic purpose, an inorganic salt compound is added to the noncrystalline resin composition in an amount of from 0.01 to 20 wt %, preferably from 0.05 to 15 wt %, more preferably from 0.1 to 10 wt %.

If the addition amount is less than 0.01 wt %, no addition effect is provided but only the cost for kneading is increased and also even if it exceeds 20 wt %, no effect is provided from the increase of amount but only the cost for materials is increased and in addition, injection molding failures such as bubbling or silver streaks are caused. Examples of the inorganic compound having such a working effect include inorganic salt compounds comprising a salt of at least one element selected from lithium, sodium, potassium magnesium, calcium, lead, iron, copper, zinc, aluminum, tin, strontium and manganese and among these, particularly preferred in view of effects and economical points are hydrochlorides such as sodium chloride, potassium chloride, magnesium chloride, calcium chloride, iron chloride and copper chloride, nitrates such as potassium nitrate, magnesium nitrate, nitrate and zinc nitrate, sulfates such as sodium sulfate, aluminum sulfate, magnesium sulfate and iron sulfate, acid salts such as potassium hydrogenphosphate and sodium phosphate, borates such as potassium borate and bromides such as sodium bromide and lithium bromide. These compounds may have water of crystallization.

In order to impart proper slipperiness, improvement in dispersibility of a light-shielding material, improvement in injection moldability, anticlouding property and antistatic property to the injection molded article, it is preferred to add at least one of an aliphatic alcohol-based fatty acid ester which is a compound of an aliphatic alcohol having from 1 to 12, preferably from 1 to 6 carbon atoms with a fatty acid having from 10 to 22, preferably from 12 to 18 carbon atoms, of which specific examples include monoglycerol oleate, polyglycerol oleate, glycerol trirecinolate, glycerol acetylrecinolate, methyl acetylrecinolate, ethyl acetylrecinolate, butyl acetylrecinolate, propylene glycol oleate, propylene glycol laurate, pentaerythritol oleate, polyethylene glycol oleate, polypropylene glycol oleate, polyoxyethylene glycerol, polyoxypropylene glycerol, sorbitan oleate, sorbitan laurate, polyethylene glycol sorbitan oleate and polyethylene glycol sorbitan laurate, and a polyalkylene ether polyol, of which specific examples include polyethylene glycol and polypropylene glycol, in an amount of from 0.5 to 5 wt %, preferably from 1 to 3 wt %.

The injection molded article for photographic photosensitive materials of the present invention may contain a dripproofing agent. By adding a dripproofing agent, dewing upon use under high humidity conditions or in an environment of large temperature difference (for example, taking out an article from a low-temperature storehouse or a refrigerator and using it immediately) can be prevented or precipitation as white powder of additives ready to bleed out such as a lubricant or an antioxidant can be inhibited.

The addition amount of the dripproofing agent is preferably from 0.01 to 5.0 wt %, more preferably from 0.1 to 3.0 wt %. If the addition amount is less than 0.01 wt %, almost no dripproofing or anticlouding effect is provided but only the cost for kneading increases. Also, the effect of inhibiting precipitation as white powder of additives ready to bleed out, such as a lubricant and an antioxidant, is not provided. On the other hand, if the addition amount exceeds 5.0 wt %, although the dripproofing or anticlouding effect may be sufficiently exercised, almost no effect comes from the increase of amount but only the cost increases. As a matter of problem, the surface of container becomes sticky and dust or trash powder are liable to adhere. When dust adheres to photographic film, a trouble of uneven developing rate occurs.

Examples of the dripproofing agent include diglycerol monostearic acid ester, polyglycerol monopalmitic acid ester, sorbitan monolaurylic acid ester, sorbitan monostearic acid ester, sorbitan monooleic acid ester, sorbitan monoerucic acid ester, polyoxyethylene sorbitan fatty acid ester, stearic acid monoglyceride, palmitic acid monoglyceride, oleic acid monoglyceride, lauric acid monoglyceride, polyoxyethylene nonylphenol ether, sorbitan sesquipalmitate, diglycerol sesquioleate, sorbitol fatty acid ester, sorbitol fatty acid dibasic acid ester, diglycerol fatty acid-dibasic aid ester, glycerol fatty acid-dibasic acid ester, sorbitan fatty acid. dibasic acid ester, sorbitan palmitate, sorbitan stearate, sorbitan palmitate-propylene oxide 3 moles adduct, sorbitan palmitate-propylene oxide 2 moles adduct, sorbitol stearate, sorbitol stearate-ethylene oxide 3 moles adduct, diglycerol palmitate, glycerol palmitate, glycerol palmitate-ethylene oxide 3 moles adduct, etc.

The dripproof ing agent has a contact angle of water of preferably 45° or less, more preferably 35° or less. Also, two or more of a water-absorptive material, a hygroscopic material and a dripproofing agent may be used in combination.

It is preferred to subject the injection molded article containing a dripproofing agent to surface activation treatment such as corona discharge treatment, ozone contact treatment or plasma treatment because the anticlouding effect and dripproofing effect are more effectively exerted. In particular, in order to impart proper slipperiness, improvement in dispersibility of a light-shielding material, improvement in injection moldability, anticlouding property and antistatic property to the injection molded article, it is preferred to add at least one of an aliphatic alcohol-based fatty acid ester which is a compound of an aliphatic alcohol having from 1 to 12, preferably from 1 to 6 carbon atoms with a fatty acid having from 10 to 22, preferably from 12 to 18 carbon atoms, of which specific examples include monoglycerol oleate, polyglycerol oleate, glycerol trirecinolate, glycerol acetylrecinolate, methyl acetylrecinolate, ethyl acetylrecinolate, butyl acetylrecinolate, propylene glycol oleate, propylene glycol laurate, pentaerythritol oleate, polyethylene glycol oleate, polypropylene glycol oleate, polyoxyethylene glycerol, polyoxypropylene glycerol, sorbitan oleate, sorbitan laurate, polyethylene glycol sorbitan oleate and polyethylene glycol sorbitan laurate, and a polyalkylene ether polyol, of which specific examples include polyethylene glycol and polypropylene glycol, in an amount of from 0.01 to 5 wt %, preferably from 0.1 to 3 wt %.

The injection molded article for photographic photosensitive materials of the present invention may contain a deodorant so as to prevent offensive odor of aldehyde or acid generated by heat deterioration or heat decomposition of a thermoplastic resin, a compatibilizing agent or other low molecular weight additives or offensive odor of an antiseptic or a curing agent incorporated into the photographic photosensitive material from filling the sealed package to give users unpleasantness.

The addition amount of the deodorant is from 0.1 to 50 wt %, preferably from 0.5 to 40 wt %, more preferably from 1.0 to 30 wt %. If the addition amount is less than 0.1 wt %, the addition effect is not satisfactory but only the cost for kneading increases. On the other hand, if the addition amount exceeds 50 wt %, almost no effect comes from the increase of amount but only the cost for materials increases and in addition, the production of the packaging material for photographic photosensitive materials becomes difficult. Further, the physical strength is lowered, photographic properties are worsened and thus, the practical use becomes difficult.

Examples of the deodorant include an organic carboxylic acid, a mixture of an organic carboxylic acid with a zinc compound and a mixture of an organic carboxylic acid, a zinc compound and an aluminum compound.

The organic carboxylic acid includes an aliphatic polycarboxylic acid, an aromatic polycarboxylic acid and an acidic polyester compound having a carboxylic group at the terminal as a reaction product of the aliphatic or aromatic polycarboxylic acid with a polyhydric alcohol compound.

Examples of the aliphatic polycarboxylic acid include di- or tricarboxylic acids such as oxalic acid, malonic acid, succinic acid, adipic acid, fumaric acid, methylfumaric acid, maleic acid, methylmaleic acid, itaconic acid, acetylene acid, malic acid, methylmalic acid, citric acid, isocitric acid, mesaconic acid and citraconic acid or a slat thereof, and among these, preferred are citric acid, fumaric acid and a salt thereof.

Examples of the aromatic polycarboxylic acid include aromatic carboxylic acids such as phthalic acid, terephthalic acid, isophthalic acid, trimelitic acid, pyromelitic acid, benzenehexatricarboxylic acid, naphthalenedicarboxylic acid, naphthalenetricarboxylic acid, naphthalenetetracarboxylic acid and azobenzenetetracarboxylic acid and an anhydride thereof, and among these, preferred are benzenetricarboxylic acid and trimelitic acid.

Examples of the acidic polyester compound having a carboxyl group at the terminal include polyesters having a carboxyl group at the terminal resulting from reaction of a polycarboxylic acid such as phthalic acid with a polyhydric alcohol such as ethylene glycol or diethylene glycol, and acidic cellulose derivatives modified with a polycarboxylic acid.

The zinc compound mixed and used together with the organic carboxylic acid includes inorganic zinc salts such as zinc oxide, zinc chloride, zinc sulfate, zinc phosphate and zinc carbonate and organic zinc salts such as zinc citrate and zinc fumarate, and the ratio of organic carboxylic acid : zinc compound is preferably in the range of from 1:0.1 to 1:3.0 (part by weight).

The aluminum compound mixed and used together with the organic carboxylic acid and zinc compound includes aluminum sulfate and potassium, and the ratio of organic carboxylic acid: zinc compound: aluminum compound is preferably in the range of from 1:0.1:0.1 to 1:3:3 (part by weight).

The injection molded article for photographic photosensitive materials of the present invention may contain oxygen scavenger so as to remove oxygen which adversely affects photographic properties of a photographic photosensitive material (for example, which deteriorates sensitizers or couplers in the photographic photosensitive material by aging to cause sensitization failure, fog or in case of color printing paper or color negative photographic film, abnormal coloration to disorder the color balance of prints).

The addition amount of the oxygen scavenger is preferably from 0.1 to 50 wt %, more preferably from 0.5 to 40 wt %, most preferably from 1.0 to 30 wt %. If the addition amount is less than 0.1 wt %, the addition effect is not satisfactory but only the cost for kneading increases. On the other hand, if the addition amount exceeds 50 wt %, almost no effect comes from the increase of amount but only the cost for materials increases and in addition, production of the packaging material for photographic photosensitive materials is becomes difficult. Further, the physical strength is lowered, photographic properties are worsened and thus, the practical use becomes difficult.

Examples of the oxygen scavenger include sulfite, hydrogensulfite, dithionite, hydroquinone, catechol, resorcinol, pyrogallol, gallate, ascorbic acid and/or a salt thereof, isoascrobic acid and/or a salt thereof, glucose, lignin, dibutylhydroxytoluene, butylhydroxyanisole, ferrous salt, deodorants containing metal powder such as iron powder, carbon dioxide-generating deodorants, carbon dioxide-absorbing deodorants, cristobalite, zeolite, hydrosulfite, glucose oxitase, sarcosine, alkali metal sulfide, alkali carbonate, sodium thiosulfate, sodium alum, disodium hydrogenphosphate dodecahydrate, sodium silicate hydrate, sodium borate hydrate, ferrous sulfate silicate heptahydrate, activated clay and mordenite.

Preferred are those comprising hydrosulfite as a main component, those comprising an organic material such as L-ascorbic acid as a main component, those comprising iron powder as a main component, a mixed composition of iron with at least one selected from the group consisting of ferrous silicate·sulfate heptahydrate, sodium alum, disodium hydrogenphosphate dodecahydrate, sodium silicate hydrate and sodium borate hydrate, hydrosulfite and calcium hydroxide or sodium bicarbonate and activated carbon, iron powder and an accelerated salt and hydrated material, non-oxidative metal powder and sodium thiosulfate and solid reaction aid, iron powder and sodium thiosulfate and activated carbon, active iron oxide, metal oxide, palladium, saccharides and enzymatic series.

The injection molded article for photographic photosensitive materials of the invention may contain a moisture absorbent so as to reduce the water content in the package, which fractures dyes or couplers in the photographic photosensitive emulsion layers.

The addition amount of the moisture absorbent is preferably from 0.1 to 50 wt %, more preferably from 0.5 to 40 wt %, most preferably from 1.0 to 30 wt %. If the addition amount is less than 0.1 wt %, the addition effect is not satisfactory but only the cost for kneading increases. On the other hand, if the addition amount exceeds 50 wt %, almost no effect comes from the increase of amount but only the cost for materials increases and in addition, production of the packaging material for photographic photosensitive materials becomes difficult. Further, the physical strength is lowered, photographic properties are worsened and thus, the practical use becomes difficult.

Examples of the moisture absorbent include a water-absorptive resin having a carboxylate group, a crosslinking polyacrylic alkali metal salt, an ethylene copolymer resin containing carboxylate, an acrylic alkali metal graft starch crosslinking agent, a crosslinked polyvinyl alcohol-acrylic alkali metal salt copolymer, a crosslinked product of a polyvinyl alcohol-maleic anhydride copolymer, a modified cellulose, a water-soluble polymer crosslinking agent, a self-crosslinkable acrylic alkali metal salt polymer, polyacrylic acid or an alkali salt thereof, polyacrylic amide or a partial hydrolysate thereof, polyvinylpyrrolidone, sulfonated polystyrene, sodium polyacrylamide-2-methylpropane sulfonate, a graft polymer of starch-acrylic nitrile or a hydrolysate thereof, a hydrolysate of polyacrylonitrile, an acrylamide and acrylic acid copolymer, carboxymethyl cellulose, vinylstyrene sulfonic acid, a Mannich reaction product of polyacrylamide, polyacrylamine, dimethylaminoethyl methacrylate homopolymer or copolymer with acrylamide, a homopolymer of a quaternized ammonium salt of dimethylaminoethyl methacrylate with methyl chloride or a copolymer thereof with acrylamide, polydimethyl-allylamine quaternary ammonium salt, quaternized vinylbenzyl-amine polymer, an acetylating agent of chitosan, a polyhydric amine of epichlorohydrin or a condensation reaction product thereof with monoamine, a resin obtained by adsorbing a polyamidopolyamine epichlorohydrin-based thermoplastic resin on the surface of highly water-absorptive resin particle and then heat curing it, a copolymer of a hydrophilic vinyl monomer (e.g., an acrylamide derivative) and a hydrophobic vinyl monomer (e.g., a methacrylate derivative), a sodium salt of an isobutylene-maleic anhydride copolymer, a sodium salt of a graft copolymer of starch and acrylic acid and an acrylic acid derivative, a partially crosslinked product of carboxymethyl cellulose polybasic acid, a partial crosslinked product of polyethylene oxide, a partial crosslinked product of polyacrylic acid, a surface coated product of a highly water-absorptive polymer, a mixture of a highly water-absorptive polymer and an inorganic material (e.g., attapulgite, kaolin, talc, diatomaceous earth), a mixture of a highly water-absorptive resin having an anionic dissociation group and a highly water-absorptive resin having a cationic dissociation group, a starch acrylic acid, a sodium acrylate copolymer and a starch sodium acrylate copolymer.

Among these, preferred are those capable of high water absorption started from starch, cellulose or a synthetic polymer.

The injection molded article for photographic photosensitive materials of the present invention may contain a fragrance so as to deceive the offensive odor or malodor in the package having sealed therein a photographic photosensitive material on the use by users and to give users pleasant perfume.

The addition amount of the fragrance is preferably from 0.005 to 10 wt %, more preferably from 0.01 to 8 wt %, most preferably from 0.05 to 5 wt %. If the addition amount is less than 0.005 wt %, the addition effect is not satisfactory but only the cost for kneading increase. On the other hand, if the addition amount exceeds 10 wt %, almost no effect comes from the increase of amount but only the cost for materials increases. Some kinds of fragrance adversely affect photographic properties of a photographic photosensitive material or give users unpleasantness and the practical use becomes difficult.

Examples of the fragrance include a natural fragrance component such as lilac flower oil, jasmine, abies oil, cinnamon oil, lavender oil and lemon oil, and a synthetic fragrance component such as geraniol, eugenol, n-octyl alcohol, carbitol, cis-jasmine, lemonterpene, menthone, methyl salicylate, methyl phenyl carbinol, triethylcitrate, benzyl benzoate, silatol, d-limonene, ethyl cinnamate, octanol, benzyl benzoate, alkylene glycol, benzyl salicylate, linarool, vanillin, coumarin, methyl naphthyl ketone and rose phenone.

The fragrance is used by finely graining it into microcapsules or incorporating it into cyclodextrin, maltosil cyclodextrin, zeolite, starch or talc.

The injection molded article for photographic photosensitive materials of the present invention may contain a chelating agent so as to adsorb a harmful material which adversely affects the photographic photosensitive material to render the material harmless.

The addition amount of the chelating agent in the non-crystalline resin composition is from 0.01 to 10 wt %, preferably from 0.05 to 8 wt %, more preferably from 0.1 to 6 wt %. If a light-shielding material is used in combination, dispersibility of the light-shielding material is improved and excellent effects such as deodorant effect and adsorption of a material or gas which adversely affects photographic properties of a photographic photosensitive material, to render it harmless are provided.

If the addition amount is less than 0.01 wt %, the addition effect is scarcely provided but only the cost for kneading increases, whereas if the addition amount exceeds 10 wt %, almost no effect results from the increase of amount but only the cost for materials increases and in addition, the physical properties of the injection molded article for photographic photosensitive materials are decreased or appearance of the article is worsened.

Representative examples of the chelating agent include a carboxylic acid type phthalocyanine-based metal complex (e.g., metal phthalocyaninetetracarboxylate, metal phthalocyanineoctacarboxylate), an iminodiacetic acid type chelate resin, an aminocarboxylic acid type chelate resin (e.g., EDTA=ethylenediaminetetraacetic acid), a polyamine type chelate resin, a glucamine type chelate resin, a carrier type chelate resin, a 4-dimethylamino-2,6-pyridinedicarboxylic acid chelate resin, a natural zeolite (e.g., zeolite comprising analcime, cha-bazite, heulandite, erionite, ferrierite, laumonite or mordenite), a synthetic zeolite (e.g., zeolite of various types such as A, N-A, X, Y, hydroxy sodalite, ZK-5, B, R, D, T, L, hydroxy, cancrinite, W and Zeolaon), an aluminum chelate compound (e.g., diisopropoxy aluminum monooleylacetate, monoisopropoxy aluminum bisoleylacetoacetate, monoisopropoxy aluminum monoethylacetoacetate monobenzylacetoacetate, diisopropoxy aluminum monostearylacetoacetate, monoisopropoxy aluminummenomethacrylatemonoethylacetoacetate, monoisopropoxy aluminum monooleylalkoxy monoethylacetoacetate), an isophthalic acid bis(2-phenoxypropionyl hydrazide), a 3-salicyloylamino-1,2,4-triazole, bis[3-(3,5-di-tert-butyl-4-hydroxyphenyl)-propionyl]hydrazine, oxalic acid bis(benzylidene hydrazide), bis(salicyloylhydrazine), N-salicylidene, N'-salicyloyl-hydrazine, N,N'-disalicylidene-1,2-propylenediamine, ethylenediaminetetraacetic acid and an alkali metal salt thereof, an N,N'-bis[3-(3,5-di-tert-butyl-4-hydroxyphenyl)-propionyloxyethyl]oxalic acid diamide, dodecane diacid bis(N'-salicyloylhyrazine) and 3,9-bis[2-(2, 4-diaminotriazine-6-yl)ethyl]-2,4,8,10-tetraoxaspiro[5,5] undecane.

Particularly preferred chelating agents are ethylenediaminetetraacetic acid metal (Group I, II or III) salts because when two or more resins are mixed without causing any adverse effect on photographic properties of a photographic photosensitive material, the compatibility therebetween is improved to achieve improvement in physical properties or appearance. Preferred examples of the metal salt include disodium salt, trisodium salt, tetrasodium salt, dipotassium salt, tripotassium salt, tetrapotassium salt, disodium-magnesium salt, disodium-calcium salt, disodium-iron salt, disodium-zinc salt and dipotassium-magnesium salt. In the present invention, other than the above-described chelating agents, materials having a chelating action described below are also included in the chelating agent. Representative examples of such a material include diatomaceous earth, activated clay, synthetic aluminum silicate, synthetic calcium silicate and synthetic magnesium silicate. From the standpoint that good dispersibility in the noncrystalline resin composition is ensured, the average particle size is from 0.1 to 10 μm, preferably from 0.1 to 7 μm, more preferably from 0.1 to 5 μm. In view of improvement in dispersibility, it is preferred to use one or more of the above-described surface-covering materials (1) to (19) for the light-shielding material so as to provide surface covering state on use.

Representative examples of preferred embodiments are described below.

A: Representative Examples using Two Kinds of Deactivators in Combination

A-1: An injection molded article for photographic photosensitive materials comprising a resin composition containing a phenolic antioxidant and a diorganic pentaerythritol diphosphite compound A-2: An injection molded article for photographic photosensitive materials comprising a resin composition containing a phenolic antioxidant and a hydrotalcite compound A-3: An injection molded article for photographic photosensitive materials comprising a resin composition containing a phenolic antioxidant and a di-(dialkyl-phenyl) pentaerythritol diphosphite compound A-4: An injection molded article for photographic photosensitive materials comprising a resin composition containing a phenolic antioxidant and an organic phosphorous ester antioxidant A-5: An injection molded article for photographic photosensitive materials comprising a resin composition containing a phenolic antioxidant and an organic phosphite such as trialkyl phosphite compound A-6: An injection molded article for photographic photosensitive materials comprising a resin composition containing an alkylidene bisphenolic antioxidant and an organic phosphite such as trialkyl phosphite compound A-7: An injection molded article for photographic photosensitive materials comprising a resin composition containing a 2,6-di-tert-butyl-4-methylphenol antioxidant and an alkylidene bisphenol compound A-8: An injection molded article for photographic photosensitive materials comprising a resin composition containing a phenolic antioxidant and a pentaerythritol diphosphorous ester compound consisting of a mixture of spiro and cage isomers A-9: An injection molded article for photographic photosensitive materials comprising a resin composition containing an alkyl-substituted monophenolic antioxidant and an alkyl-substituted polyhydric phenolic antioxidant A-10: An injection molded article for photographic photosensitive materials comprising a resin composition containing an alkyl-substituted polyhydric phenolic antioxidant and a phosphite-based antioxidant A-11: An injection molded article for photographic photosensitive materials having a light-shielding property, comprising a resin composition containing a black pigment and/or a black dye and two or more phenolic antioxidants A-12: An injection molded article for photographic photosensitive materials comprising a resin composition containing a phenolic antioxidant having a molecular weight of 350 or more and a phosphite-based antioxidant A-13: An injection molded article for photographic photosensitive materials comprising a resin composition containing an alkali metal salt of an organic phosphoric ester and a fatty acid metal salt of a hydrotalcite compound B: Representative Examples using Three Kinds of Deactivators in Combination B-1: An injection molded article for photographic photosensitive materials comprising a resin composition containing a phenolic antioxidant, a pentaerythritol phosphite compound and a hydrotalcite compound B-2: An injection molded article for photographic photosensitive materials comprising a resin composition containing a 2,6-di-tert-butyl-4-methylphenol antioxidant and/or a 2,2'-alkylidene bisphenol antioxidant, an organic phosphous ester compound and a hydrotalcite compound and/or a fatty acid metal salt B-3: An injection molded article for photographic photosensitive materials comprising a resin composition containing a phenolic antioxidant, a pentaerythritol phosphite compound and an organic phosphite B-4: An injection molded article for photographic photosensitive materials comprising a resin composition containing a phenolic antioxidant, an organic phosphite, a thiodipropionate compound and a hydrotalcite compound and/or a radical scavenger and/or an ultraviolet ray absorbent and/or a fatty acid metal salt B-5: An injection molded article for photographic photosensitive materials comprising a resin composition containing a phenolic antioxidant, a thiodipropionic ester compound, an organic phosphite and a fatty acid metal salt B-6: An injection molded article for photographic photosensitive materials comprising a resin composition containing a phenolic antioxidant, a phosphite(phosphorus)-based antioxidant and a hydrotalcite compound subjected to surface covering treatment C: Styrene-based Resin C-1: An injection molded article for photographic photosensitive materials comprising a noncrystalline resin composition containing 50 wt % or more of a styrene-based resin having a specific viscosity [$\eta_{sp}$] determined at 30° C. using a 1%-concentration polymer solution in toluene as a solvent of from 0.9 to 1.8, preferably from 1.0 to 1.7, more preferably from 1.1 to 1.6 and a ratio MW/MN (molecular weight distribution) of weight average molecular weight MW to number average molecular weight MN determined by GPC of from 1.5 to 10, preferably from 1.8 to 8, more preferably from 2 to 6

C-2: An injection molded article for photographic photosensitive materials comprising a noncrystalline resin composition containing 50 wt % or more of a rubber-modified styrene-based resin obtained by graft polymerizing according to continuous block polymerization method or suspension polymerization method, a rubbery material having an average particle diameter of from 0.1 to 10 $\mu$m, preferably from 0.2 to is 7 $\mu$m, more preferably from 0.5 to 5 $\mu$m, most preferably from 0.7 to 3.5 $\mu$m to a styrene monomer in an amount of from 0.1 to 20 wt %, preferably from 1 to 12 wt %, more preferably from 1.5 to 10 wt %, most preferably from 2 to 8 wt %

C-3: An injection molded article for photographic photosensitive materials comprising a noncrystalline resin composition containing 50 wt % or more of a rubber-containing styrene-based resin prepared such that after the blending of a homopolystyrene resin and a rubber-modified polystyrene resin, the content of melt-kneaded rubbery material becomes from 0.1 to 20 wt %, preferably 1 to 12 wt %, more preferably from 1.5 to 10 wt %, most preferably from 2 to 8 wt %

C-4: An injection molded article for photographic photosensitive materials formed of a noncrystalline resin composition containing from 1 to 49 wt % of a recycled styrene-based resin, from 0.001 to 20 wt % of one or more of a hindered phenolic antioxidant, a hydrotalcite compound and a fatty acid metal salt and from 0.01 to 49.9 wt % of one or more light-shielding material C-5: An injection molded article for photographic photosensitive materials formed of a noncrystalline resin composition containing 50 wt % or more of a rubber-modified polystyrene resin containing a rubbery material having an average particle size of from 1.1 to 10 $\mu$m in an amount of from 1 to 12 wt % and from 0.01 to 49.9 wt % of one or more light-shielding material, and having a reflection glossiness (determined at an incident angle of 75°-light receiving angle of 75° using a reflection glossmeter manufactured by Murakami Shikisai Kenkyusho) of 60° or less C-6: An injection molded article for photographic photosensitive materials formed of a noncrystalline resin composition containing 50 wt % or more of a rubber-modified styrene-based resin containing a rubbery material having an average particle size of from 0.1 to 10 $\mu$m in an amount of from 0.1 to 20 wt %, from 0.01 to 49.9 wt % of one or more light-shielding material, from 0.005 to 20 wt % of one or more of a dripproofing agent and a lubricant and from 0.001 to 20 wt % of one or more of an antioxidant, an age resistor, an ultraviolet absorbent, a radical scavenger, an oxidation inhibitory synergistic effect-providing agent and a hydrotalcite compound, and having a coefficient of static friction of 0.3 or less D: Masterbatch of Light-Shielding Material D-1: An injection molded article for photographic photosensitive materials formed of a noncrystalline resin composition having dispersed therein a light-shielding material at a concentration of from 0.01 to 49.9 wt % in a state that a masterbatch pellet and a styrene-based resin pellet containing a rubbery material for dilution are weighed and mixed and then kneaded under heating at 150° C.

D-2: An injection molded article for photographic photosensitive materials formed of a resin composition prepared through a step for producing Light-Shielding Material-Containing Masterbatch Pellet A by dispersing a light-shielding material surface-covered with a surface-covering material in a thermoplastic resin; a step for producing Masterbatch Pellet B containing Light-Shielding Material-Containing Masterbatch Pellet A, a rubber-containing aromatic monovinyl resin pellet as a matrix resin for dilution and one or more of a lubricant and an antistatic agent; and a step for melt-kneading Masterbatch Pellet B containing a light-shielding material and one or more of a lubricant and an antistatic agent and a rubber-containing aromatic monovinyl resin pellet as a matrix resin for dilution by means of an extruder having a screw upstream a molding machine D-3: An injection molded article for photographic photosensitive materials formed of a resin composition prepared by melt-kneading a masterbatch pellet and a matrix resin pellet for dilution each having a spherical, columnar, prismatic, square or rectangular form and an average diameter or length of one side of approximately from 1 to 10 mm, with the volume difference between two pellets being within 2 times D-4: An injection molded article for photographic photosensitive materials using a masterbatch pellet obtained by melt-kneading and dispersing from 3 to 60 wt % of a light-shielding material using a thermoplastic resin having one or more form (excluding pellet form) of bead, powder and granule in the production step of Light-Shielding Material-Containing Masterbatch Pellet A in D-2 above and then pelletizing the mixture D-5: An injection molded article for photographic photosensitive materials formed of a non-crystalline resin composition prepared by drying a light-shielding material-containing masterbatch pellet to have a water content in absolute dry condition of 0.7 wt % or less, mixing at a constant rate the masterbatch pellet with a noncrystalline resin pellet as a matrix resin for dilution so that the light-shielding material has a concentration of from 0.01 to 49.9 wt % and then melt-kneading the mixture by means of an extruder E: Injection Molded Article for Photographic Photosensitive Materials comprising Noncrystalline Resin Composition E-1: An injection molded article for photographic photosensitive materials formed of a noncrystalline resin composition containing from 0.01 to 49.9 wt % of one or more of an electroconductive material such as carbon black, metal powder, electroconductive fibrous filler, graphite, light-shielding material covered with an electroconductive material, alkaline earth metal salt and inorganic chloride and an antistatic agent, and having a surface resistivity value (according to JIS K6911) of $10^{13}$ Ω or less E-2: An injection molded article for photographic photosensitive materials formed of a noncrystalline resin composition having an abrasion resistance (abrasion loss of material according to JIS K7204) of 50 mm$^3$ or less E-3: An injection molded article for photographic photosensitive materials formed of a noncrystalline resin composition comprising a rubber-containing styrene-based resin containing from 0.02 to 10 wt % of two or more of an antioxidant, a hydrotalcite compound, a fatty acid metal salt, a radical scavenger, an oxidation inhibitory synergistic effect-providing agent, an ultraviolet absorbent and an age resistor, from 0.1 to 20 wt % of one or more of a rubbery material, an ethylene copolymer resin and a thermoplastic elastomer, from 0.1 to 30 wt % of carbon black, from 0.005 to 10 wt % of one or more of a lubricant, an electroconductive substance such as inorganic chloride and an antistatic agent, which is one selected from a photographic film spool, photographic film unit with a lens, a resin-made photographic film patrone, a sheet photographic film pack, a photographic film cartridge and an instant film unit E-4: An injection molded article for photographic photosensitive materials formed of a styrene-based resin composition containing from 0.001 to 5 wt % of one or more of a fatty acid amide-based lubricant, a hydrocarbon-based lubricant and a silicone-based lubricant, from 1 to 45 wt % of one or more of a low molecular weight polyolefin resin having a number average molecular weight of 10,000 or less, an ethylene copolymer resin, a compatibilizer and a thermoplastic elastomer, from 0.001 to 5.0 wt % of two or more of an antioxidant, a radical scavenger, a hydrate double salt compound, an oxidation inhibitory synergistic effect-providing agent and a fatty acid metal salt, 50 wt % or more of a rubber-containing styrene-based resin having a number average molecular weight determined by GPC of 20,000 or more, a molecular weight distribution of from 2 to 8, a melt flow rate (according to JIS K6870) of from 3 to 50 g/10 min., a density (according to JIS K6871) of from 1.02 to 1.07 g/cm$^3$ and a flexural modulus of elasticity (according to ASTM D-790) of from 20,000 to 35,000 kg/cm$^2$ and containing a rubbery material in an amount of from 0.1 to 20 wt %, and from 0.1 to 30 wt % of a light-shielding material E-5: An injection molded article for photographic photosensitive materials formed under injection molding conditions such that a styrene-based resin composition is used, the resin temperature is from 210° to 300° C., the injection pressure is from 700 to 1,200 kg/cm$^2$ and the mold temperature is from 30° to 100° C.

E-6: An injection molded article for photographic photosensitive materials formed of a noncrystalline resin composition, the noncrystalline resin containing 50 wt % or more of at least one of a polycarbonate resin, a polyphenylene oxide-modified resin, a polysulfone resin, a polyether sulfone resin and a polyarylate resin and from 5 to 60 wt % of a glass fiber or potassium titanate whisker surface-treated with a coupling agent E-7: An injection molded article for photographic photosensitive materials formed of a polycarbonate resin composition containing 50 wt % or more of a polycarbonate resin, from 1 to 45 wt % of one or more of a styrene-based resin ethylene copolymer resin and a thermoplastic elastomer, from 0.1 to 30 wt % of one or more light-sensitive material, from 0.01 to 20 wt % of one or more of a lubricant, an inorganic salt compound alkaline earth metal salt and an antistatic agent, from 0.01 to 10 wt % of one or more coupling agent and from 5 to 60 wt % of a fibrous filler E-8: An injection molded article for photographic photosensitive materials formed under the molding conditions such that a polycarbonate resin composition in E-7 above is used, the resin temperature is from 250° to 310° C., the injection pressure is from 700 to 1,500 kg/cm$^2$ and the mold temperature is from 90° to 150° C.

E-9: An injection molded article for photographic photosensitive materials injection-molded using a noncrystalline resin composition and an apparatus having inserted and fixed thereto elements of "Static Mixer" as a line mixer completely free of movable parts commercially available from Toray KK, the apparatus being installed between an extruder and a mold E-10: An injection molded article for photographic photosensitive materials formed of a noncrystalline resin composition containing a glass fiber composition consisting of $SiO_2$: from 45 to 80%, preferably from 50 to 75%, more preferably from 53 to 70%; $Al_2O_3$: from 0.1 to 25%, preferably from 0.5 to 20%, more preferably from 1 to 20%; CaO: from 3 to 25%, preferably from 5 to 22%, more preferably from 8 to 18%; and MgO: from 1 to 15%, preferably from 2.5 to 12%, more preferably from 5 to 10%

E-11: An injection molded article for photographic photosensitive materials formed of a rubber-modified styrene-based resin composition, wherein in the resin composition:

(a) 70 wt % or more of the rubbery material is high cis polybutadiene comprising cis 1.4 bond at a proportion of 90 mol % or more;

(b) the rubbery material particle has an average particle size of from 0.5 to 2.5 μm; and (c) an organic polysiloxane which is a silicone-based lubricant is contained as a silicon component in an amount of from 0.005 to 0.2 wt % based on the composition F: Package F-1: A package for photographic photosensitive materials completed by allowing an injection molded article for photographic photosensitive materials to stand in a room at a temperature of from 10° to 50° C. and a humidity of from 35 to 70% RH for from 5 minutes to 72 hours, preferably from 10 minutes to 60 hours, more preferably from 15 minutes to 48 hours and then applying thereto a photographic photosensitive material F-2: A package for photographic photosensitive materials as claimed in claim 17, wherein a moisture-proofing packaging material having a water-vapor permeability determined according to JIS Z 0208 Condition B of 5 g/m$^2$·24 hrs. or less has a haze measured according to ASTM D-1003 of 95% or less.

Representative names of compounding agents (additives) which can be added to the molded article for photographic photosensitive materials of the present invention are described below.

The compounding agent is described in detail in *Saishin Ganryo Binran* (revised argumentation), Seibundo Shinkosha KK (Jan. 10, 1977), Shinkagaku Index (1994 ed.), Kagaku Kogyo Nippo Sha KK (Jul. 23, 1993), 12394 *no Kagaku Shohin*, Kagaku Kogyo Nippo Sha KK (Jan. 26, 1994), *Plastic Data Handbook*, Kogyo Chosa Kai KK (Apr. 5, 1984) and *Jitsuyo Plastic Yogo Jiten 3rd Ed.*, Plastics Age KK and almost all compounding agents described in the publications above can be used also in the injection molded article for photographic photosensitive materials of the present invention by selecting the kind or addition amount so as not to cause any adverse effect on the photographic material, by using the reaction for achieving harmlessness resulting from combination with other compounding agent or by examining the resin composition. Representative examples are described below but the present invention is by no means limited to these.

A. Classification 1 (classification by capabilities required)
1. Processing aid
   a. Processing stabilizer
      (antioxidant, heat stabilizer)
      (PVC stabilizer)
   b. Flow controlling agent
      (plasticizer, lubricant)
   c. Shape-keeping aid
      (releasing agent, shrinkage inhibitor)
2. Compounding agent for reformation
2-1 Stabilizer (life controlling agent)
   a. antioxidant
   b. light-resistant stabilizer
   c. flame retardant
   d. biostabilizer
   e. metal deactivator
   f. (deactivation restorer)
2-2 Performance modifier (physical property controlling agent)
   a. impact strength improver (various elastomers, L-LDPE resin)
   b. filler, reinforcing agent
   c. coloring agent
   d. plasticizer
   e. bubbling agent
   f. crosslinking agent (organic peroxide)
   g. nucleating agent
2-3 Function modifier (function-imparting agent)
   a. electroconductive agent, magnetic agent
   b. antistatic agent
   c. fluorescent brightening agent
2-4 Decomposition accelerator
   a. biodegradation
   b. photolysis
   c. thermal decomposition, etc.

B. Classification 2 (classification by attributes of compounding agents)
1. Powder modifier
   a. reinforcing agent/filler
   b. nucleus agent
   c. processing aid
   d. powder/powder special structure
2. Reactive modifier
   a. crosslinking agent
   b. macromonomer
   c. stabilizer (heat, light, radiation, organism)
   d. decomposition accelerator (organism, light, heat)
3. Interface modifier
   a. coupling agent
   b. compatibiliazer
   c. plasticizer/solvent
4. High polymer modifier
   a. processibility improver, capability modifier
   b. alloy, blend (capability modifier), etc.

The injection molded article for photographic photosensitive materials of the present invention include the following.

The present invention can be applied to various injection molded articles for photographic photosensitive materials required to secure as a matter of essential factor complete light shielding and photographic properties, such as a spool for photographic film, photographic film unit with a lens, container for photographic film patrone, light-shielding container, resin-made patrone for photographic film, magazine for bright-room loading of a sheet or roll photographic photosensitive material, core, cartridge for photographic film, pack for instant photographic film, holder for sheet photographic film, camera for photographic film photographing, pack for cut film and photographic photosensitive developing machine.

1) Cartridge for photographic disk film:
   JP-A-U-60-21743
2) Film unit with lens:
   JP-A-63-226643
3) Spool for photographic film:
   JP-A-1-251030, JP-A-57-196218, JP-A-59-15049, U.S. Pat. No. 1,930,144, JP-A-U-63-73742, JP-A-U-54-120931, JP-A-U-58-178139, JP-A-U-58-178140, JP-A-U-58-178141, JP-A-U-58-178142, JP-A-U-58-178143, JP-A-U-58-178144, JP-A-U-58-178145, JP-A-U-55-31541, JP-A-58-203436, JP-A-58-82237, JP-A-58-88236, JP-B-U-44-16777 (the term "JP-B-U" as used herein means an "examined Japanese utility model publication"), JP-A-U-63-73742, JP-A-62-240957, JP-A-4-335638, British Patent 2,199,805A.
4) Metal-made patrone for photographic film:
   JP-A-54-111822, JP-B-45-6991, JP-B-55-21089, JP-A-50-33831, JP-A-56-87039, JP-A-U-55-97738, JP-A-1-312538, JP-A-57-190948, JP-A-4-273240, JP-A-4-320258, JP-A-4-335344, JP-A-4-335639, JP-A-4-343353, JP-A-4-349454, U.S. Pat. Nos. 4,846,418, 4,848,693 and 4,887,776.
5) Container for photographic film patrone:
   JP-A-61-250639, JP-A-61-73947, JP-A-U-60-163451, U.S. Pat. No. 4,801,011, JP-A-63-121047, JP-A-62-291639, JP-A-U-1-88940, JP-A-U-1-113235, JP-A-U-1-152337, JP-B-U-2-33236, JP-B-U-3-48581, JP-B-2-38939, U.S. Pat. Nos. 4,639,386, 4,801,011 and 4,979,351, EP-0237062A2, EP-0280065A1, EP-0298375A2.
6) Core, reel:
   JP-A-U-60-107848, U.S. Pat. No. 4,809,923, British Patent 2,033,873B.
7) Magazine for sheet photographic film:
   JP-A-56-5141.
8) Cartridge for photographic film:
   JP-B-U-56-16610, JP-A-U-2-24846, JP-A-U-2-29041, JP-B-U-60-120448, JP-A-1-312537.
9) Case for photographic film:
   U.S. Pat. No. 4,779,756, JP-A-U-54-100617, JP-A-U-64-32343, JP-A-U-1-94258, JP-A-U-2-56139, EP-0242905A1, JP-B-2-54934.
10) Pack for instant film: JP-A-U-61-41248, JP-A-62-240961.
11) Resin-made patrone for photographic film:
    JP-A-50-33831, JP-A-57-190948, JP-A-1-312538, JP-B-456991, JP-B-55-21089, JP-A-55-97738, U.S. Pat. Nos. 4,834,306, 4,846,418 and 4,887,776.

12) Holder for sheet photographic film:
U.S. Pat. Nos. 4,725,865 and 4,821,055, JP-A-5-341378, JP-A-5-341379, JP-A-5-341378, JP-A-5-341379, JP-A-5-341380, JP-A-5-341381, JP-A-6-75291, JP-A-6-75292, JP-A-6-75293.

The photographic photosensitive material to which the injection molded article for photographic photosensitive materials of the present invention can be applied is described below.

(1) Silver halide photographic material (e.g., film for printing, color or black-and-white printing paper, color or black-and-white negative film, master paper for printing, diffusion transfer (DTR) photosensitive material, computer phototypesetting film and paper, microfilm, color or black-and-white positive film, film for movie, self-developable photographic photosensitive material, direct positive film and paper, etc.)

(2) Heat developable photosensitive material (e.g., heat developable color photosensitive material, heat developable black-and-white photographic material (e.g., those described in JP-B-43-4921, JP-B-43-4924, *Shashin-kogaku no Kiso, Silver Salt Photograph*, pp. 553–555, Corona Sha (1879) and *Research Disclosure* (RD-17029), pp. 9–15 (June, 1978)), heat developable color photographic photosensitive material of transfer system described in JP-A-59-12431, JP-A-60-2950, JP-A-61-52343 and U.S. Pat. No. 4,584,267)

(3) Photosensitive/heat-sensitive recording material (e.g., recording material using photothermography (photosensitive/heat-sensitive image information method) described in JP-A-3-72358)

(4) Diazonium photographic photosensitive material (4-morpholinobenzenediazonium microfilm, microfilm, film for photocopying, printing board material for printing, etc.)

(5) Azide- and diazide-based photographic photosensitive material (e.g., photosensitive material containing para-azidobenzoate or 4,4'-diazidostilbene, for example, film for photocopying, printing board material for printing, etc.)

(6) Quinone diazide-based photographic photosensitive material (e.g., photosensitive material containing ortho-quinonediazide- or ortho-naphthoquinonediazide-based compound such as benzoquinone(1,2)-diazide-(2)-4-sulfonic acid phenyl ether, for example, printing board material for printing, film for photocopying, film for contact print, etc.)

(7) Photopolymer (e.g., photosensitive material containing vinyl monomer, printing board material for printing, film for contact print, etc.)

(8) Polyvinyl cinnamic ester-based photosensitive material (e.g., film for printing, resist for IC)

The present invention is a high-quality injection molded article capable of application to photographic photosensitive materials necessary to meet most severe requirements for the quality and therefore, it can also be applied to other various photosensitive materials which are denatured or deteriorated by various light, oxygen or sulfurous acid gas but can be used with the quality on a lower level, for example, foods (e.g., butter, bag for peanuts, margarine, snack, relish, confectionery, tea, laver, etc.), medicinal products (e.g., powdery or granular medicine in bag such as medicine for the stomach and bowels and medicine for cold), dyestuff, pigment, photographic development chemicals, photographic fixing chemicals, toner, etc.

The method for forming an injection molded article for photographic photosensitive materials according to the present invention comprising injection charging a resin composition mainly comprising a noncrystalline resin set at the resin temperature of 150° C. or higher into a mold having a core cavity part of which wall temperature is from 70° to 200° C. and taking out the molded article from the mold at the time when the wall temperature of the core cavity part becomes lower than the glass transition temperature of the resin moiety in the resin composition.

According to the method for forming an injection molded article for photographic photosensitive materials of the present invention, the wall temperature of the core cavity part in the mold is set to from 70° to 200° C. and in this state, a noncrystalline resin molten by heating at 150° C. or higher is injection charged to the mold. If the wall temperature is less than 70° C., the flowability of resin reduces to readily cause short shots or weld lines, which results in decrease of the impact strength of the molded article. On the other hand, if the wall temperature exceeds 200° C., the cooling time is prolonged and the molding cycle is elongated to reduce the productivity and also the resin undergoes conspicuous heat deterioration to cause generation of substances which adversely affect photographic properties of a photographic photosensitive material or generation of lumps (black brown lumps as foreign matters) or stains on the mold surface, whereby it becomes difficult to continuously conducting injection molding for a long period of time.

When the wall temperature of the core cavity part is reduced to a temperature lower than the glass transition temperature of the noncrystalline styrene resin, preferably 70° C. or lower, more preferably 60° C. or lower, most preferably 50° C. or lower, the molded article for photographic photosensitive materials formed is taken out from the mold. If it is taken out at the time when the temperature is higher than the glass transition temperature, the injection molded article undergoes deformation and the resulting injection molded article is bad in the dimensional accuracy and cannot be used as an injection molded article for photographic photosensitive materials.

With respect to the shape of resin pellets used in the production of an injection molded article for photographic photosensitive materials of the present invention, in order to achieve uniform melting of resin pellets (effective for preventing generation of lumps) and uniform blending in blending two or more kinds of resins (for example, masterbatch and resin for dilution), it is preferred that the pellets have one or two of spherical, columnar, prismatic, tabular, square and rectangular forms. In particular, the spherical or columnar form is preferred in view of free running aptitude of pellets or prevention of generation of fine powder.

Even in this case, the diameter or length of one side of the pellet is from 0.5 to 10 mm, preferably from 1 to 8 mm, more preferably from 2 to 7 mm, most preferably from 3 to 6 mm.

It is also preferred that the pellets have almost the equal volume so as to assure uniform melting property and even if a difference is present, it should be within 3 times.

In order to inhibit silver streaks or bubbling or to prevent hydrolysis of the noncrystalline resin, it is preferred to conduct preliminary drying at from 80° to 150° C., preferably from 90° to 140° C., more preferably from 100° to 130° C. to give a water content of the noncrystalline resin composition of 0.5 wt % or less, preferably 0.2 wt % or less, more preferably 0.07 wt % or less. And, a hopper heated at from 90° to 120° C. is preferably used so that the noncrystalline resin composition of which water content is reduced to 0.5 wt % or less, preferably 0.2 wt % or less, more preferably 0.07 wt % or less, does not absorb moisture during injection molding.

To the injection molded article for photographic photosensitive materials of the present invention, printing of characters or symbols necessary in function or for elevating the commercial value may be applied. The ink used in this printing is selected from the standpoint whether it is harmless to the photosensitive material and selected from commonly used offset printing ink, gravure printing ink and UV ink.

Representative examples of the synthetic resin used in these inks include a copolymer resin mainly composed of vinyl chloride, a vinyl-amino resin, an alkyd-vinyl resin, an oil-free alkyd resin, a vinyl chloroacetate-based resin, nitrated cotton, polyester, polyamidourethane, polyacryl, rosin-modified maleic acid, ethylene vinyl acetate, vinyl ether, urethan vinyl acetate, a urethane vinyl chloride acetate resin, a modified-alkyd resin, a modified-phenol resin, a high-molecular polyester-amino resin, a low-molecular polyester-amino resin, an oil-free polyester resin, an alkali-soluble type resin (e.g., rosin-modified maleic resin, styrene maleic resin, styrene acrylic resin, acrylic ester acrylic resin, methacrylic ester acrylic resin), a hydrosol type resin (e.g., styrene maleic resin, styrene acrylic resin, α-methylstyrene acrylic resin, acrylic ester acrylic resin, methacrylic ester acrylic resin) and an emulsion type resin (e.g., styrene resin, styrene acrylic ester resin, acrylic ester copolymer resin, methacrylic ester copolymer resin), and representative examples of the resin for UV ink which is in general a polymer having an acrylic unsaturated group include polyester/acrylic ester, polyester/urethane resin/acrylic ester, epoxy resin/acrylic ester, pentaerythritol triacrylate, trimethylolpropane triacrylate, hexanediol diacrylate, neopentyl glycol diacrylate, triethylene glycol diacrylate and hydroxyethylene methacrylate.

In the above-described ink, a generally known coloring agent is used in combination. Examples of the coloring agent which can be used include various pigments and azo pigments described in JP-A-63-44653 (azo lake: Carmin 6B, Red 2B; insoluble azo: Monoazo Yellow (PY-1,3), Disazo Yellow (PY-12, 13, 14, 17, 83), Pyrazolo Orange (PO-B-34), Vulcan Orange (PO-16); condensed azo series: Chromophthal Yellow (PY-93, 95), Chromophthal Red (PR-144, 166)), polycyclic pigments (phthalocyanine series: Copper Phthalocyanine Blue (PB-15, 15-1, 15-3), Copper Phthalocyanine Green (PG-7); dioxazine series: Dioxazine Violet (PV-23); isoindolinone series: Isoindolinone Yellow (PY-109, 110); indanthrene series: Perylene, Perynone, Franvanthrone, Thioindigo)), lake pigments (Malachite Green, Rhodamine B, Rhodamine G, Victoria Blue B) and inorganic pigments (oxide: titanium dioxide, iron oxide red; sulfate: sedimental barium sulfate; carbonate: sedimental calcium carbonate; silicate: hydrous silicate, anhydrous silicate; metal powder: aluminum powder, bronze powder, zinc powder, carbon black, yellow lead, ultramarine). In addition, an oil-soluble dye or a dispersion dye may also be used. As other raw materials for constituting the ink, additives such as various solvents, dispersants, wetting agents, defoaming agents, levelling agents, thickeners, stabilizers, crosslinking agents and waxes may be used, if desired.

It is also preferred to apply the synthetic resin or coloring agent used as the ink above on the surface of an injection molded article or of a package using the injection molded article as a paint so as to improve commercial value, abrasion resistance and light-shielding property for the purpose of achieving good photographic properties.

The package for photographic photosensitive materials of the present invention comprises a photographic photosensitive material, the above-described injection molded article for photographic photosensitive materials having applied thereto the photographic photosensitive material and a moisture-proofing packaging material having a water-vapor permeability determined according to JIS Z 0208 Condition B of 5 $g/m^2 \cdot 24$ hrs. or less having seal-packaged therein the injection molded article for photographic photosensitive materials.

Examples of the moisture-proofing packaging material include a single-layer thermoplastic resin film for packaging bag, shrink bag or overwrap packaging, a laminate film obtained by laminating various flexible sheets (e.g., paper, cellophane, metal foil, thermoplastic resin film, metal deposited film, metal deposited paper) through an adhesive layer, a multi-layer co-extruded film obtained by simultaneously co-extruding a plurality of thermoplastic resin films and a laminate film obtained by bonding inner layers of multi-layer co-extruded inflation films with each other. The thermoplastic resin film includes various resin film subjected to no stretching, uniaxial stretching or biaxial stretching.

The water-vapor permeability determined according to JIS Z 0208, Condition B of the moisture-proofing packaging material is 5 $g/m^2 \cdot 24$ hours or less, preferably 3 $g/m^2 \cdot 24$ hours or less, more preferably 1.5 $g/m^2 \cdot 24$ hours or less. If the water-vapor permeability exceeds 5 $g/m^2 \cdot 24$ hours, the photosensitive layers, protective layers or back layers of a photographic photosensitive material, containing gelatin which is a hydrophilic polymer absorb moisture to become tacky or cause adhesion failure or various dyes contained in the photosensitive layers deteriorate to adversely affect photographic properties of a photographic photosensitive material such as reduction of sensitivity and increase of fog. In particular, this tendency is remarkable in case of a highly sensitive (ISO sensitivity: 100 or more) photographic photosensitive material and therefore, it is an essential matter to ensure moisture-proofing ability.

The package for photographic photosensitive materials of the present invention contains one or more of a deodorant, a fragrance, an oxygen scavenger, a dripproofing agent, a moisture absorbent and a chelating agent in at least one of the photographic photosensitive material, the injection molded article for photographic photosensitive material and the moisture-proofing packaging material constituting the package.

With respect to the deodorant, the fragrance, the oxygen scavenger, the dripproofing agent, the moisture absorbent and the chelating agent, the same description set forth above for the injection molded article for photographic photosensitive materials can be applied.

One or more of a deodorant, a fragrance, an oxygen scavenger, a dripproofing agent, a moisture absorbent and a chelating agent can be provided by incorporating it directly into the moisture-proofing packaging material or by adsorbing it to dextrin zeolite, talc or starch which is coated on the surface of the moisture-proofing packaging material.

In the injection molded article for photographic photosensitive materials of the present invention, the noncrystalline resin assures dimensional accuracy and physical strength, one or more of a rubbery material and an ethylene copolymer resin improves physical strength (Izod impact strength) or abrasion resistance, one or more of a light-shielding material and a filler assures abrasion resistance, physical strength, rigidity, heat durability and cold durability under low temperature or high temperature, one or more of an antioxidant, a fatty acid metal salt, a radical scavenger and a hydrate double salt compound prevents heat deterioration of the noncrystalline resin or additives and assures physical strength and good photographic property, the lubricant improves lubricity, antistatic property and injection moldability, the ultraviolet absorbent prevents light deterioration and the age resistor prevents aging. The moisture-proofing packaging material maintains dimensional accuracy of the injection molded article for photographic photosensitive materials even after storage for a long period of time and maintains good photographic properties of a photographic photosensitive material even after storage for a long period of time.

Representative embodiments of the injection molded article for photographic photosensitive materials of the present invention will be described below using FIGS. 1 to 11 but the present invention should not be construed as being limited thereto.

FIG. 1 is a front view of a spool 10 for photographic film as an injection molded article for photographic photosensitive materials of the present invention, where the spool 10 for photographic film as a whole is formed of a resin composition of the present invention.

Figure 2:
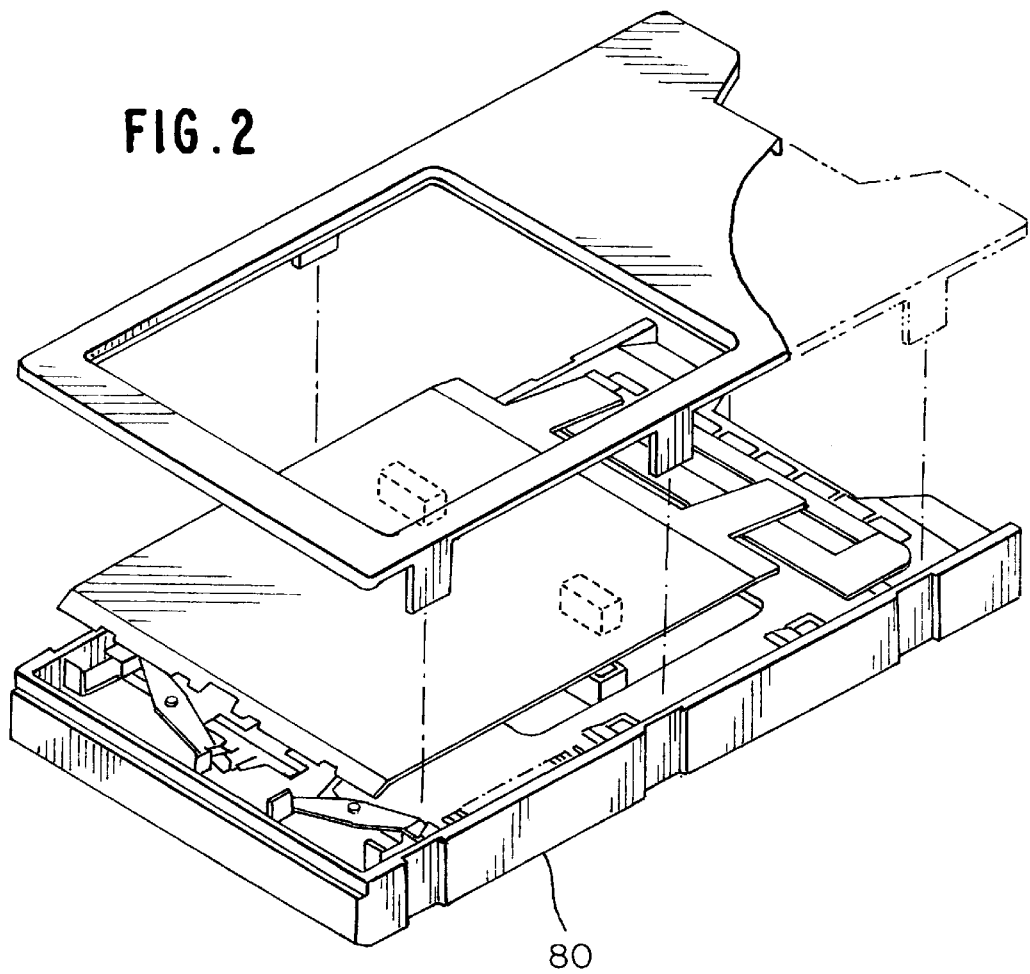
FIG. 2 is a slant view of a holder for sheet photographic film in a bag as an example of an injection molded article for photographic photosensitive materials of the present invention.

FIG. 2 is a slant view of a holder for sheet film in a bag as an injection molded article for photographic photosensitive materials of the present invention and the holder 80 for sheet film is charged to the backside of a camera to allow placement or displacement of the photographic film in a bag.

Figure 3:
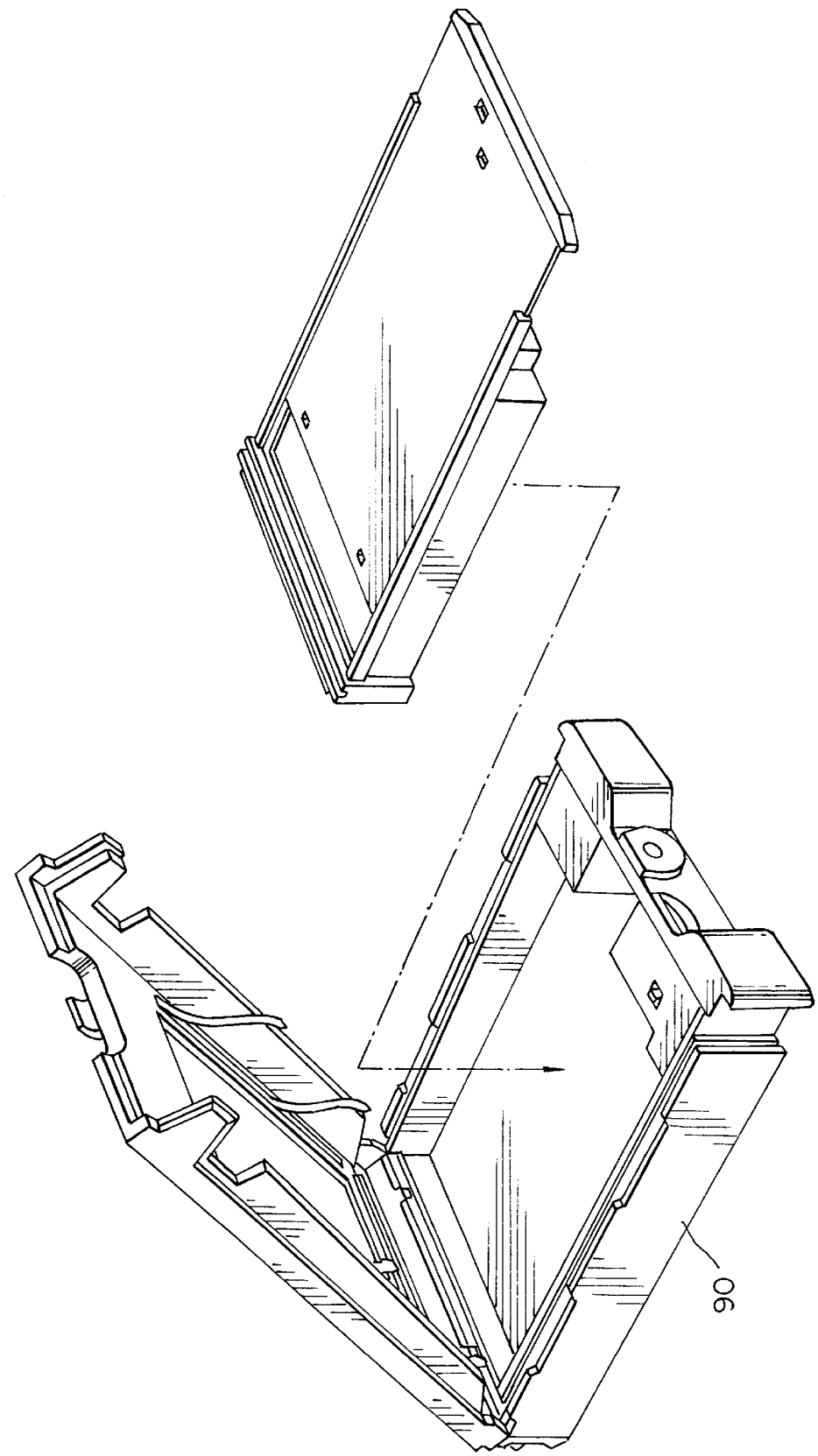
FIG. 3 is a slant view of a holder for sheet photographic film in a pack as an example of an injection molded article for photographic photosensitive materials of the present invention.

FIG. 3 is also a slant view of a holder for sheet photographic film in a pack as an injection molded article for photographic photosensitive materials of the present invention and the holder 90 for sheet photographic film is charged to the backside of a camera to allow placement or displacement of the pack for sheet photographic film.

Figure 4:
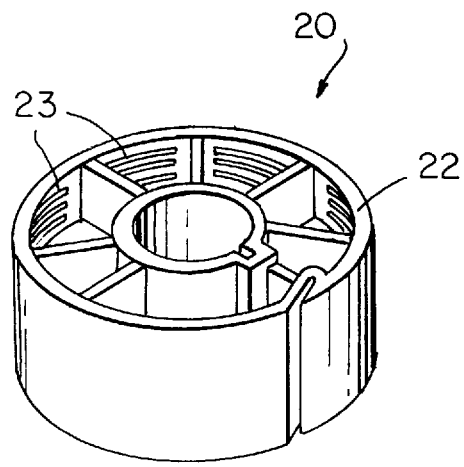
FIG. 4 is a slant view of a core for a belt-like photosensitive material as an example of an injection molded article for photographic photosensitive materials of the present invention.

FIG. 4 is a slant view from one side of a core 20 for a belt-like photosensitive material opposite to a resin injection side as an injection molded article for photographic photosensitive materials of the present invention and the core 20 for a belt-like photosensitive material as a whole is formed of a resin composition of the present invention. The inner surface of the outer cylinder 22 of the core for a belt-like photosensitive material has a plurality of cyclic projected lines 23 in a height of from 0.01 to 0.7 mm to provide injection moldability or physical strength and good appearance to the core for a belt-like photosensitive material.

Figure 5:
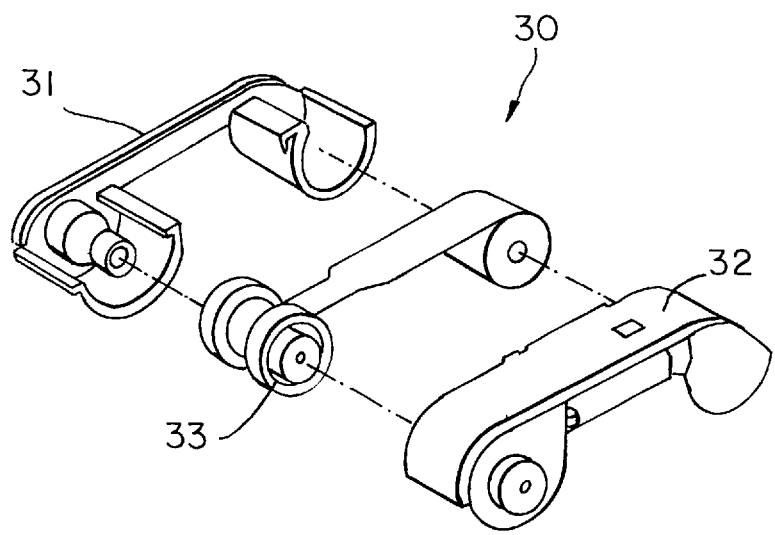
FIG. 5 is an exploded slant view of a cartridge for photographic film as an example of an injection molded article for photographic photosensitive materials of the present invention.

FIG. 5 is an exploded slant view of a cartridge 30 for photographic film as an injection molded article for photographic photosensitive materials of the present invention, where the cartridge 30 for photographic film is constituted by a lower case 31, an upper case 32 and spool 33 loaded in these cases and the lower case 31 and the upper case 32 are formed of a resin composition of the present invention.

Figure 6:
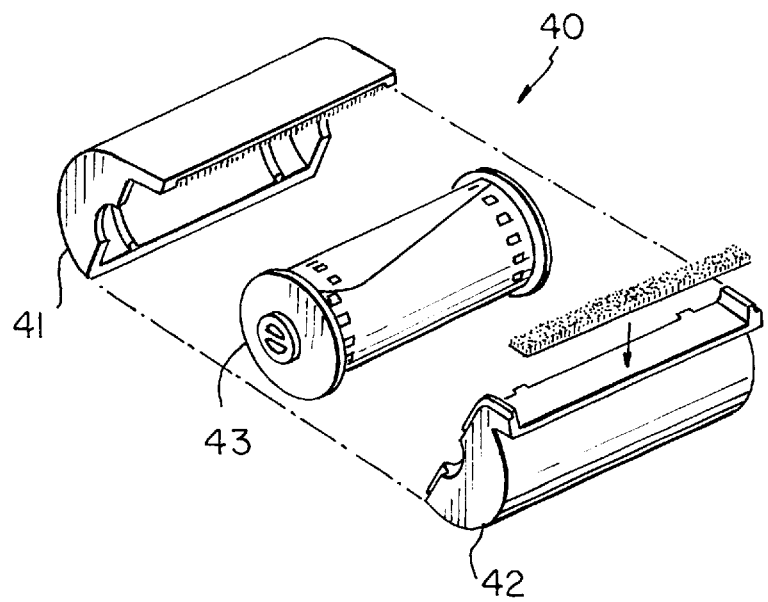
FIG. 6 is an exploded slant view of a resin-made patrone for photographic film capable of light-shielding with a light-shielding teremp cloth as an example of an injection molded article for photographic photosensitive materials of the present invention.

FIG. 6 is an exploded slant view of a resin-made patrone 40 for photographic film as an injection molded article for photographic photosensitive materials of the present invention, where the resin-made patrone 40 for photographic film is constituted by an upper case 41 and a lower case 42 constituting the patrone body and a spool 43 around which the photographic film loaded is wound around. The upper case 41, the lower case 42 and the spool 43 each is formed of a resin composition of the present invention.

Figure 7:
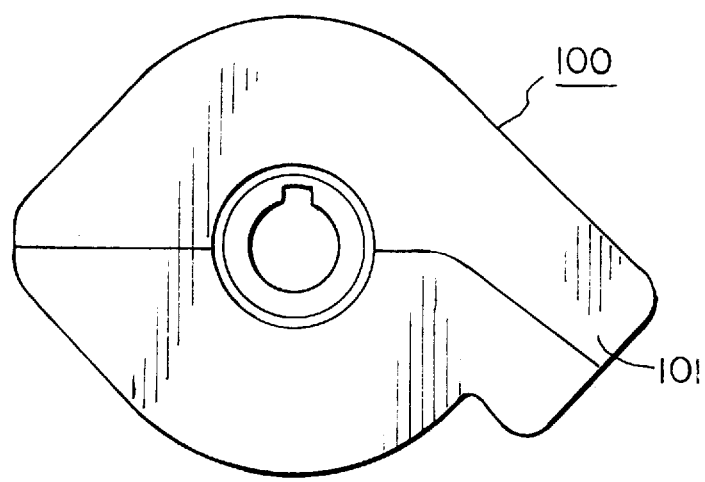
FIG. 7 is an exploded slant view of a resin-made patrone for photographic film capable of light-shielding with a light-shielding shutter as an example of an injection molded article for photographic photosensitive materials of the present invention.

FIG. 7 is a side view of a resin-made patrone for photographic film as an injection molded article for photographic photosensitive materials of the present invention, where the resin-made patrone 100 for photographic film is constituted such that the slightly projected entrance 101 formed by extending the port part cuts off light using a light-shielding shutter, and the patrone is non-circular as a whole form.

Figure 8:
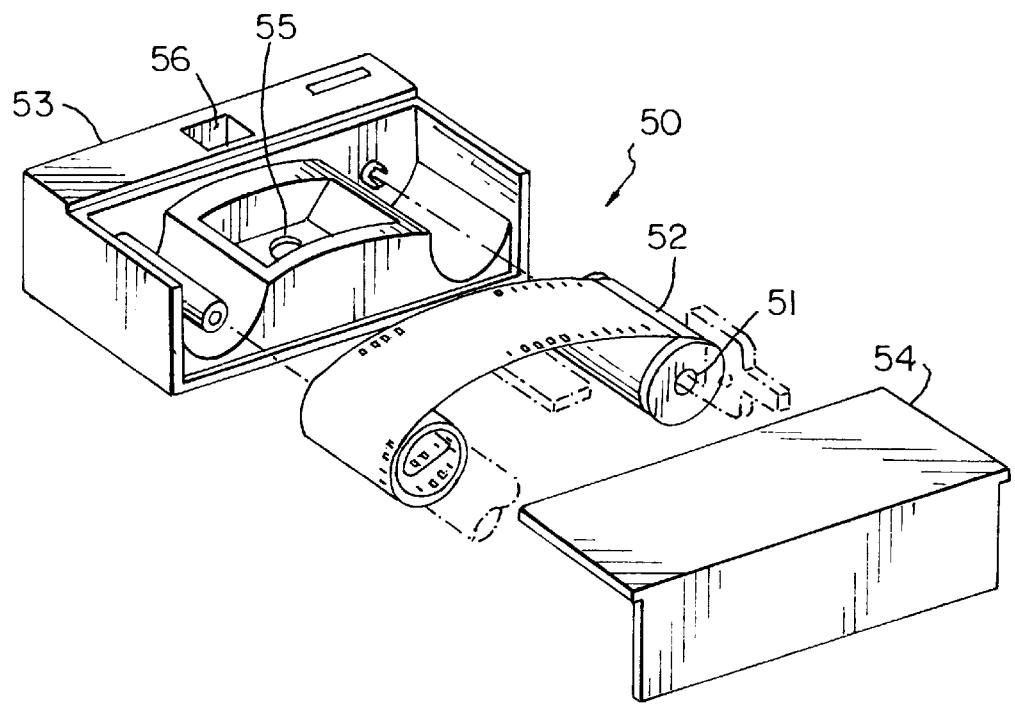
FIG. 8 is an exploded slant view of a film unit with a lens as an example of an injection molded article for photographic photosensitive materials of the present invention.

FIG. 8 is an exploded slant view of a film unit 50 with a lens 55 and a viewfinder 56 as an injection molded article for photographic photosensitive materials of the present invention, where the film unit 50 with the lens 55 is constituted by a lower case 53 for further light-tightly housing patrone 52 for photographic film which light-tightly houses a spool 51 having wound therearound photographic film and an upper case 54 for sealing the lower case 53 so that light is cut off.

Examples of the package for photographic photosensitive materials of the present invention is described below using FIGS. 9 to 11.

Figure 9:
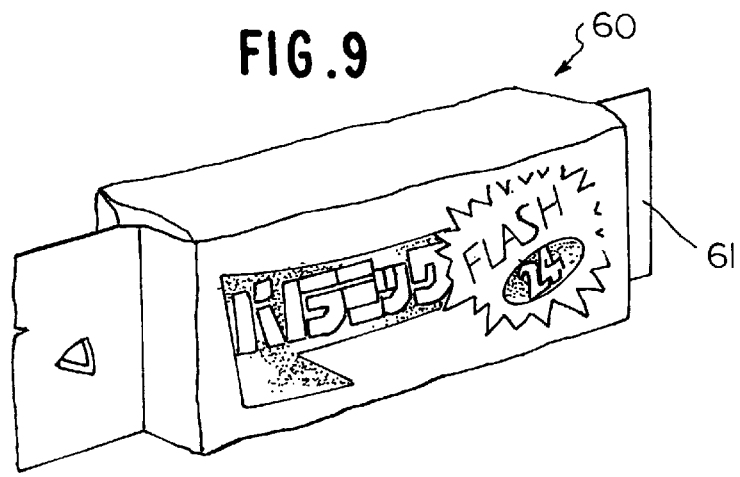
FIG. 9 is a slant view of a package of a film unit with a lens as an example of an injection molded article for photographic photosensitive materials of the present invention.
Figure 10:
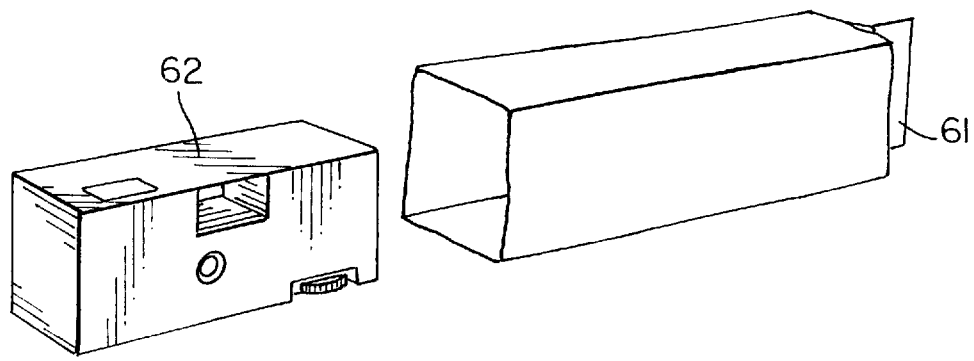
FIG. 10 is an exploded slant view of a film unit with a lens as an example of an injection molded article for photographic photosensitive materials of the present invention.

FIG. 9 shows a package as a package of a film unit with a lens and the package 60 of a film unit with a lens is produced, as shown in FIG. 10, by seal-housing a film unit with a lens comprising a film unit 50 with a lens shown in FIG. 8 in a package bag 61 formed of a moisture-proofing packaging material.

Figure 11:
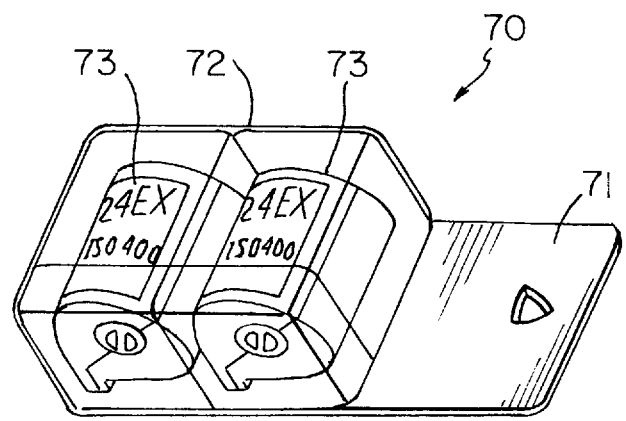
FIG. 11 is a slant view of an assembled package of 35-mm photographic film in a patrone as an example of an injection molded article for photographic photosensitive materials of the present invention.

FIG. 11 shows a package as an assembly package of 35-mm photographic film in patrone, wherein the assembly package 70 for 35-mm photographic film in patrone comprises a substrate 71 to which a transparent plastic case 72 as an injection molded article for photographic photosensitive materials of the present invention having kneaded therein a moisture-proofing agent is fixed and 35-mm photographic film 73 in patrone is housed in the case.

The injection molded article for photographic photosensitive materials of the present invention will be described below by referring to the following representative examples, but the present invention should not be construed as being limited to these examples.

EXAMPLE 1

An injection molded article for photographic photosensitive materials having complete light-shielding property and comprising a spool for 35 mm photographic film in patrone shown in FIG. 1 was produced as described below.

90 parts by weight of a styrene·butadiene block copolymer resin pellets (columnar, diameter: 2.5 mm, length: 3 mm) as a resin for dilution which contained 0.1 wt % of a hindered phenolic antioxidant and 0.3 wt % of a calcium stearate as a lubricant and which had a number average molecular weight of 100,000, a molecular weight distribution of 4.5, a butadiene rubber (average particle size: 1.5 $\mu$m) content of 3.7 wt % and a styrene content of 96.3 wt %., and 10 parts by weight of a masterbatch resin pellets (columnar, diameter: 3 mm, length: 3 mm) which contained 3.5 wt % of oil furnace carbon black having an average particle size of 21 m$\mu$ and a pH of 7.7 as a light-shielding material, 0.1 wt % of calcium stearate as a lubricant, 15 wt % of polydimethylsiloxane having a viscosity of 10,000 cSt, 50 wt % of EEA resin, 1.3 wt % of a hydrotalcite compound, 0.1 wt % of an antioxidant and 30.0 wt % of a homopolystyrene resin were uniformly mixed using an automatic scaling mixer "AC Type Auto Color (trade name)" manufactured by Matsui Seisakusyo KK and then subjected to injection molding at a resin temperature of 190° C. using a mold of a semihot liner type having 24 bottom plates within a molding cycle of 7 seconds in a molding machine "Nestal (trade name)" (clamping pressure: 150 tons) manufactured by Sumitomo Juki KK.

After crushing the resulting spool for photographic film by a crusher, the resin composition was examined and found to have an MFR measured according to ASTM D 1238-88 Condition G of 21 g/10 min., a specific gravity (according to JIS K-6871) of 1.06 g/cm$^3$, a Rockwell hardness (according to ASTM D-785, M scale) of M46, an Izod impact strength (according to JIS K-7110) of 7.8 kg·cm/cm$^2$, a flexural modulus of elasticity (according to ASTM D790) of 23.480 kg/cm$^2$, a heat deformation temperature (according to ASTM D-648, load: 18.6 kg/cm$^2$=JIS K-6870) of 78° C. and a Vicat softening point (according to JIS K-6870, load: 5 kg) of 89° C.

A negative color photographic film having an ISO sensitivity 400 was wound around the spool for photographic film and was mounted in a photographic film patrone packaged so as to completely cut off light by a metal-made patrone having a light-shielding teremp provided on the entrance for photographic film and a cap. The photographic film patrone was seal-packaged in a container composed of a high-density polyethylene resin-made container body and a low-density polyethylene resin-made container cap, and the package was allowed to stand in a air-conditioned room at a temperature of 20° C. and a humidity of 60% RH for 2 years. Thereafter, photographic properties and colorability were examined, but no disorder was found. Further, almost no offensive odor came out when the photographic film patrone was taken out from the container, the take-up torque of photographic film was small and the failure in winding up of photographic film at photographing of the photographic film was 0%. Also, even when the photographic film patrone was left as it is under sunlight (illuminance: 90,000 lux) in midsummer, neither heat deformation nor light fogging was generated.

This rubber-containing polystyrene resin composition contained calcium stearate, a hindered phenolic antioxidant and a hydrotalcite compound, whereby photographic film could be free of any adverse effect on photographic properties thereof and at the same time, good color formation could be achieved. Also, heat deterioration of the rubber-containing polystyrene resin composition was prevented and decrease of physical strength and generation of lumps as foreign matters were inhibited. Further, the calcium stearate and the dimethylpolysiloxane covered the surface of oil furnace carbon black having specific properties to allow uniform dispersion thereof in the resin and at the same time, worked such that the rubber-containing polystyrene resin composition did not absorb moisture in an air, whereby silver (silver streaks) or molding failure such as bubbling or short shot which may be caused during injection molding due to the water content in the resin composition were not generated at all.

EXAMPLE 2

To a rubber-modified polystyrene resin obtained by graft polymerizing a butadiene rubber (particle size: 3 μm) as a rubbery material, according to a continuous block polymerization method, which had an MFR (according to ASTM D-1238-88, Condition G) of 8.1 g/10 min., an Izod impact strength (according to JIS K-7110) of 6.6 kg·cm/cm$^2$, a bending strength (according to JIS K-7203) of 420 kg/cm$^2$, a flexural modulus of elasticity (according to ASTM D790) of 20,500 kg/cm$^2$, a Vicat softening point (according to JIS K-6870, load: 5 kg) of 81° C., a heat deformation temperature (according to ASTM D-648, load: 18.6 kg/cm$^2$) of 69° C., and a specific gravity (according to JIS K-6871) of 1.04 were added a lubricant, barium sulfate, furnace carbon black, an antioxidant, a thermoplastic elastomer, an ultraviolet absorbent and an antistatic agent at a ratio shown in Table 9. Then the mixture was melt-kneaded to prepare 5 kinds of resin compositions. Using these compositions, an upper case 54 and a lower case 53 constituting the light-shielding cartridge of a film unit 50 with a lens as shown in FIG. 8 were formed by an injection molding method.

Also, an upper case and a lower case constituting the resin-made patrone for photographic film shown in FIG. 7 were formed using the above-described resin compositions by an injection molding method.

Further, a spool for photographic film, to which a color negative photographic film having an ISO sensitivity of 800 shown in FIG. 1 was wound around, was formed by an injection molding method using a resin composition comprising 96.1 wt % of a rubber-modified polystyrene resin (MFR: 5.2 g/10 min., Izod impact strength: 3.8 kg·cm/cm$^2$, bending strength: 480 kg/cm$^2$, flexural modulus of elasticity: 27,500 kg/cm$^2$, Vicat softening point: 100° C., heat deformation temperature: 86° C., specific gravity: 1.045) obtained by graft polymerizing 3 wt % of butadiene rubber having an average particle size of 2.1 μm, according to a continuous block polymerization method 0.6 wt % of furnace carbon black, 1.0 wt % of silicon dioxide, 1.0 wt % of polydimethylsiloxane (weight average molecular weight: 20,000), 0.3 wt % of magnesium stearate, 0.5 wt % of a low-molecular weight polypropylene resin having a weight average molecular weight of 2,000, 0.2 wt % of 2-(2'-hydroxy-5'-methylphenyl)-benzotriazole as an ultraviolet absorbent and 0.3 wt % of 2-t-butyl-6-(3'-t-butyl-5'-methyl-2'-hydroxybenzyl)-4-methylphenyl acrylate as an antioxidant.

Using the thus-obtained light-shielding cartridges, photographic film patrones and spool, film units with a lens were constituted and compared on the properties.

The products of the present invention were outstandingly improved in Izod impact strength, flexural modulus of elasticity, Vicat softening point and heat deformation temperature as compared with comparative products. Although MFR was reduced, the injection moldability and dimensional accuracy were improved. Products 2-IV and 2-V of the present invention having added thereto an antistatic agent were excellent such that no static mark was generated and dust was not adsorbed even when a color negative photographic film having an ISO sensitivity of 800 was wound around at a high speed under conditions of 30% RH or less.

Since product 2-V of the present invention was prepared using a resin composition containing magnesium stearate, polydimethyl siloxane and EPDM as a thermoplastic elastomer and therefore, the film unit with a lens had good appearance due to uniform dispersion of furnace carbon black and barium sulfate. Further, since the resin composition contained a synthetic zeolite when the film unit with a lens was taken out from the seal-packaged moisture-proofing bag as shown in FIG. 9 after 1-year storage in a low-temperature storehouse at 15° C., it was free of offensive odor and high in a commercial value. Furthermore, a film unit using a resin composition having added thereto 0.1 wt % of a dripproofing agent could be used immediately after taking it out from the low-temperature storehouse.

Since products 2-IV and 2-V of the present invention was prepared using a resin composition containing calcium stearate and a phenolic antioxidant capable of neutralizing or adsorbing substances which adversely affects photographic properties or capable of stabilizing resins or additives susceptible to heat deterioration or heat decomposition, the photographic properties can be kept good for a long period of time.

TABLE 9

|  | Unit | Product of Invention 2-I | 2-II | 2-III | 2-IV | 2-V | Comparative Product 2-I | 2-II | 2-III | Test Method |
|---|---|---|---|---|---|---|---|---|---|---|
| Amount of rubber-modified polystyrene resin | wt % | 83.65 | 73.65 | 72.7 | 71.65 | 61.25 | 99.5 | 73.5 | 74.45 | — |
| Amount of polydimethylsiloxane having a viscosity of 20,000 cSt | wt % | 1.0 | 1.0 | 1.0 | 1.0 | 1.0 | 0 | 1.0 | 0 | — |
| Amount of calcium stearate | wt % | 0 | 0 | 1.0 | 1.0 | 1.0 | 0 | 0 | 0 | — |
| Amount of barium sulfate | wt % | 15 | 25 | 25 | 25 | 20 | 0 | 0 | 0 | — |
| Amount of calcium carbonate | wt % | 0 | 0 | 0 | 0 | 0 | 0 | 25 | 25 | — |
| Amount of furnace carbon black | wt % | 0.3 | 0.3 | 0.3 | 0.3 | 0.3 | 0.5 | 0.5 | 0.5 | — |
| Amount of antioxidant | wt % | 0.05 | 0.05 | 0 | 0.05 | 0.05 | 0 | 0 | 0.05 | — |
| Amount of synthetic zeolite | wt % | 0 | 0 | 0 | 0 | 5 | 0 | 0 | 0 | — |
| Amount of thermoplastic elastomer (ethylene.propylene.conjugated diene copolymer rubber) | wt % | 0 | 0 | 0 | 0 | 10 | 0 | 0 | 0 | — |
| Amount of ultraviolet absorbent | wt % | 0 | 0 | 0 | 0 | 0.21 | 0 | 0 | 0 | — |
| Amount of antistatic agent (Electrostripper H, produced by Kao Corporation) | wt % | 0 | 0 | 0 | 1.0 | 1.0 | 0 | 0 | 0 | — |
| MFI | g/10 min. | 5.8 | 4.2 | 4.6 | 5.2 | 4.7 | 8.1 | 3.5 | 3.0 | JIS K-6870 (200° C.) |
| Izod impact strength | kg · cm/cm$^2$ | 8.9 | 10.2 | 10.9 | 10.8 | 12.1 | 6.6 | 5.3 | 4.2 | JIS K-7110 = ASTM D-256 |
| Bending strength | kg/cm$^2$ | 412 | 405 | 409 | 415 | 423 | 420 | 358 | 326 | JIS K-7203 = ASTM D-790 |
| Flexural modulus of elasticity | kg/cm$^2$ | 22,800 | 24,200 | 24,800 | 23,800 | 23,500 | 20,500 | 24,200 | 23,700 | JIS K-7203 = ASTM D-790 |
| Vicat softening point | °C. | 87 | 92 | 88 | 90 | 88 | 81 | 93 | 95 | JIS K-6870 (load: 5 kg) |
| Heat deformation temperature | °C. | 75 | 81 | 79 | 79 | 77 | 69 | 82 | 83 | JIS K-6870 = ASTM D-648 (load: 18.6 kg) |
| Specific gravity | — | 1.10 | 1.28 | 1.27 | 1.27 | 1.21 | 1.04 | 1.18 | 1.19 | JIS K-6871 = ASTM D-792 |
| Heat absorption inhibiting property | — | ⊚ | ⊚ | ⊚ | ⊚ | ⊚ | ● | ○ | ○ | A |
| Appearance | — | ○ | ● | ○ | ○ | ⊚ | ● | ○ | ▲ | B |
| X-Ray shielding property | — | ● | ○ | ○ | ○ | ○ | x | x | x | C |
| Photographic properties | — | ○ | ○ | ○ | ⊚ | ⊚ | ▲ | ▲ | x | D |
| Aptitude for film unit with lens | — | ○ | ○ | ○ | ⊚ | ⊚ | ▲ | ○ | x | E |
| Injection moldability | — | ○ | ○ | ⊚ | ⊚ | ⊚ | ▲ | ● | x | F |

Evaluation:

In Table 9, the evaluation was made as follow:

⊚: very excellent

○: excellent

●: limit for practical use

▲: having a problem, in need of improvement x: impossible to use in practice

Test method:

A: Heat absorption preventing property

This was determined from the increase in surface temperature after leaving a film unit with a lens under a xenon lamp of 80,000 lux for 3 hours.

B: Appearance

This was determined by visual examination.

C: X-Ray shielding property

A film unit 50 with a lens having light-shielded and packaged therein a resin-made photographic film patrone 52 with a color negative photographic film having an ISO sensitivity of 800 being wound around the spool 51 thereof was subjected to irradiation of X-ray beams having a concentration of 0.01 to 100 Å and a strength of 100 mm roentgen from an X-ray tube (80 KV, 100 mA) placed 100 cm apart from the unit. Thereafter, the photographic film was developed, and from the difference between the fog density of the resulting photographic film and the fog density of the film not subjected to X-ray irradiation, the X-ray shielding property was evaluated.

D: Photographic properties

A film unit with a lens using a color negative photographic film having an ISO sensitivity of 800 was left in dry conditions at 50° C. for one week to forcedly deteriorate the film unit and then subjected to usual development process. From the difference between the fog density of the resulting photographic film and the fog density of the film not subjected to forced deterioration, the photographic properties was determined.

E: Aptitude for film unit with lens

This was determined by overall evaluation of properties required when applied to a film unit with a lens, such as injection molding aptitude, dimensional accuracy, Izod impact strength, light fogging preventing property, appearance, heat absorption preventing property, X-ray shielding property, Vicat softening point, heat deformation temperature, flexural modulus of elasticity and antistatic property.

F: Injection moldability

This was determined by overall evaluation of properties involved in injection molding such as releasability, frequency of molding failures and molding cycle.

EXAMPLE 3

50 parts by weight of a styrene butadiene block copolymer resin having a styrene content of 90 wt % and a butadiene rubber content of 10 wt % and 50 parts by weight of a homopolystyrene resin having a reduced viscosity as shown in Table 10 were mixed (butadiene rubber content in the styrene-based resin: 5 wt %). Then a rubber-containing polystyrene-based resin composition was prepared by incorporating into the mixed resin composition prepared above from 0 to 5 wt % of liquid paraffin as a lubricant, from 0 to 2 wt % of polydimethylsiloxane having a viscosity of 20,000 cSt, from 0 to 10 wt % of calcium stearate, 0.5 wt % of oil furnace carbon black having a pH of 7.6, an average particle size of 27 m$\mu$, an oil absorption number of 86 ml/100 g and a cyan compound content of 5 ppm, and from 0 to 20 wt % of surface-treated sedimental calcium carbonate having an average particle size of 0.05 $\mu$m.

Using the rubber-containing polystyrene based resin composition, a resin-made photographic film patrone shown in FIG. 7 was formed according to an injection molding method in a molding machine ("Nestar", trade name, having a clamping pressure of 150 tons, manufactured by Sumitomo Juki KK). Also, using the above-described resin composition, a photographic film spool shown in FIG. 1 and an upper case 53 and a lower case 54 constituting the film unit with a lens shown in FIG. 8 were formed.

Using the thus-obtained resin-made photographic film patrones, photographic film spools and upper and lower cases, film units with a lens were produced and the properties thereof were examined. The results obtained are shown in Table 10.

The products of the present invention using a homopolystyrene resin having a reduced viscosity of 1.1 or more and compounded therein carbon black each showed unexpectedly high improvement in light-shielding property, impact strength and tensile ultimate elongation as compared with comparative products each using a normal homopolystyrene resin having a reduced viscosity of 1.0 or less. The homopolystyrene resin having a reduced viscosity of 1.1 has a molecular weight exceeding 300,000 and is inferior in dispersibility of carbon black as a light-shielding material or of sedimental calcium carbonate as an inorganic filler and in injection moldability (flowability), however, when one or more selected from the group consisting of liquid paraffin, polydimethylsiloxane and calcium stearate was used in combination as a lubricant, the above-described defects were overcome and at the same time, not only the releasability and abrasion resistance were improved but also warp or kink was not generated, dimensional accuracy was excellent and function for delivering photographic film by rotating the spool was superior.

The sedimental calcium carbonate having a small average particle size of from 0.01 to 0.3 $\mu$m as an inorganic filler was subjected to surface treatment with a lubricant and thereby, abrasion resistance, rigidity, heat durability, light-shielding property and flaw resistance could be unexpectedly improved while keeping impact strength and injection moldability almost free of any worsening.

Further, due to the use of a limited kind of lubricant and carbon black, even when a resin-made photographic film patrone for a high sensitivity film (ISO sensitivity: 400 to 1,600) was sealed in a photographic film container and stored in a low-temperature storehouse at 15° C. for 2 years, no adverse effect was caused on the photographic property upon use after the storage. In case of a resin-made photographic film patrone having added thereto 0.15 wt % of a dripproofing agent, it could be used immediately after storage in a low-temperature storehouse at 15° C. for 2 years during which the patrone was sealed in a photographic film container, without causing any trouble because it had a dripproofing ability.

TABLE 10

|  | Unit | Product of Invention |  |  |  |  |  |  |  | Comparative Product |  |  |  | Test Method |
|---|---|---|---|---|---|---|---|---|---|---|---|---|---|---|
|  |  | 3-I | 3-II | 3-III | 3-IV | 3-V | 3-VI | 3-VII | 3-VIII | 3-I | 3-II | 3-III | 3-IV |  |
| Reduced viscosity of homopolystyrene resin | — | 1.2 | 1.2 | 1.3 | 1.3 | 1.4 | 1.4 | 1.5 | 1.5 | 0.8 | 0.9 | 1.0 | 1.0 | — |
| Content of liquid paraffin | wt % | 0 | 2.0 | 1.0 | 2.0 | 2.0 | 3.0 | 2.5 | 5.0 | 0 | 0 | 1.0 | 0 | — |
| Content of polydimethylsiloxane | wt % | 1.0 | 1.0 | 1.0 | 1.0 | 1.0 | 1.0 | 0.1 | 0.5 | 1.0 | 1.0 | 1.0 | 0 | — |
| Content of calcium stearate | wt % | 1.0 | 1.0 | 1.0 | 1.0 | 0.1 | 0.5 | 1.0 | 1.0 | 1.0 | 1.0 | 1.0 | 0 | — |
| Oil furnace carbon black | wt % | 0.5 | 0.5 | 0.5 | 0.5 | 0.5 | 0.5 | 0.5 | 0.5 | 0.5 | 0.5 | 0.5 | 0.5 | — |
| Content of surface-treated sedimental calcium carbonate having particle size of 0.5 $\mu$m | wt % | 5 | 10 | 15 | 20 | 0 | 0 | 0 | 0 | 0 | 0 | 0 | 0 | — |
| Light-shielding property | — | ○ | ⊚ | ⊚ | ⊚ | ○ | ○ | ○ | ○ | ○ | ○ | ○ | ○ | A |
| Photographic properties | — | ○ | ○ | ○ | ○ | ○ | ○ | ○ | ○ | ○ | ○ | ○ | Δ | B |
| Izod impact strength | — | ○ | ○ | ⊚ | ⊚ | ⊚ | ⊚ | ⊚ | ⊚ | Δ | ● | ○ | x | C |
| Tensile ultimate elongation | — | ⊚ | ⊚ | ○ | ● | ⊚ | ⊚ | ⊚ | ⊚ | ● | Δ | Δ | x | D |
| Dispersibility of carbon black and sedimental calcium carbonate | — | ○ | ⊚ | ⊚ | ⊚ | — | — | — | — | — | — | — | — |  |
| Injection moldability | — | ○ | ⊚ | ⊚ | ⊚ | ○ | ⊚ | ● | ○ | ⊚ | ⊚ | ⊚ | Δ | F |

TABLE 10-continued

| | Unit | Product of Invention | | | | | | | | Comparative Product | | | | Test Method |
| --- | --- | --- | --- | --- | --- | --- | --- | --- | --- | --- | --- | --- | --- | --- |
| | | 3-I | 3-II | 3-III | 3-IV | 3-V | 3-VI | 3-VII | 3-VIII | 3-I | 3-II | 3-III | 3-IV | |
| Releasability | — | ○ | ○ | ○ | ○ | ○ | ○ | ○ | ○ | ○ | ○ | ○ | x | G |
| Appearance | — | ○ | ⊚ | ⊚ | ⊚ | ○ | ⊚ | ○ | ⊚ | ○ | ○ | ⊚ | Δ | H |
| Rigidity | — | ○ | ⊚ | ⊚ | ⊚ | ⊚ | ⊚ | ⊚ | ⊚ | Δ | Δ | Δ | ● | I |

Evaluation:

The evaluation in Table 10 was the same as that in Table 9.

Test Method:

A: Light-shielding ability

Each of injection molded articles was allowed to stand under a xenon lamp of 80,000 lux for 3 hours and a color negative photographic film having an ISO sensitivity of 800 was subjected to normal development. From the degree of fog density of the resulting photographic film, the light-shielding property was determined.

B: Photographic properties

A package using each injection molded article and a color negative photographic film having an ISO sensitivity of 800 was allowed to stand under dry conditions at 50° C. for one week to forcedly cause deterioration and then the photographic film was subjected to normal development process. From the difference between the fog density of the resulting photographic film and the fog density of photographic film which was not forcedly deteriorated, the photographic property was determined.

C: Izod impact strength

This was determined according to JIS K-7110.

D: Tensile ultimate elongation

This was determined according to K-6871.

E: Dispersibility of carbon black and sedimental calcium carbonate

This was determined by observing a slice of each molded article through an electron microscope.

F: Injection moldability

This was determined from overall evaluation on properties related to injection molding, such as flowability of resin composition, frequency of molding failures and molding cycle.

G: Releasability

Easiness in releasing a molded article from the mold upon injection molding was determined from the state at the production (whether the molded article can be taken out smoothly from the mold or is prone to remain in the mold).

H: Appearance

This was determined by visual test.

I: Flexural modulus of elasticity (rigidity)

This was determined according to JIS K-7203.

The resin-made photographic film patrone, photographic film spool and film unit with a lens prepared in this example each was a good injection molded article having excellent appearance, dimensional accuracy and physical property as compared with conventional products. Further, these photographic film spool, resin-made photographic film patrone and film unit with a lens each had a body formed of the same resin composition and accordingly, the production aptitude (reduction in the cost resulting from reduction in stock due to the use of same resin composition) or recycling aptitude was superior.

EXAMPLE 4

Using various resin compositions obtained by adding various additives described below to a polycarbonate resin produced by a solvent process (phosgene method) at an MFR (according to ASTM D-1238-88, temperature: 300° C., load: 1.2 kg), a holder for monosheet photographic film in a bag shown in FIG. 2 and a holder for sheet photographic film in a 10-sheet pack shown in FIG. 3 were formed according to injection molding. The resin compositions all contained 0.5 wt % of calcium stearate, 1.0 wt % of a hydrotalcite compound and 0.5 wt % of oil furnace carbon black used in Example 3 above (except that the surface was covered with calcium stearate).

Product 4-I of the Invention 10 wt % of glass fiber of which surface was covered with a coupling agent was added.

Product 4-II of the Invention 20 wt % of glass fiber of which surface was covered with a coupling agent was added.

Product 4-III of the Invention 20 wt % of carbon fiber of which surface was covered with a coupling agent was added.

Product 4-IV of the Invention 15 wt % of glass fiber of which surface was covered with a coupling agent and 10 wt % of antimony oxide (as a flame retardant) were added.

Product 4-V of the Invention 15 wt % of glass fiber of which surface was covered with a coupling agent and 10 wt % of rubber-containing polystyrene resin (so as to improve impact strength) were added.

Comparative Product 4-I

Not added.

Comparative Product 4-II 20 wt % of antimony oxide of which surface was covered with a coupling agent and 10 wt % of a rubber-containing polystyrene resin were added.

Comparative Product 4-III 20 wt % of antimony oxide of which surface was covered with a coupling agent was added.

The results obtained are shown in Table 11.

TABLE 11

|  | Unit | Product of Invention | | | | | Comparative Product | | | Test Method |
|---|---|---|---|---|---|---|---|---|---|---|
|  |  | 4-I | 4-II | 4-III | 4-IV | 4-V | 4-I | 4-II | 4-III | (ASTM) |
|  | wt % | glass fiber 10 | glass fiber 20 | carbon fiber 20 | flame retardant glass 15 antimony oxide 10 | flame retardant glass 15 styrene resin 10 | — | antimony 20 polystyrene 10 | Antimony 20 |  |
| Density | g/cm³ | 1.28 | 1.35 | 1.28 | 1.32 | 1.26 | 1.21 | 1.24 | 1.24 | D-792 |
| Tensile strength | kg/cm² | 950 ○ | 1130 ○ | 1580 ⊚ | 1080 ○ | 1060 ○ | 61.2 x–Δ | 590 x–Δ | 680 x–Δ | D-639 |
| Tensile ultimate elongation | % | 4.8 ○ | 3.5 ⊚ | 9.8 ⊚ | 4.2 ⊚ | 4.2 ⊚ | 138 x–Δ | 70 Δ | 116 x–Δ | D-639 |
| Bending strength | kg/cm² | 1340 ○ | 1580 ⊚ | 2120 ⊚ | 1310 ○ | 1410 ○ | 913 Δ | 860 Δ | 948 Δ | D-790 |
| Flexural modulus of elasticity | kg/cm² | 46400 ○ | 64500 ⊚ | 96200 ⊚ | 45200 ○ | 52600 ○ | 22800 x–Δ | 22600 x–Δ | 23500 x–Δ | D-790 |
| Rockwell hardness | M scale | 95 ○ | 98 ⊚ | 98 ⊚ | 92 | 97 | 78 Δ | 78 Δ | 88 ● | D-786 |
|  | R scale |  |  |  |  |  |  |  |  |  |
| Izod impact strength | kg·cm/cm² | 32 ⊚ | 14 ○ | 9 ● | 28 ⊚ | 26 ⊚ | 62 ⊚ | 31 ⊚ | 16 ○ | D-256 |
| Heat deformation temperature (load: 18.6 kg/cm²) | °C. | 141 ○ | 149 ⊚ | 141 ○ | 139 ○ | 146 ⊚ | 133 ○ | 107 Δ | 136 ○ | D-648 |
| Water absorption percentage (23° C., in water, 24 hrs.) | % | 0.15 ○ | 0.11 ○ | 0.22 ● | 0.13 ○ | 0.12 ○ | 0.21 ● | 0.23 ● | 0.20 ● | D-570 |
| Molding shrinkage percentage | % | 0.32 ● | 0.21 ○ | 0.15 ⊚ | 0.26 ○ | 0.24 ○ | 0.84 x–Δ | 0.65 Δ | 0.72 Δ | D-955 |
| Aptitude for holder in FIG. 2 | — | ○ | ⊚ | ● | ⊚ | ⊚ | x | x–Δ | x–Δ | — |
| Aptitude for holder in FIG. 3 | — | ○ | ⊚ | ● | ⊚ | ⊚ | x | x–Δ | x–Δ | — |

Evaluation:

The evaluation in Table 11 was the same as that in Table 9.

Holder Aptitude:

Products 4-I to 4-V of the present invention each was large in respective physical properties, small in elongation deformation, high in heat deformation temperature, large in Rockwell hardness, small in molding shrinkage or water absorption percentage and at the same time, excellent in properties required for a sheet photographic film holder which is repeatedly used under sever conditions outdoors, such that dimensional change was small and abrasion resistance or flaw resistance was scarcely generated, thus they were optimal holders for sheet photographic film.

According to the present invention, physical properties, dimensional accuracy, injection moldability, abrasion resistance, heat durability and appearance can be improved without causing any adverse effect on photographic properties of a photographic photosensitive material.

While the invention has been described in detail and with reference to specific embodiments thereof, it will be apparent to one skilled in the art that various changes and modifications can be made therein without departing from the spirit and scope thereof.

What is claimed is:

1. An injection molded article for photographic photosensitive materials formed of a noncrystalline resin composition containing 50 wt % or more of a noncrystalline resin having a melt flow rate of from 1 to 60 g/10 min, a flexural modulus of elasticity of 20,000 kg/cm² or more and a thermal deformation temperature of 70° C. or higher, from 0.1 to 45 wt % of one or more of a rubbery material, a thermoplastic elastomer and an ethylene copolymer resin, from 0.01 to 49.9 wt % of one or more of a light-shielding material and a fibrous filler and from 0.001 to 20 wt % of one or more of an antioxidant, an age resistor, an ultraviolet absorbent, a fatty acid metal salt, a radical scavenger, a hydrate double salt compound and an oxidation inhibitory synergistic effect-providing agent.

2. An injection molded article for photographic photosensitive materials formed of a noncrystalline resin composition containing 50 wt % or more of a rubber-containing aromatic monovinyl resin which is a noncrystalline resin having a rubbery material content of from 0.1 to 20 wt %, from 0.01 to 20 wt % of a lubricant and from 0.01 to 49.9 wt % of a light-shielding material surface-covered with a surface-covering material, with the total content of said materials being 70 wt % or more, and having a melt flow rate of from 2 to 50 g/10 min., a flexural modulus of elasticity of 15,000 kg/cm² or more and an Izod impact strength of 2.5 kg·cm/cm² or more.

3. An injection molded article for photographic photosensitive materials formed of a noncrystalline resin composition containing 50 wt % or more of a rubber-modified polystyrene resin which is a noncrystalline resin modified with from 0.1 to 20 wt % of one or more rubbery material of a diene-based rubber and a polyolefin-based rubber, and from 0.001 to 20 wt % of one or more of a fatty acid metal salt and a hydrate double salt compound, and having a melt flow rate of from 2 to 50 g/10 min., a flexural modulus of elasticity of 15,000 kg/cm² or more and an Izod impact strength of 2.5 kg·cm/cm² or more.

4. An injection molded article for photographic photosensitive materials formed of a noncrystalline resin composition containing 50 wt % or more of a rubber-containing polystyrene resin which is a noncrystalline resin having a rubbery material content of from 0.1 to 20 wt %, from 0.005 to 10 wt % of a silicone-based lubricant, from 0.005 to 20 wt % of one or more of an antistatic agent, a fatty acid amide-based lubricant, a hydrocarbon-based lubricant, a fatty acid-based lubricant, a fatty acid metal salt-based lubricant and an alcohol-based lubricant and from 0.01 to 49.9 wt % of a light-shielding material, with the total content of said materials being 70 wt % or more.

5. An injection molded article for photographic photosensitive materials formed of a noncrystalline resin composition containing 50 wt % or more of a styrene-based resin which is a noncrystalline resin having a synthetic rubber content of from 0.1 to 20 wt %, from 0.005 to 10 wt % of a silicone-based lubricant comprising one or more of a dimethylpolysiloxane and a dimethylpolysiloxane modified product, from 0.005 to 20 wt % of one or more of a higher fatty acid-based lubricant, a higher fatty acid metal salt-based lubricant, a higher fatty acid amide-based lubricant, a hydrocarbon-based lubricant and an alcohol-based lubricant, from 0.01 to 49.9 wt % of one or more of a metal powder, a metal paste, carbon black, graphite and an inorganic pigment having a refractive index of 1.50 or more and from 0.001 to 20 wt % of one or more of an antioxidant, an age resistor, an ultraviolet absorbent, a radical scavenger, an oxidation inhibitory synergistic effect-providing agent and a hydrate double salt compound, with the total content of said materials being 80 wt % or more.

6. An injection molded article for photographic photosensitive materials formed of a noncrystalline resin composition containing 50 wt % or more of a noncrystalline resin, from 0.1 to 45 wt % of one or more of an olefin-based elastomer, an ethylene copolymer resin, an acid-modified polyolefin resin and a low molecular polyolefin resin, from 0.01 to 20 wt % of a lubricant, from 0.01 to 49.9 wt % of one or more of a white pigment and a black pigment and from 0.001 to 20 wt % of one or more of an antioxidant, an age resistor, an ultraviolet absorbent, a radical scavenger, an oxidation inhibitory synergistic effect-providing agent and a hydrate double salt compound, with the total content of said materials being 80 wt % or more.

7. An injection molded article for photographic photosensitive materials formed of a noncrystalline resin composition containing 50 wt % or more of a noncrystalline resin, from 0.001 to 3 wt % of a phenolic antioxidant, from 0.001 to 3 wt % of a phosphoric antioxidant and from 0.001 to 5 wt % of one or more of a hydrate double salt compound and a fatty acid metal salt, with the total content of said phenolic antioxidant, phosphoric antioxidant, hydrate double salt compound and fatty acid metal salt being from 0.001 to 11 wt %.

8. An injection molded article for photographic photosensitive materials as claimed in claim 1, 2, 3, 4, 5, 6 or 7, wherein said noncrystalline resin composition is fed to and heated in a screw extruder having a heat generation function by shear mixing, kept in a liquid state by adjusting the pressure and fed into a heated demonomerizing machine to evaporate and remove an evaporative material which adversely affects photographic properties of a photographic photosensitive material.

9. An injection molded article for photographic photosensitive materials as claimed in claim 1, 2, 3, 4, 5, 6 or 7, wherein said noncrystalline resin composition is freed from an evaporative material which adversely affects photographic properties of a photographic photosensitive material by evaporating said evaporative material using at the inlet of the extruder a hopper having a heating or vacuumizing function for keeping it under a reduced pressure lower than the atmospheric pressure.

10. An injection molded article for photographic photosensitive materials as claimed in claim 1, 2, 3, 4, 5, 6 or 7, wherein said noncrystalline resin is a styrene-butadiene copolymer resin containing a conjugated diene unit-tin bond chain resulting from polymerization conducted such that in polymerizing 1,3-butadiene and styrene using an organic lithium compound in a hydrocarbon solvent in the presence of an ether compound or a tertiary amine compound and then coupling the polymer with a tin compound, a conjugated diene compound is added immediately before coupling.

11. An injection molded article for photographic photosensitive materials as claimed in claim 1, 2, 3, 4, 5, 6 or 7, wherein said noncrystalline resin is a styrene-based resin obtained by, in conducting block or suspension polymerization of from 60 to 99 wt % of a styrene-based monomer, additionally adding from 1 to 40 wt % of a monomer copolymerizable with said styrene-based monomer at the time when the polymerization addition rate reaches 60% or more and completing the polymerization.

12. An injection molded article for photographic photosensitive materials as claimed in claim 1, 2, 3, 4, 5, 6 or 7, wherein said noncrystalline resin composition is obtained by mixing a colored masterbatch resin pellet, a recycle resin pellet containing 50 wt % of a noncrystalline resin and a virgin resin pellet containing 50 wt % or more of a noncrystalline resin and melt-kneading the mixture in an extruder having an L/D of 20 or more.

13. An injection molded article for photographic photosensitive materials as claimed in claim 1, 2, 3, 4, 5, 6 or 7, wherein said noncrystalline resin composition is obtained by melt-kneading a colored masterbatch resin pellet, a recycle resin pellet and a virgin resin, these pellets being different in one or more of the coloration density, volume, shape, specific gravity, charge quantity and lubricity.

14. An injection molded article for photographic photosensitive materials as claimed in claim 1, 2, 3, 4, 5, 6 or 7, wherein said noncrystalline resin composition comprises a resin obtained by blending or graft-modifying 50 wt % or more of a polycarbonate resin and from 0.1 to 45 wt % of one or more of an ethylene copolymer, a thermoplastic elastomer and a styrene-based resin.

15. An injection molded article for photographic photosensitive materials as claimed in claim 1, 2, 3, 4, 5, 6 or 7, which is formed of a noncrystalline resin composition containing one or more of an antioxidant and a hydrotalcite compound, a fatty acid metal salt, one or more of an ethylene copolymer resin and a thermoplastic elastomer, and carbon black.

* * * * *